(12) United States Patent
Katsuki et al.

(10) Patent No.: US 6,499,220 B2
(45) Date of Patent: *Dec. 31, 2002

(54) INCLINATION SENSOR

(75) Inventors: Nobuharu Katsuki, Kyotanabe (JP); Masaharu Ushihara, Hirakata (JP); Toshiya Nakagaki, Hashimoto (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,164

(22) PCT Filed: Dec. 3, 1998

(86) PCT No.: PCT/JP98/05457

§ 371 (c)(1),
(2), (4) Date: Sep. 9, 1999

(87) PCT Pub. No.: WO99/30110

PCT Pub. Date: Jun. 17, 1999

(65) Prior Publication Data

US 2002/0050068 A1 May 2, 2002

(30) Foreign Application Priority Data

Dec. 9, 1997 (JP) .............................................. 9-338409
Apr. 24, 1998 (JP) ............................................ 10-114670

(51) Int. Cl.⁷ ..................... G01C 009/12; G01C 009/06
(52) U.S. Cl. ................. 33/391; 33/366.24; 200/61.45 R
(58) Field of Search ............................... 33/391, 355 R, 33/356, 357, 358, 359, 361, 362, 366.11, 366.24, 402, 366.25, 366.26, DIG. 1; 200/61.45 R, 61.45 M, 61.52

(56) References Cited

U.S. PATENT DOCUMENTS

| | | | | |
|---|---|---|---|---|
| 2,694,865 A | * | 11/1954 | Le Pera | 33/391 |
| 2,933,821 A | * | 4/1960 | D'enis | 33/391 |
| 4,099,334 A | * | 7/1978 | Kuzin et al. | 33/366.24 |
| 4,275,391 A | * | 6/1981 | Okamura | 340/571 |
| 4,384,269 A | * | 5/1983 | Carlson | 340/467 |
| 4,571,844 A | * | 2/1986 | Komasaku et al. | 33/591 |
| 4,606,133 A | * | 8/1986 | Mills | 33/391 |
| 4,667,413 A | * | 5/1987 | Pitts | 33/391 |
| 4,803,342 A | * | 2/1989 | Steers et al. | 200/61.45 R |
| 4,811,492 A | * | 3/1989 | Kakuta et al. | 33/391 |
| 4,894,921 A | * | 1/1990 | Barlow | 33/265 |
| 4,911,541 A | * | 3/1990 | Alvarez | 359/557 |
| 5,450,049 A | * | 9/1995 | Bachmann | 335/205 |
| 6,184,764 B1 | * | 2/2001 | Edwards et al. | 335/205 |
| 6,399,941 B1 | * | 6/2002 | Nakagaki et al. | 200/61.45 R |

FOREIGN PATENT DOCUMENTS

| | | |
|---|---|---|
| JP | 55-95236 | 7/1980 |
| JP | 56-70410 | 6/1981 |
| JP | 1-170808 | 7/1989 |
| JP | 3-23311 | 3/1991 |
| JP | 3-293515 | 12/1991 |
| JP | 5-1913 | 1/1993 |
| JP | 5-11016 | 2/1993 |
| JP | 6-325916 | 11/1994 |
| JP | 8-189826 | 7/1996 |
| JP | 10-122857 | 5/1998 |
| JP | 10-160459 | 6/1998 |

* cited by examiner

*Primary Examiner*—Diego Gutierrez
*Assistant Examiner*—Stanley J. Prunchnic, Jr.
(74) *Attorney, Agent, or Firm*—RatnerPrestia

(57) ABSTRACT

An inclination sensor having excellent rotational performance, longlasting stability and high sensing precision. The inclination sensor comprises a pendulum (10) rotatably attached to a case (1) of a fixed body secured to an attached member, a magnetic flux-generating means (11) attached to the pendulum (10), reed switches (4*a*) and (4*b*) attached to part of the case (1) corresponding to the locus along which the magnetic flux-generating means (11) moves, and a flange portion (12) which is a damping body being nonmagnetic and electrically conductive and disposed in the case (1) along the locus of the movement of the magnetic flux-generating means (11).

40 Claims, 44 Drawing Sheets

Direction of gravity ↓

Direction of gravity ↓

Horizontal Level position: OFF

Clockwise inclination: ON
A1≅A2

Counterclockwise inclination: ON

Horizontal Level position: OFF

Clockwise inclination: ON
A1≅A2<B1≅B2

Counterclockwise inclination: ON

Horizontal Level position: OFF

Clockwise inclination: ON
C1>C2

Counterclockwise inclination: ON

Direction of gravity ↓

Direction of gravity ↓

INCLINATION SENSOR

THIS APPLICATION IS A U.S. NATIONAL PHASE APPLICATION OF

PCT INTERNATIONAL APPLICATION PCT/JP98/05457.

FIELD OF THE INVENTION

The present invention relates to an inclination sensor for detecting inclination of a vehicle, industrial machinery, and the like.

BACKGROUND OF THE INVENTION

Inclination sensors of the kind, such as those shown in FIG. 45A and FIG. 45B and FIG. 46A and FIG. 46B have been suggested in the past. The inclination sensor shown in FIG. 45A and FIG. 45B confines an amount of mercury 202 within a hermetically sealed container 201. Terminals 203 and 204 are provided with one end of each protruding in the sealed container. When the inclination sensor is in a level position, the mercury 202 is situated as shown in FIG. 45A so that the terminals remain in an open state. If the inclination sensor tilts, the mercury 202 moves as shown in FIG. 45B into contact with the terminals 203 and 204 so that the two terminals turn into a state of conduction.

An inclination sensor shown in FIG. 46A and FIG. 46B, in which a magnet 212 and magnetic fluid 213 are confined in a hermetically sealed container 211, can detect an inclination by means of switching operation of contacts of a reed switch 214 provided beneath the container due to a variation of magnetic force, since the magnet 212 floating within the container 211 moves with an inclination of the container.

FIG. 46A and FIG. 46B depict the hermetically sealed container 211, the magnet 212, the magnetic fluid 213 and the reed switch 214. The magnet 212 and the magnetic fluid 213 confined in the hermetically sealed container 211 are freely movable within the hermetically sealed container 211. When the hermetically sealed container 211 is at a level, the magnet 212 and the magnetic fluid 213 are in the position as shown in FIG. 46A, so that contacts of the reed switch 214 are in their open state. If, however, the hermetically sealed container 211 tilts, the relative position between the magnet 212 in the hermetically sealed container 211 and the reed switch 214 changes, because the magnet 212 and the magnetic fluid 213 tend to maintain their position in a direction of gravity, as shown in FIG. 46B. This causes the magnet 212 to get closer to the contacts of the reed switch 214, so as to turn the contacts into a state of conduction (i.e., closed), and the inclination is perceived.

The inclination sensors that use mercury 202 are not suitable for mass production, because they require careful handling and secure facilities in production.

Also, with inclination sensors that use magnetic fluid 213, it is not only difficult to maintain the property of the magnetic fluid 213 stable for a long time, but also such sensors have a shortcoming in that the liquidity decreases at low temperature, thereby exacerbating movements of the magnet 212. This raises the problem of reduced accuracy of detecting inclination.

Moreover, these sensors have yet another problem of producing erroneous signals, as the mercury and the magnetic fluid are liable to splash due to external disturbances, such as vibration and an impact, which tend to short-circuit the contacts.

SUMMARY OF THE INVENTION

The present invention is intended to solve the above problems, and it aims at providing an inclination sensor that is superior in rotational performance and long term stability, and is high in detecting accuracy, resistant to external disturbances and reliable.

In order to solve the above problems, the inclination sensor of the present invention comprises divided frames provided within a fixation body to be fixed to a mounting body, a pendulum mounted rotatably to the divided frames, a magnetic flux generation means mounted on the pendulum, a reed switch mounted on a part of the divided frames in a manner to correspond with a rotational path of the magnetic flux generation means, and a damping body having nonmagnetic and electrically good conductive properties positioned on the divided frames along the rotational path of the magnetic flux generation means. The above structure can realize an inclination sensor that is superior in rotational performance and long term stability, and is high in detecting accuracy, resistant to external disturbances and reliable.

DESCRIPTION OF THE PREFERRED EMBODIMENTS

1st Exemplary Embodiment

Figure 1A:
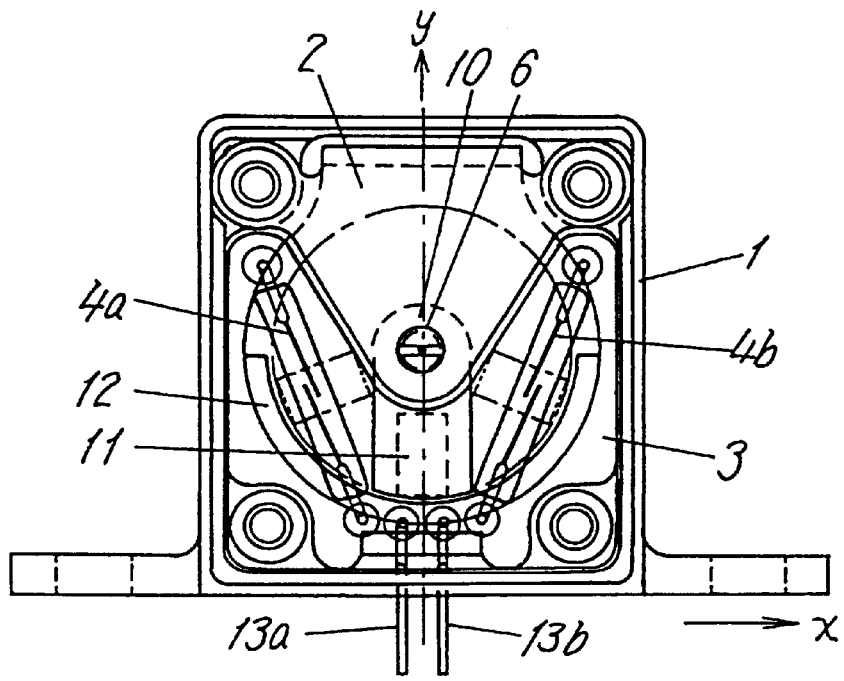
FIG. 1A is a front view, with a cover removed, of a first exemplary embodiment of the present invention.
Figure 1B:
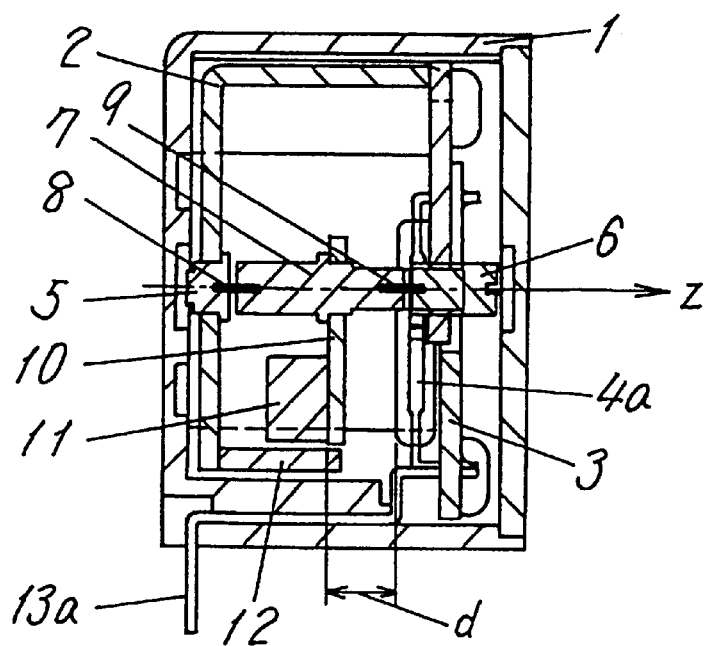
FIG. 1B is a cross sectional view of the of the first exemplary embodiment of the present invention.
Figure 2:
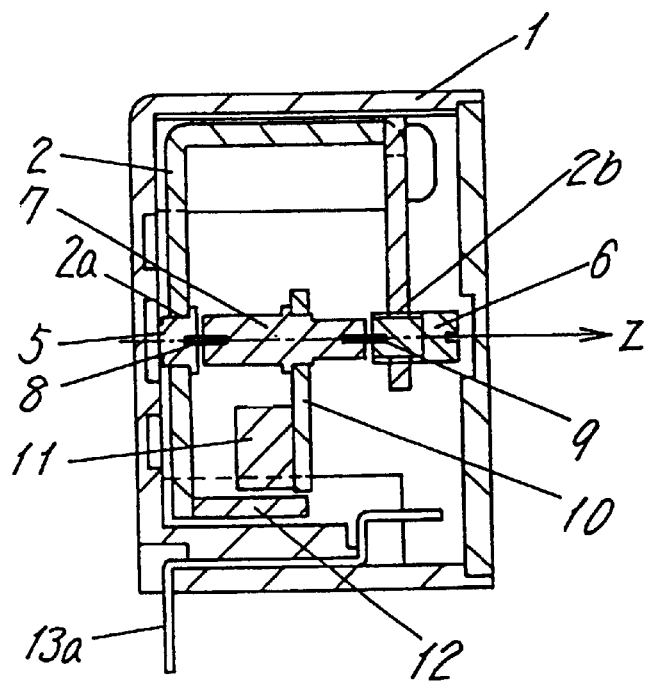
FIG. 2 is a cross sectional view showing the details of a bearing portion of the first exemplary embodiment of the present invention.

FIG. 1A depicts a front view of an inclination sensor, with a cover removed, according to a first exemplary embodiment of the present invention, and FIG. 1B depicts a cross sectional view of the same. FIG. 2 depicts a cross sectional view of a bearing portion of the FIG. 1B sensor.

FIGS. 1A and 1B depict the following elements: a case 1, which is a fixation body to be fixed to a mounting body of a vehicle, etc.; a frame 2 made of a nonmagnetic material such as brass, aluminum, etc.; a printed wiring board 3; reed switches 4a and 4b; bearings 5 and 6 made of oil impregnated sintered metal; a rotary shaft 7 made of a nonmagnetic material such as brass, aluminum, etc.; pins 8 and 9 made of a spring steel material such as piano wire or stainless steel, etc.; a pendulum 10 made of a nonmagnetic material such as brass, aluminum, etc.; a samarium-cobalt magnet 11 defining a magnetic flux generation means; a flange part 12 defining a damping body made of a material having non-magnetic and electrically good conductive properties such as copper, aluminum, etc.; and terminals 13a and 13b. FIG. 1A depicts the case 1 without a cover (not shown in the figure). In FIG. 2, coaxial bearing retention holes 2a and 2b are provided in the frame 2 in a form of U-shaped plate.

In the present embodiment, the frame 2 and the printed wiring board 3 are mounted with a screw to the case 1, and the reed switches 4a and 4b are mounted on the printed wiring board 3 in a manner to face slantingly against each other in a V-shape. These reed switches 4a and 4b are positioned symmetrically at a predetermined angle relative to each other. The pins 8 and 9 are inserted at both ends of the rotary shaft 7. The bearing 5 is fixed in the bearing retention hole 2a provided in the frame 2. The bearing retention hole 2b, provided also in the frame 2, is formed with a female thread, and the bearing 6, the periphery of which is formed with a male thread, is fitted to the female thread. The pin 8 is supported by the bearing 5, and the pin 9 is supported by the bearing 6. The pendulum 10 is fixed to the rotary shaft 7. The pendulum 10 has a surface perpendicular to the rotary shaft 7, on which the magnet 11 is mounted. The magnet 11 is freely rotatable relative to the case 1. Magnetic poles of the magnet 11 are positioned so that a magnetic flux is generated in a direction of a tangential line of a rotational path of the magnet 11 relative to the case 1. The flange part 12, in a shape of circular arc, is placed around a peripheral edge of the frame 2 toward a direction in parallel with an axial direction of the rotary shaft 7. An eddy current is induced in proportion to a relative movement of the magnet 11 with the flange part 12, and it functions as a damping force. Therefore, a stable movement with an effective damping is maintained against fluctuations of the pendulum 10 in a small angle produced during normal travelling of the vehicle.

A space in a distance of "d" is provided between the reed switches 4a and 4b and the magnet 11, and the reed switches 4a and 4b open and close according to the rotational path relative to the magnet 11. A signal produced by the open-and-close operation of the reed switches 4a and 4b is output from the case 1 via the terminals 13a and 13b connected to the printed wiring board 3. The pins 8 and 9 are 0.3–1.5 mm (preferably 0.6 mm) in diameter, and they have a sufficient bending strength for supporting the weight of the rotary shaft 7 attached with the pendulum 10, since their length is short in a direction of their axis. The pins 8 and 9 can rotate smoothly, because they are not only as thin as 0.6 mm in diameter, but also because they are provided with mirror-finished surfaces that reduce frictional resistances with the bearings 5 and 6. Therefore, they can realize an extremely quick response to an inclination. The diameter of the pins 8 and 9 needs not be specifically fixed to 0.6 mm, but it is determined in consideration of an overall balance.

Although what has been described in connection with the above embodiment is exemplary, in which the bearings 5 and 6 are fixed to the frame 2 of one-piece construction, the frame 2 can be divided into separate structures. Again, although the described example is provided with the pins 8 and 9 inserted into holes located at both ends of the rotary shaft 7, the rotary shaft 7 may have a through hole, so that a single pin can be inserted in it. Also, it is possible to reduce the diameter of the rotary shaft 7 at both ends, so as to omit a separate pin. Any of the above structures results in reduced frictional resistance with the bearings 5 and 6, and smooth rotation, thereby realizing a quick response to an inclination.

Figure 3:
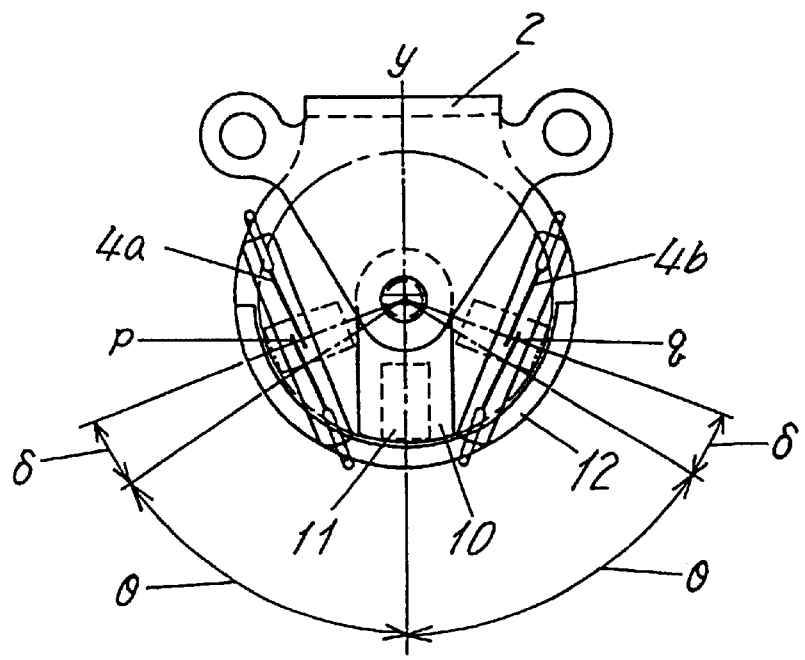
FIG. 3 shows an open-and-close operation of a reed switch of the first exemplary embodiment of the present invention.

An open-and-close operating condition of the reed switches 4a and 4b according to the rotational path in relation to the magnet 11 is described hereinafter by referring to FIG. 3, FIG. 4 and FIG. 5. When the entire inclination sensor is kept in a level, as shown in FIG. 3, a central line (y-axis) of the pendulum 10 and the magnet 11 are oriented in a direction of gravity. The centers of the reed switches 4a and 4b, mounted on the printed wiring board 3 fixed to the case 1, are "p" and "q" respectively. The "p" and "q" are situated symmetrically with respect to the y-axis, and their angles are "θ+δ" in the directions of clockwise rotation and counterclockwise rotation respectively.

Figure 4:
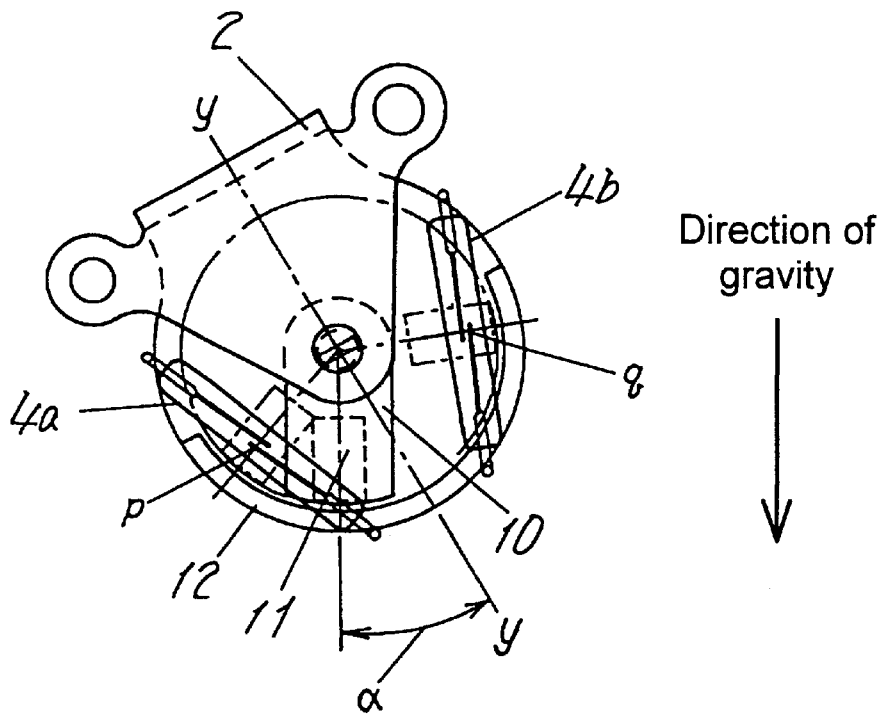
FIG. 4 also shows an open-and-close operation of a reed switch of the first exemplary embodiment of the present invention.

If the entire inclination sensor tilts in the counterclockwise direction to an angle of "α", as shown in FIG. 4, the magnet 11 moves relatively closer to the angle of "α" toward the center "p" of the reed switch 4a, since both the pendulum 10 and the magnet 11 stay in the direction of gravity.

Figure 5:
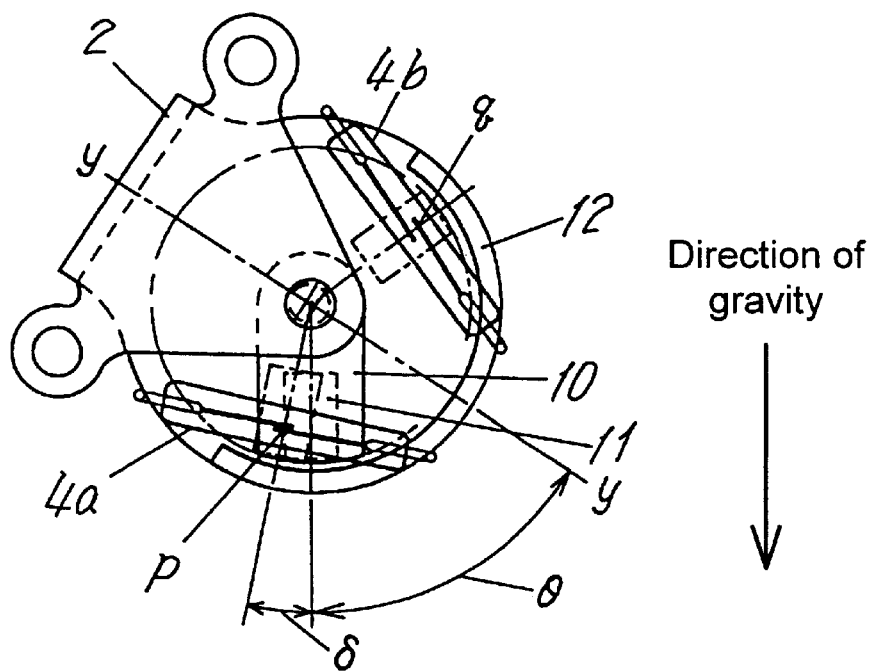
FIG. 5 also shows an open-and-close operation of a reed switch of the first exemplary embodiment of the present invention.

Even if the entire inclination sensor further rotates in the counterclockwise direction by an angle of "θ", as shown in FIG. 5, the magnet 11 move to a position relatively closer to an angle of "θ" toward the center "p" of the reed switch 4a, since both the pendulum 10 and the magnet 11 still stay in the direction of gravity.

In this relative position, the reed switch 4a closes to a state of conduction. The position, at which the reed switch 4a turns into the state of conduction, is dependent upon the magnitude of the energy product of the magnet 11, the space "d" between the magnet 11 and the reed switches 4a and 4b, and the sensitivity of the reed switches 4a and 4b themselves.

Figure 6A:
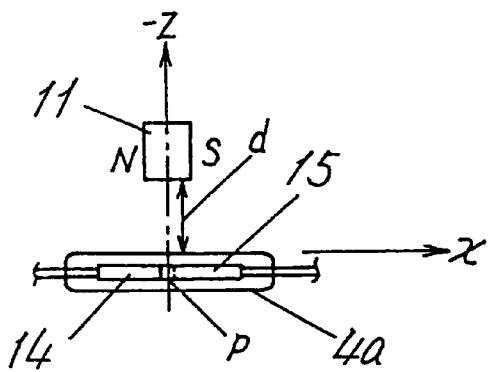
FIG. 6A shows the positional relationship of leafs of the first exemplary embodiment of the present invention.
Figure 6B:
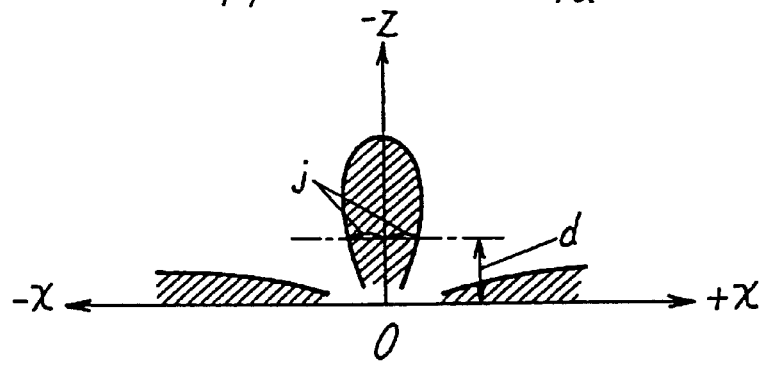
FIG. 6B shows an open-and-close operation of the reed switch.

The open-and-close operation of the reed switches 4a and 4b also changes depending on the orientation of their leafs. A condition of this operation is described in detail by referring to FIG. 6A, FIG. 6B, FIG. 7A and FIG. 7B. In FIG. 6A, leafs 14 and 15 of the reed switch 4a are in parallel to an x-axis, and major plane surfaces of each of the leafs 14 and 15 are substantially in parallel to a x-z plane at the same time. The magnetic flux generated by the magnet 11 has a nearly equal effect on the leafs 14 and 15, in this instance. Therefore, positions at which the reed switch 4a turns into the state of conduction are at an approximate angle of "j" in both directions, as shown in FIG. 6B, regardless of whether the reed switch 4a approaches the magnet 11 from a direction of "+x" or from a direction of "−x". What has been described in the present embodiment, as depicted in FIG. 1 through FIG. 5, is a structure that adopts the configuration of FIG. 6A. Accordingly, the angle "j" equals the angle "δ". The angle "j" is practically univocally defined, when a type of the reed switches 4a and 4b is specifically determined.

Figure 7A:
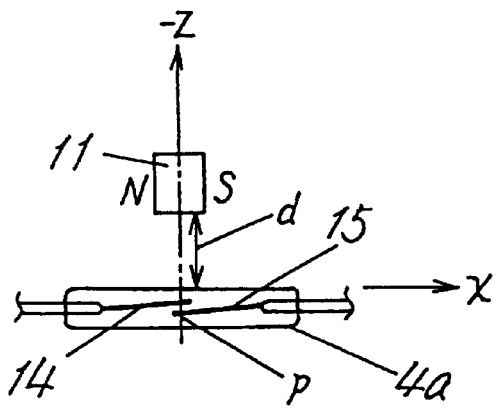
FIG. 7A shows the positional relationship of the reeds of the first exemplary embodiment of the present invention.
Figure 7B:
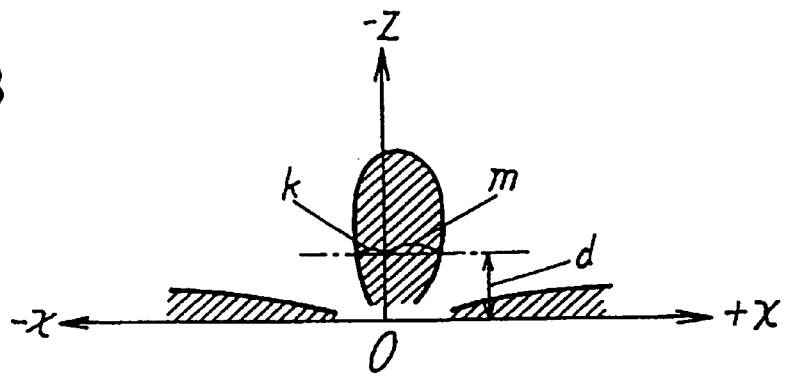
FIG. 7B shows an open-and-close operation of the reed switch.

In FIG. 7A, on the other hand, the major plane surfaces of each of the leafs 14 and 15 of the reed switch 4a are generally perpendicular to a plane of the z-axis, while the leafs 14 and 15 are in parallel to the x-axis. In this instance, the magnetic flux generated by the magnet 11 affects differently the leafs 14 and 15, since the leaf 14 is slightly closer, in general, to the magnet 11 than the leaf 15. Therefore, positions at which the reed switch 4a turns into the state of conduction are different when it approaches from the direction of "+x", and when it approaches from the direction of "−x", as shown in FIG. 7B. In the case of the reed switch 4a approaching the magnet 11 from the direction of "+x", it turns into the state of conduction at a position farther from the magnet 11. That is, an angle "m" becomes greater than the angle "δ". On the contrary, reed switch 4a does not turn into the state of conduction unless it approaches more closely the magnet 11, when approaching from the direction of "−x". Thus, an angle "k" becomes smaller than the angle "δ".

Although the present embodiment, as described above, is only an exemplary embodiment, in which the flange part 12 in a shape of circular arc is placed around a peripheral edge of the frame 2 in a direction parallel with an axial direction of the rotary shaft 7, it may be provided with a predetermined angle according to a design need. Also, this embodiment can be composed of a plurality of elements each having a circular shape. Moreover, it is also conceivable that the flange part 12, including the frame 2, has a cross sectional shape of a reversed letter T, a letter J or a letter W, in the y-z plane in FIGS. 1A and 1B. An appropriate configuration is selected, as required by the design need and detecting accuracy.

By inserting an electric resistance (e.g., several kΩ) in parallel with the reed switches 4a and 4b, the present embodiment is able to diagnose failures in a path to the reed switches 4a and 4b by way of detecting the presence or absence of a small current.

Although the described embodiment is provided with a magnet 11 of a samarium-cobalt system as the magnetic flux generation means, a rare-earth magnet of another kind can be utilized. Or, a ferrite magnet can also be utilized, although it is relatively inferior in its magnetic characteristic relative to temperature. An adoption of the magnet 11 enables reductions in both the power consumption and the size. Also, an electromagnet can be used as the magnetic flux generation means in order to gain a damping force of the eddy current.

Since the present embodiment is provided with the two reed switches 4a and 4b, it can distinguish between a clockwise rotation and a counterclockwise rotation. Moreover, provision of a number of reed switches also enables it to detect any two or more angles of inclination.

2nd Exemplary Embodiment

Figure 1C:
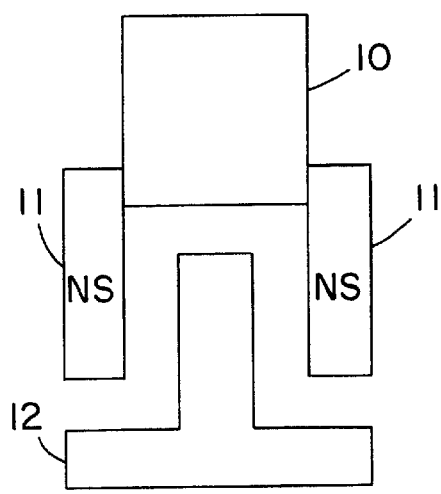
FIGS. 1C, 1D and 1E illustrate a flange part, which functions as a damping body having various different shapes.
Figure 1D:
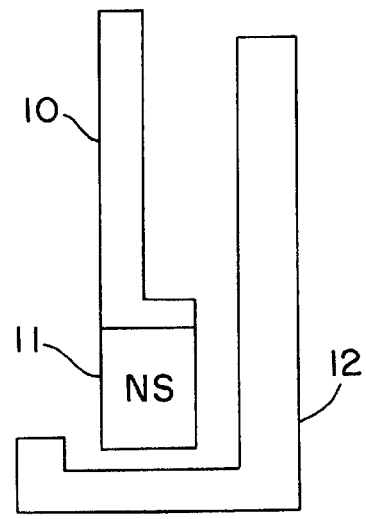
Figure 1E:
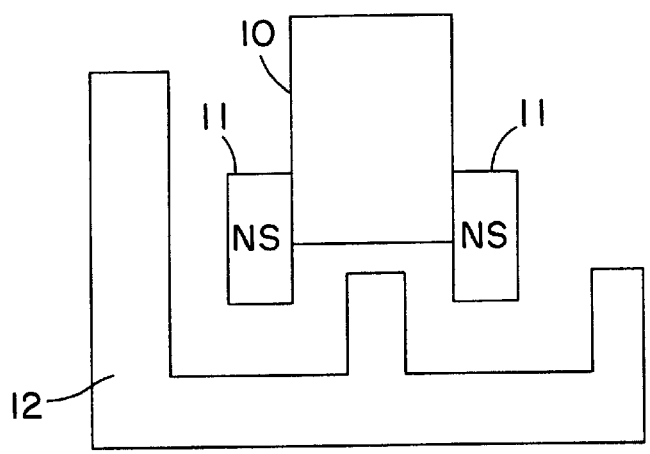
Figure 8A:
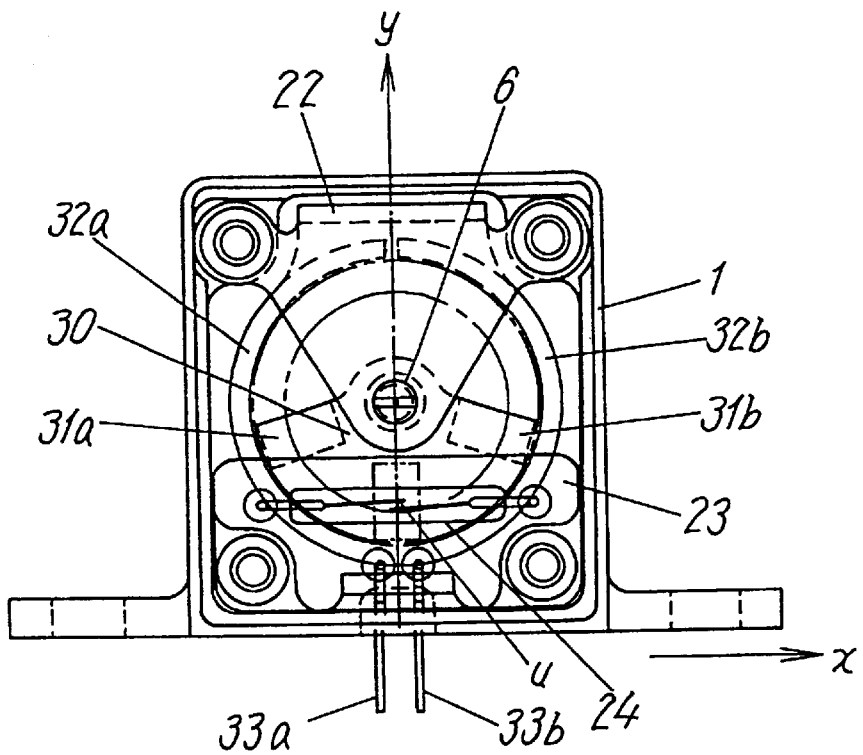
FIG. 8A is a front view, with a cover removed, of a second exemplary embodiment of the present invention.
Figure 8B:
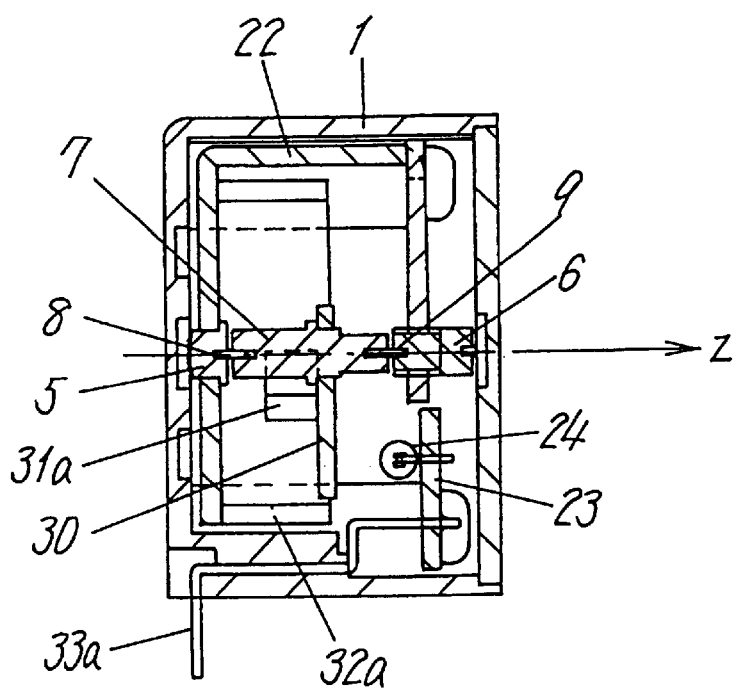
FIG. 8B is a cross sectional view of the second exemplary embodiment of the present invention.

FIG. 8A is a front view of an inclination sensor according to a second exemplary embodiment of the present invention, and FIG. 8B is a cross sectional view of the same. In FIGS. 8A and 8B, elements having the same structure as those of FIG. 1A and FIG. 1B are assigned the same reference numerals and detailed descriptions of these elements are omitted, while only different elements are described hereinafter. Various cross sectional shapes are shown in FIG. 1C (a reverse T shape), FIG. 1D (a J shape), and FIG. 1E (a W shape).

FIGS. 8A and 8B depict: a frame 22 made of a nonmagnetic material such as brass, aluminum, or the like; a printed wiring board 23; a reed switch 24; a pendulum 30 made of a nonmagnetic material such as brass, aluminum, or the like; samarium-cobalt magnets 31a and 31b; flange parts 32a and 32b in a shape of a semicircular cylinder made of a material having nonmagnetic and electrically good conductive properties such as copper, aluminum, or the like; and terminals 33a and 33b.

In FIGS. 8A and 8B, the frame 22 having a U-shaped cross section in the y-z plane and the printed wiring board 23 are mounted with a screw to the case 1. The reed switch 24 is mounted on the printed wiring board 23 in a direction parallel to the x-axis. A center "u" of the reed switch 24 is situated within a y-z plane. Major plane surfaces of the leafs are in the same positional relation, in principle, with that shown in FIG. 6. The pendulum 30 is fixed to the rotary shaft 7, and has a sector-shaped surface, which is perpendicular to the rotary shaft 7, and symmetrical to the y-axis. The magnets 31a and 31b are mounted on the sector-shaped surface of the pendulum 30 in a manner to face slantingly against each other in a shape of a reversed letter V, and they are also symmetrical to the y-axis at an angle of 2×(θ+δ).

Magnetic poles of the magnets 31a and 31b are arranged in the same way in principle as has been described in the first exemplary embodiment, and they are positioned so that the magnetic flux is generated in a direction of a tangential line of a rotational path of the magnets 31a and 31b relative to the case 1. As with the first exemplary embodiment, there is a space "d" between the reed switch 24 and the magnets 31a and 31b. The flange parts 32a and 32b are placed around a peripheral edge of the frame 22 in a direction parallel with an axial direction of the rotary shaft 7. A signal produced by the open-and-close operation of the reed switch 24 is output from the case 1 via the terminals 33a and 33b connected to the printed wiring board 23.

The basic operating principle of the reed switch 24 to open and close according to the rotational path relative to the magnets 31a and 31b is the same as has been described for FIG. 3 through FIG. 6 in the first exemplary embodiment.

The present embodiment provides a sensor having extremely high detecting performance, since it adopts the structure that uses a pair of the magnets 31a and 31b having a small individual dispersion and a single reed switch 24 which tends to have a relatively large individual dispersion.

3rd Exemplary Embodiment

Figure 9A:
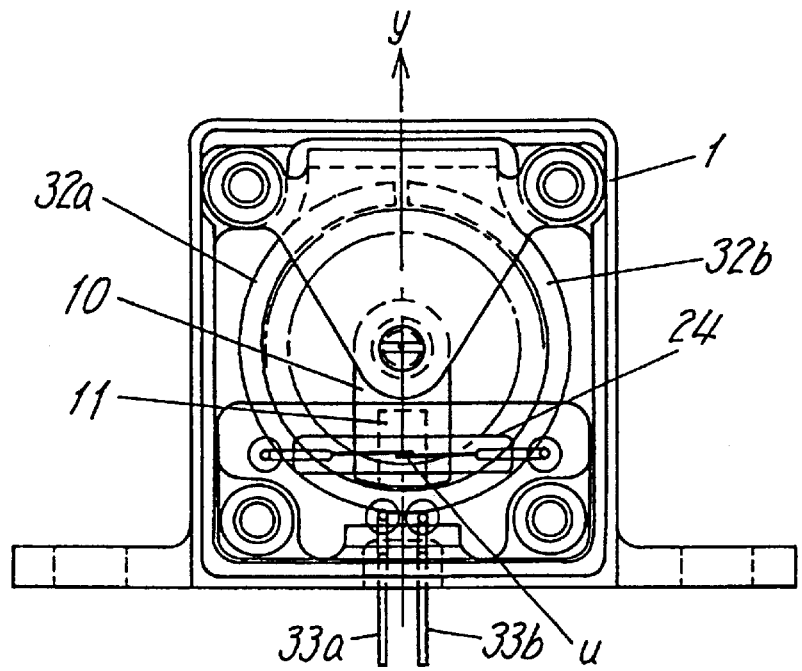
FIG. 9A is a front view, with a cover removed, of a third exemplary embodiment of the present invention.
Figure 9B:
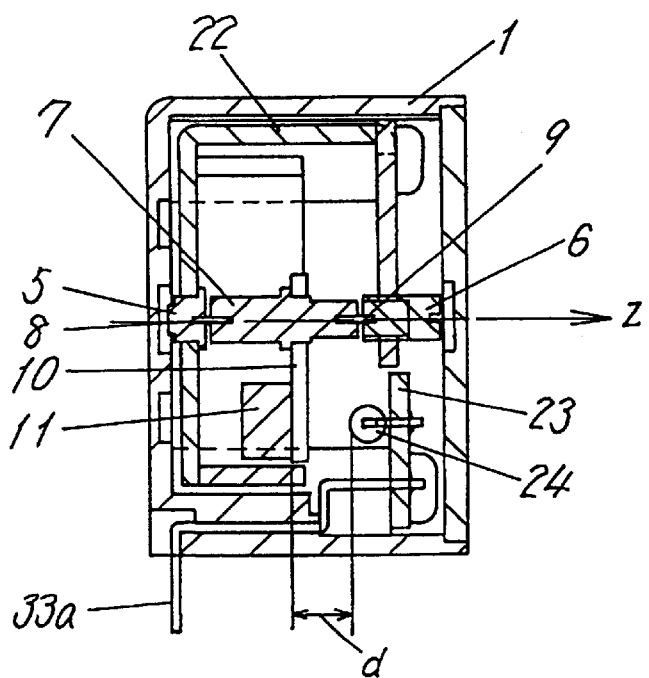
FIG. 9B is a cross sectional view of the third exemplary embodiment of the present invention.

FIG. 9A shows an inclination sensor according to a third exemplary embodiment of the present invention, and FIG. 9B depicts a cross sectional view of the same. In FIGS. 9A and 9B, elements having the same structure as those of FIG. 1A, FIG. 1B, FIG. 8A and FIG. 8B are assigned the same reference numerals and detailed descriptions of these elements are omitted, while only different elements are described hereinafter. In FIGS. 9A and 9B, all elements are the same except for the pendulum and the magnets in the structure of FIGS. 8A and 8B as described in the second exemplary embodiment. That is, the embodiment of FIGS. 9A and 9B adopts the pendulum 10 and the magnet 11 of FIGS. 1A and 1B. A basic open-and-close operation of the reed switch 24 is as follows. When the entire inclination sensor is held in a level, it is in a state of conduction as shown in FIG. 9A. And, the inclination sensor turns into a state of non-conduction (an open mode) when it exceeds a sensible region of the reed switch 24, as it tilts toward either a in clockwise direction or a counterclockwise direction.

4th Exemplary Embodiment

Figure 10:
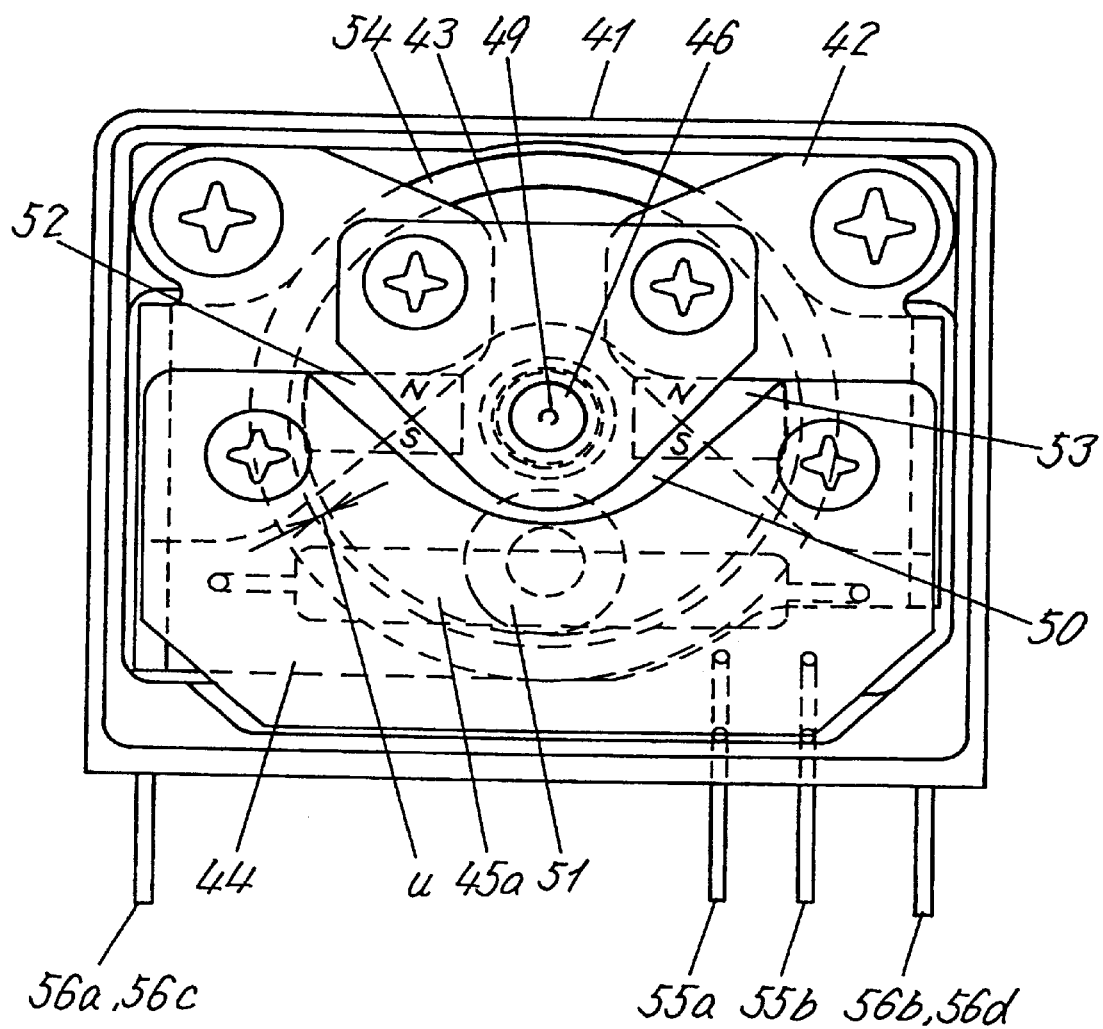
FIG. 10 is a front view, with a cover removed, of a fourth exemplary embodiment of the present invention.
Figure 11:
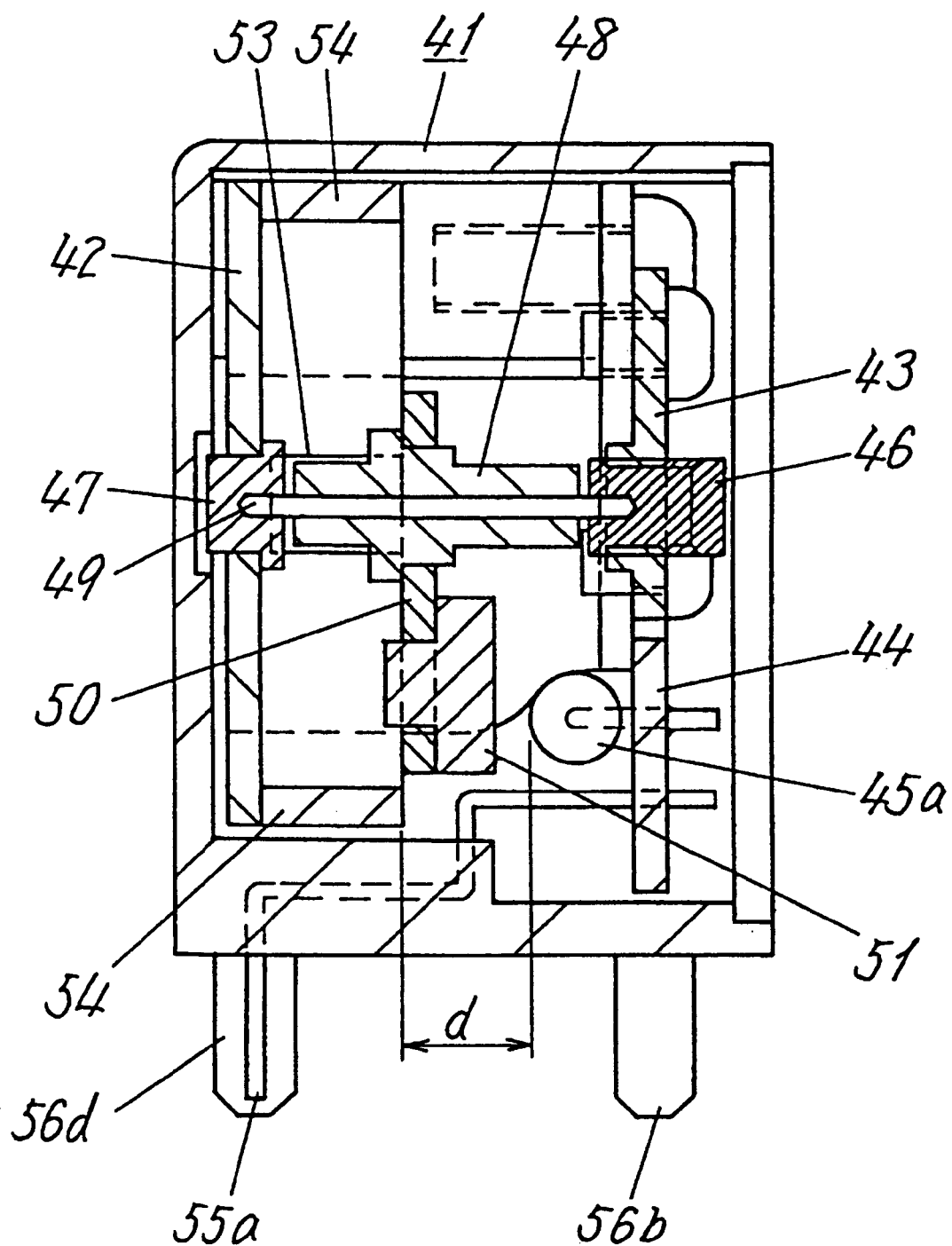
FIG. 11 is a cross sectional view of the fourth exemplary embodiment of the present invention.
Figure 12A:
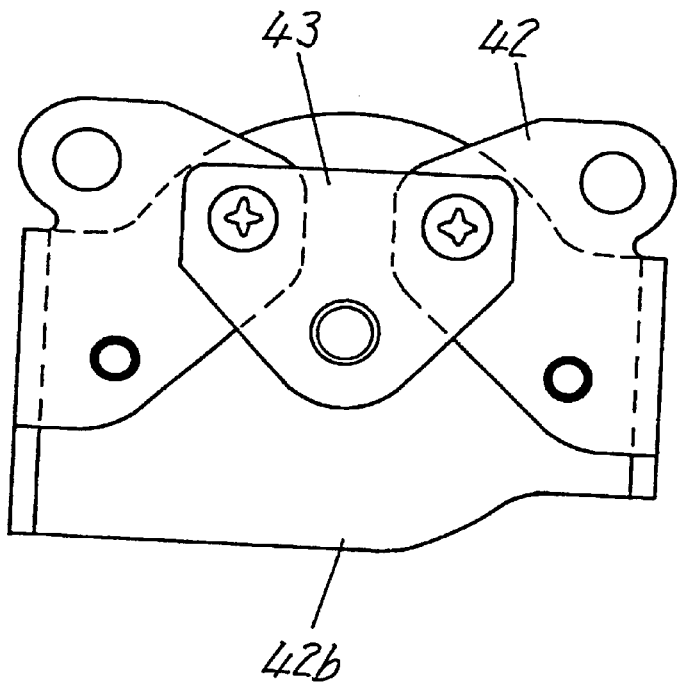
FIG. 12A is a front view of the frame portion of the of the fourth exemplary embodiment of the present invention.
Figure 12B:
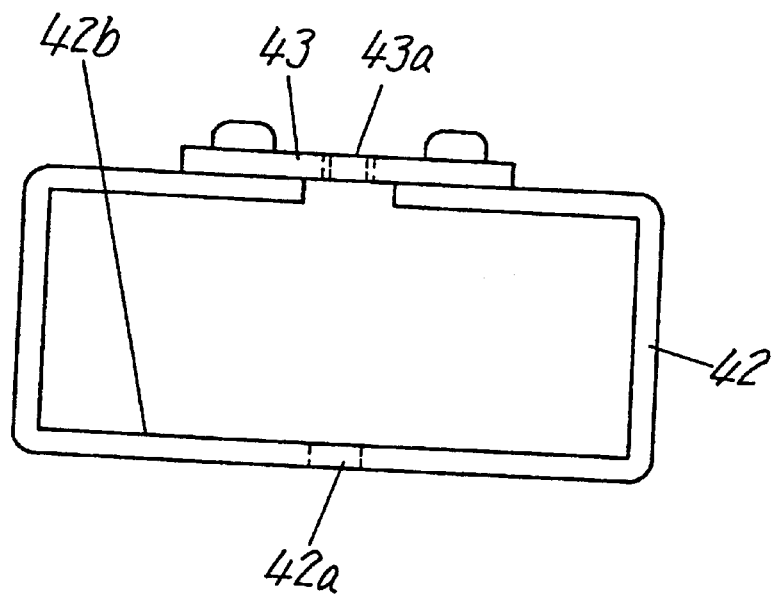
FIG. 12B is a plan view of the frame portion of the fourth exemplary embodiment of the present invention.
Figure 13:
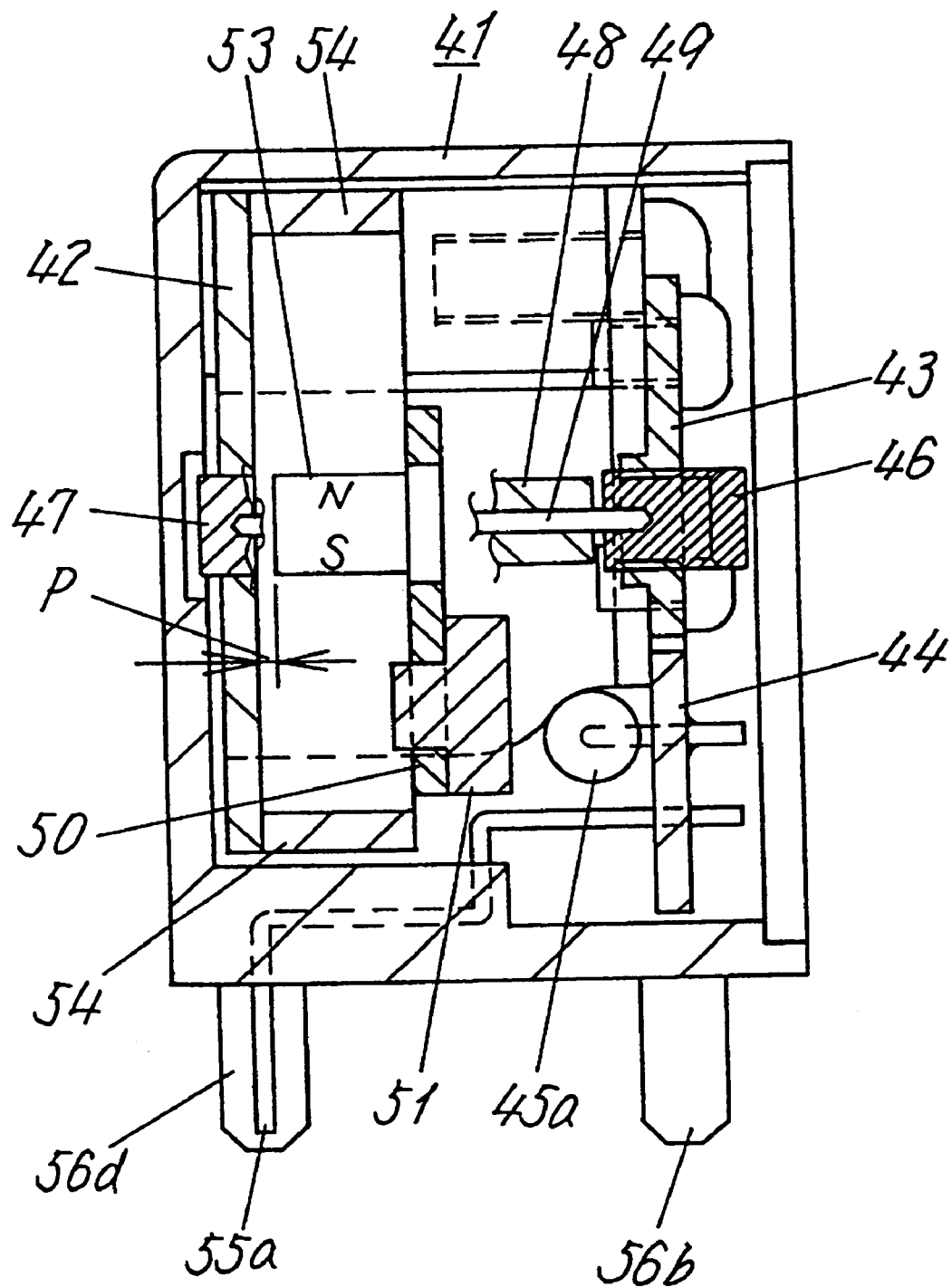
FIG. 13 is a cross sectional view of a rotary shaft and a part of a pin removed showing the positional relationship between a pendulum and a magnet of the fourth exemplary embodiment of the present invention.
Figure 17:
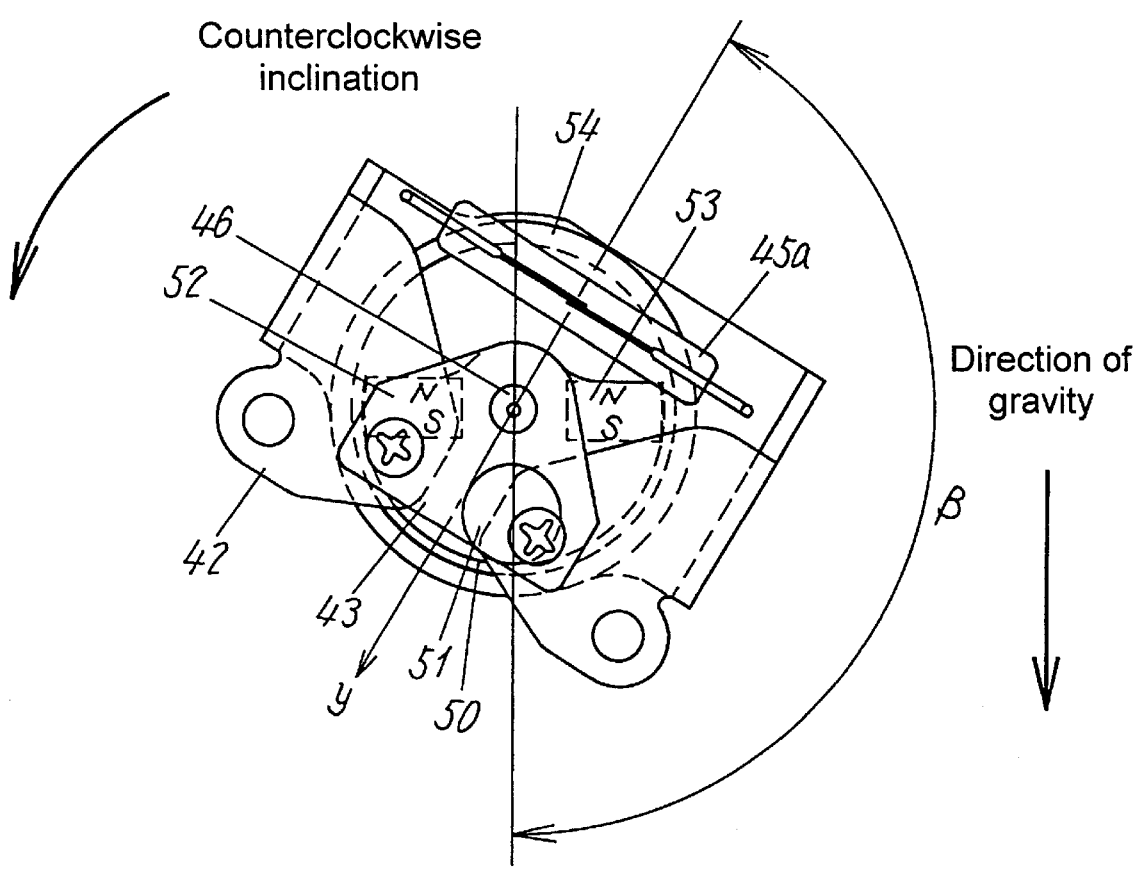
FIG. 17 also shows an open-and-close operation of a reed switch of the fourth exemplary embodiment of the present invention.
Figure 18:
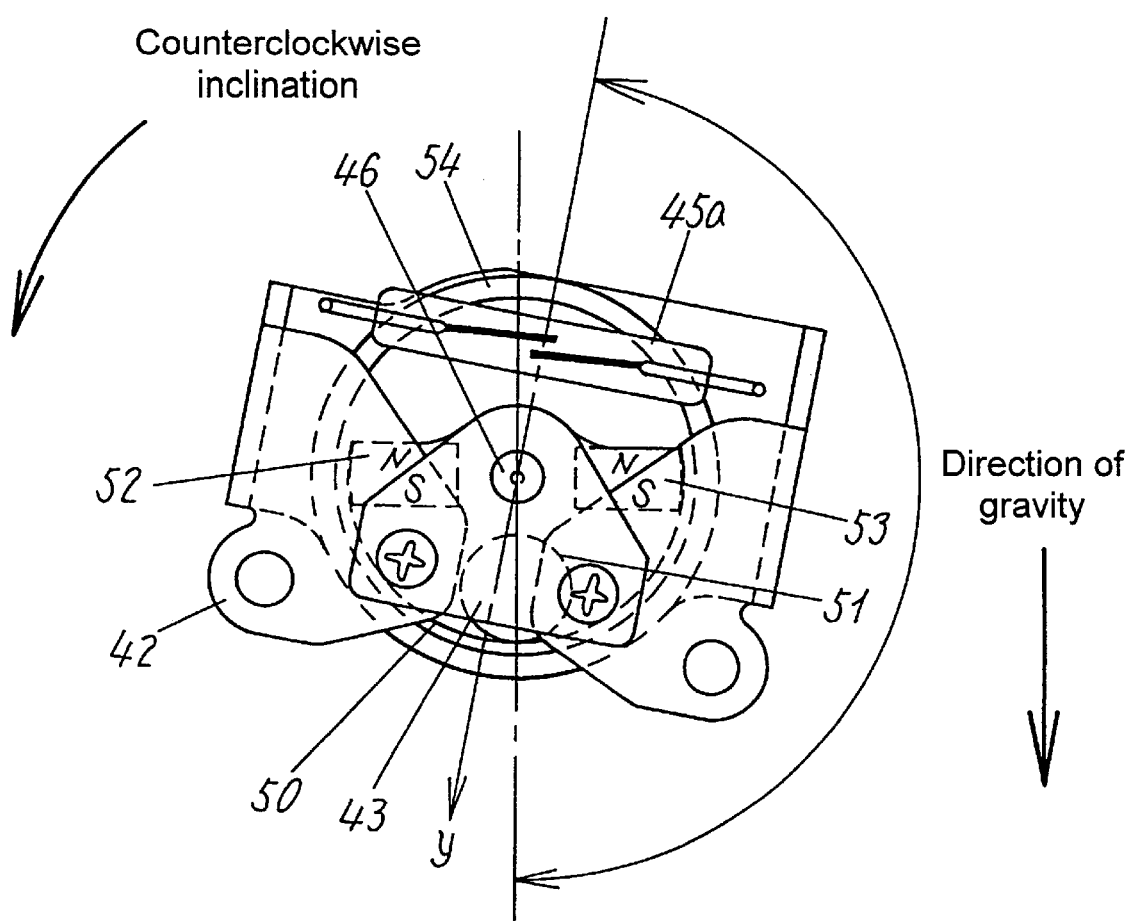
FIG. 18 also shows an open-and-close operation of a reed switch of the fourth exemplary embodiment of the present invention.
Figure 19:
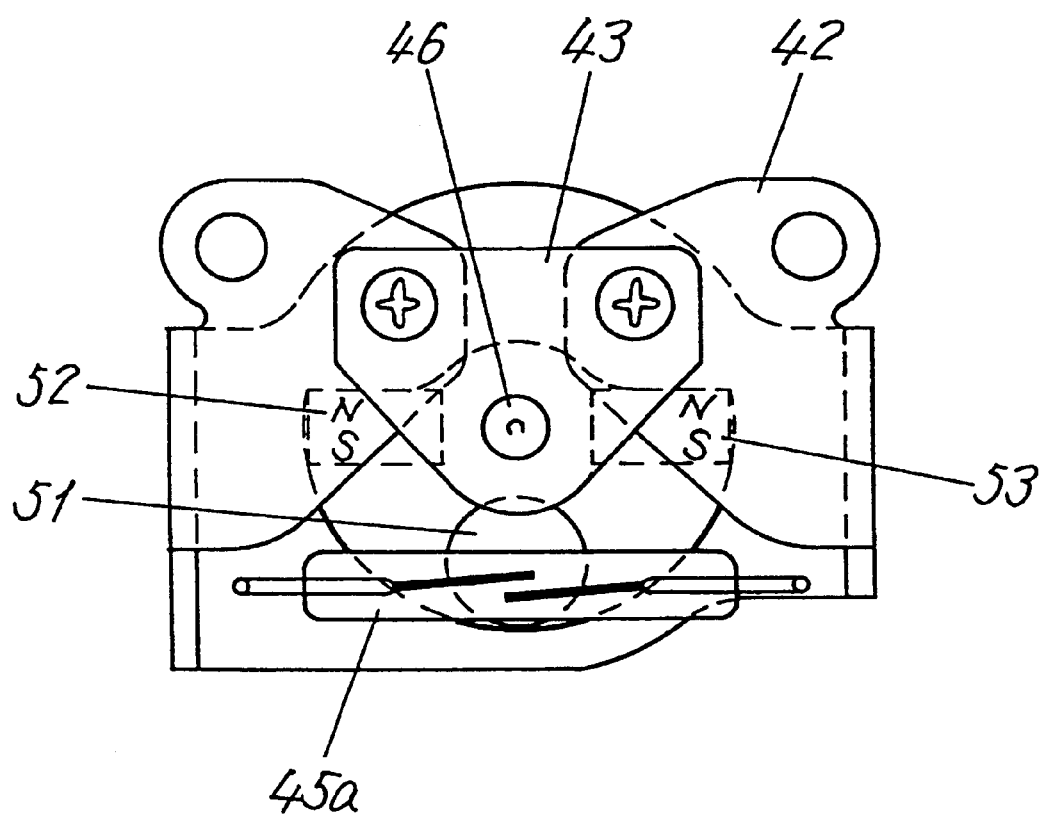
FIG. 19 is a front view an inclination sensor having no flange part according to the fourth exemplary embodiment of the present invention.

FIG. 10 depicts a front view of an inclination sensor, with a cover removed, according to a fourth exemplary embodiment of the present invention, and FIG. 11 depicts a cross sectional view of the same. FIG. 12A depicts a front view of a frame portion of the present embodiment, and FIG. 12B depicts a plan view of the same. FIG. 13 shows a rotary shaft and a part of a pin removed for the purpose of describing a positional relationship between a pendulum and a magnet of the present embodiment. FIG. 14 through FIG. 18 show the open-and-close operation of a reed switch in the present embodiment. FIG. 19 is a front view of an inclination sensor according to the fourth embodiment of the present invention and which does not have a flange part.

FIG. 10 through FIG. 13 depict the following elements: a case 41 defining a fixation body to be fixed to a mounting body of a vehicle, or the like; a first frame 42 made of a material having nonmagnetic and electrically high conductive properties such as copper, aluminum, or the like; a bearing retention hole 42a provided in the first frame 42; a major plane surface 42b of the frame 42; a second frame 43 made of a nonmagnetic material such as brass, aluminum, or the like; a bearing retention hole 43a provided in the second frame 43; a printed wiring board 44; a reed switch 45a; bearings 46 and 47 made of oil impregnated sintered metal, or the like; a rotary shaft 48 made of a nonmagnetic material such as brass, aluminum, or the like; a pin 49 made of piano wire or stainless steel wire; a pendulum 50 made of a nonmagnetic material such as brass, aluminum, or the like; a weight 51 made of a nonmagnetic material such as brass, or the like; samarium-cobalt magnets 52 and 53 defining a magnetic flux generation means; a flange part 54 defining a damping body, made of a material having nonmagnetic and electrically high conductive properties such as copper, aluminum, or the like; terminals 55a and 55b; and mounting terminals 56a, 56b, 56c and 56d.

In the present embodiment, the first frame 42 is mounted to the case 41 with a screw, and the second frame 43 is mounted adjustably to the first frame 42 with a screw. Also, the printed wiring board 44 is mounted to the first frame 42 with a screw. The reed switch 45a is mounted horizontally on the printed wiring board 44. The pin 49 is pierced through and fixed in the rotary shaft 48. The bearing 47 is fixed in the bearing retention hole 42a provided in the first frame 42. The bearing retention hole 43a, provided in the second frame 43, is formed with a female thread and the bearing 46, having a male thread formed on the periphery, is fitted to the female thread. The pin 49 is axially supported by the bearings 46 and 47. The pendulum 50 is fixed to the rotary shaft 48 and has a surface perpendicular to the rotary shaft 48. On the surface, the magnets 52 and 53 are mounted in a manner to face each other with the rotary shaft 48 therebetween. Furthermore, the weight 51 is fixed to the pendulum 50, and the pendulum 50 is rotatable relative to the case 41, the first frame 42 and the second frame 43. Magnetic poles are positioned so that magnetic fluxes are generated in a direction of tangential line of a rotational path of the magnets 52 and 53 relative to the case 41. The flange part 54 of a cylindrical shape is fixed on the major plane surface 42b of the first frame 42. A space "u" is provided between the flange part 54 and the magnets 52 and 53. A space "p" is provided between the major plane surface 42b and the magnets 52 and 53, so that eddy currents are induced in proportion to a relative movement between the parts in order to develop a damping force. Therefore, a stable operation is maintained and undesirable functioning of the reed switch 45a is avoided, since a sufficient damping is realized against external disturbances and bumping vibrations having a high frequency component that are generated during a normal travelling of the vehicle.

A space "d" is provided in a direction along the rotary axis between a rotational path of the magnets 52 and 53 and the reed switch 45a, and the reed switch 45a opens and closes according to the rotational path relative to the magnets 52 and 53. A signal produced by the open-and-close operation of the reed switch 45a is output from the case 41 via the terminals 55a and 55b connected to the printed wiring board 44. Although the pin 49 is 0.6 mm in diameter, it has sufficient strength for the weight of the pendulum 50, since the length of the protrusion from the rotary shaft 48 is short. The pin 49 can rotate smoothly, because it is not only thin in diameter, but also provided with a mirror-finished surface that reduces frictional resistances with the bearings 46 and 47. Therefore, the pendulum 50 moves smoothly relative to the gravitational direction in response to even a small inclination of the vehicle, so as to provide high sensitivity response. The diameter of the pin 49 need not be fixed specifically to 0.6 mm, but is determined in consideration of an overall balance.

Although what has been described in the present embodiment is a structure, in which the pin 49 is pierced through the rotary shaft 48, pins may be separately inserted at both ends of the rotary shaft 48. It is also conceivable to construct the rotary shaft 48 with its diameter reduced at both ends.

Also, the bearing 46 becomes adjustable in a direction perpendicular to the rotary shaft 48 by separating the whole frame into the first frame 42 and the second frame 43, thereby enabling an axial alignment of the rotary shaft 48 at a right angle to the major plane surface 42b of the first frame 42. Moreover, the pin 49 moves smoothly and a reliable signal corresponding to an inclination of the vehicle can be accurately obtained, since both ends of the pin 49 are straightly insertable against the bearings 46 and 47.

In the present embodiment, the first frame 42 is bent in a manner so that each half of its major plane surface 42b is formed in the shape of the letter U and reversed letter U, respectively, enabling the composition of a closed structure by joining each free end portion with screws via the second frame 43. This structure not only increases the strength of the entire frame, but also improves preciseness of the frame as a whole, and reduces a height of the frame.

Furthermore, the first frame 42 composed of copper provides superior performance as a damper with induction of eddy current, and it also enables a reduction of the thickness of the first frame 42 as it provides excellent strength. Besides, there is no increase of components, since the first frame 42 per se serves as a structural body.

Figure 14:
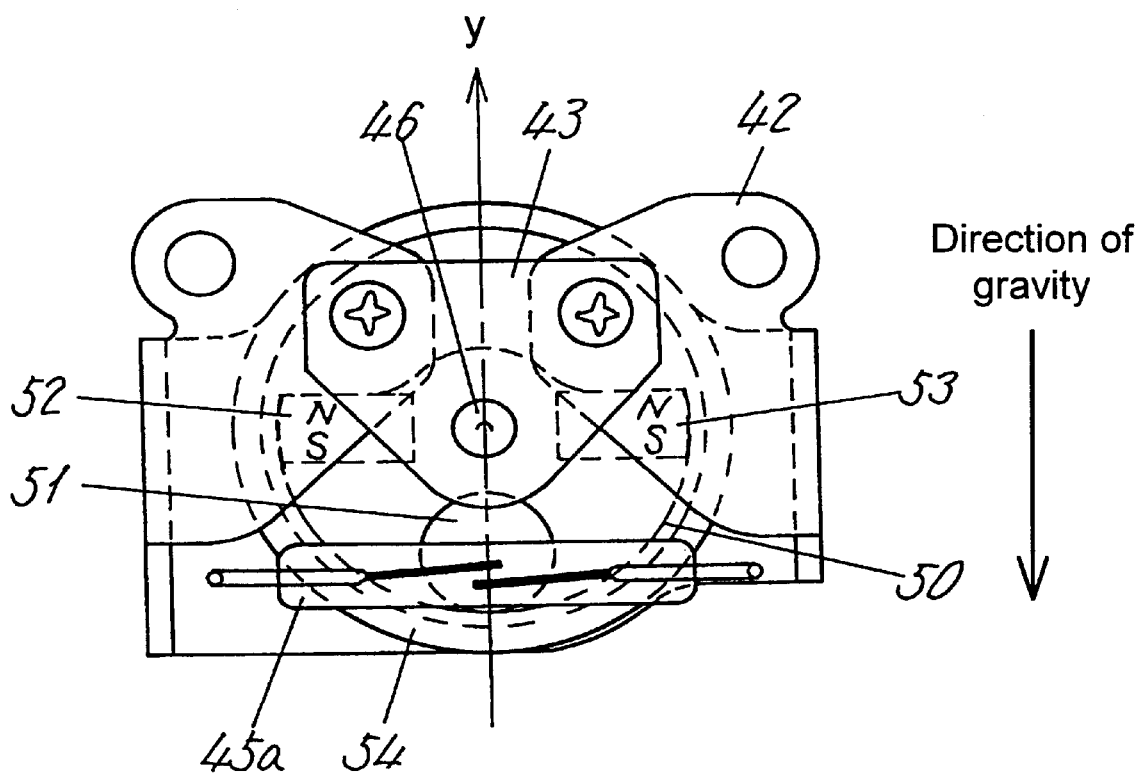
FIG. 14 shows an open-and-close operation of a reed switch of the fourth exemplary embodiment of the present invention.
Figure 15:
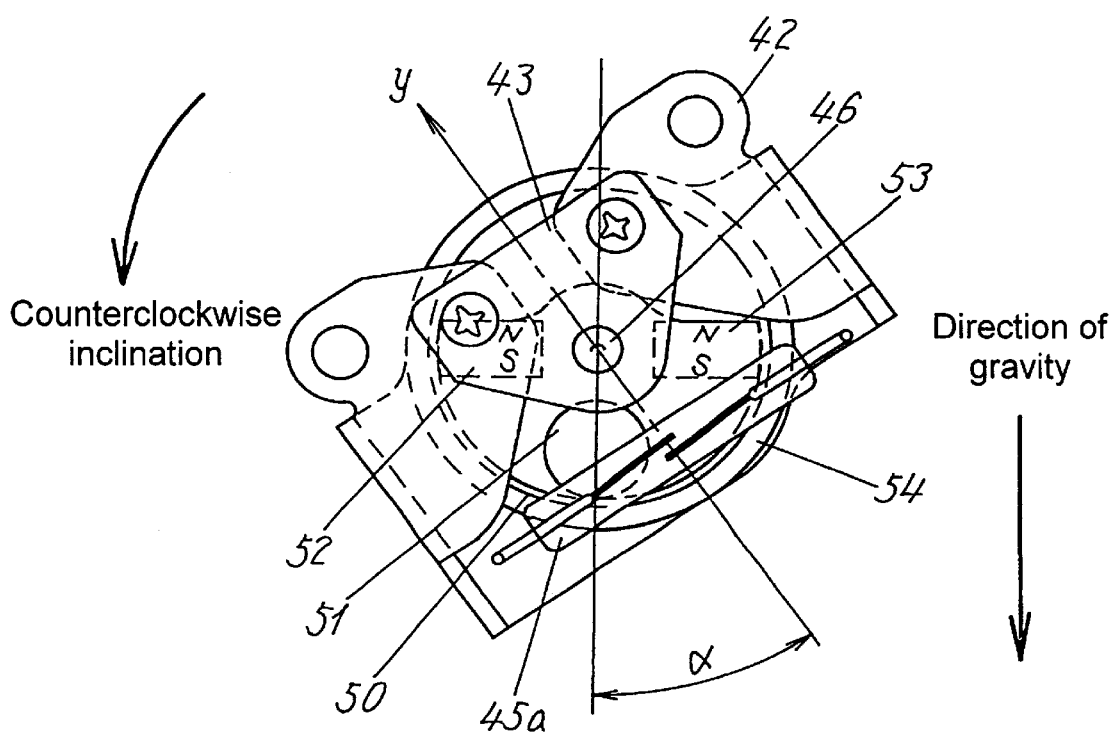
FIG. 15 also shows an open-and-close operation of a reed switch of the fourth exemplary embodiment of the present invention.
Figure 16:
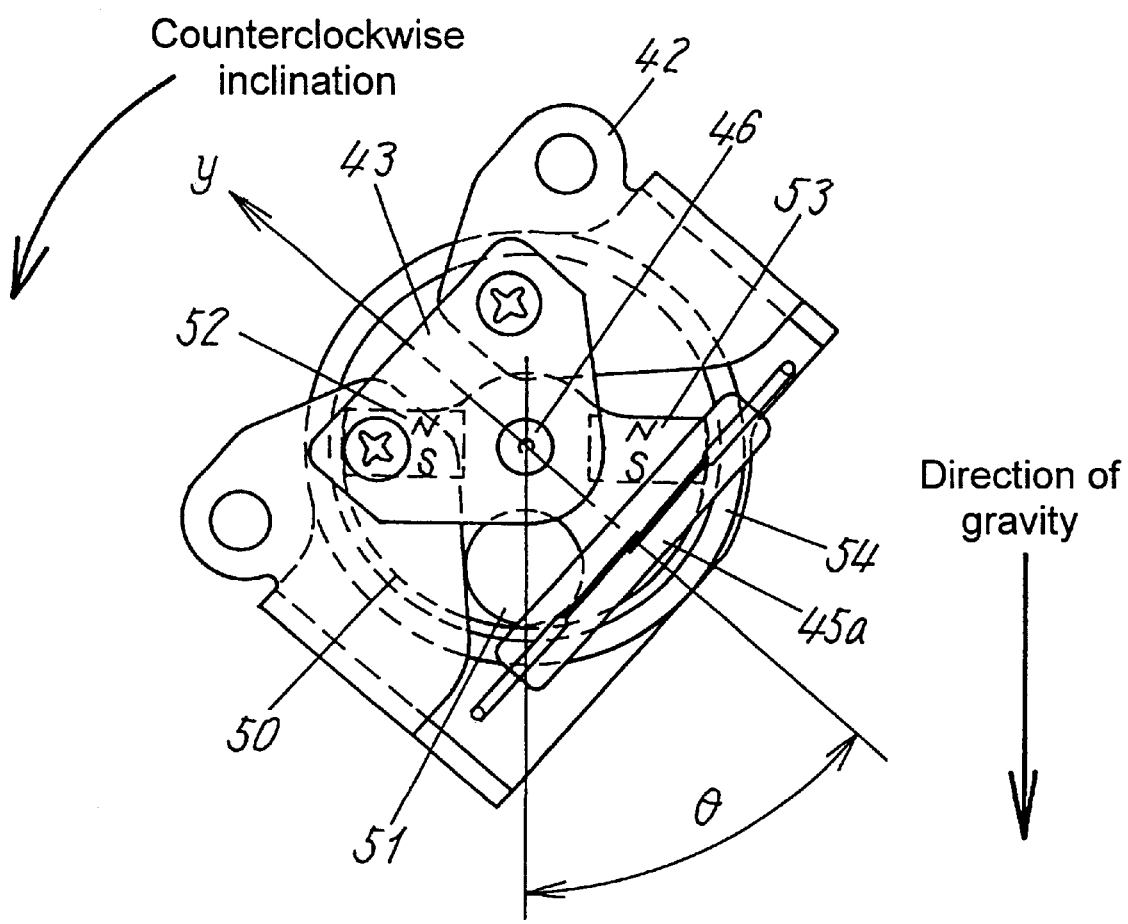
FIG. 16 also shows an open-and-close operation of a reed switch of the fourth exemplary embodiment of the present invention.

An open-and-close operating condition of the reed switch 45a according to the rotational path in relation to the magnets 52 and 53 is described hereinafter by referring to FIG. 14 through FIG. 18. When the entire inclination sensor is kept level, as shown in FIG. 14, a central line (y-axis) of the pendulum 50 is oriented in the direction of gravity. The reed switch 45a is also arranged so that its contact point is located in line with the y-axis under this condition. When the inclination sensor tilts at an angle of "α" which is less than a predetermined angle of "θ" (50 degrees for example), as shown in FIG. 15, the reed switch 45a rotates counterclockwise along with the inclination sensor, which tilts in the counterclockwise direction for instance. This moves the reed switch 45a relatively closer to the magnet 53 on the pendulum, which stays in the direction of gravity, but the contacts remain open due to a deficiency of magnetic force. When the inclination sensor tilts farther to a predetermined angle of "θ" (50 degrees for example), as shown in FIG. 16, a magnetic force of a certain magnitude or more passes through the reed switch 45a to close the contacts. The contacts of the reed switch 45a remain closed thereafter, until the inclination sensor tilts further, exceeding 90 degrees (turning sideways), to an angle of "β" (150 degrees for example), as shown in FIG. 17. The contacts of the reed switch 45a open again if the rotary movement advances farther, as shown in FIG. 18. The inclination sensor is thus able to operate a safety device such as an air bag, or the like during the turning process of passing the angles between "θ" and "β". The magnitude of the energy product of the magnet 53 (or the magnet 52), the space "d" between the magnet 53 (or the magnet 52) and the reed switch 45a, the sensitivity of the reed switch 45a itself, are adjusted in order to cause the contacts of the reed switch 45a to close at the angle "θ" shown in FIG. 16.

Although the present embodiment as described above is an example in which the inclination sensor rotates counterclockwise, it can operate in exactly the same manner when it rotates clockwise.

The present embodiment utilizes a material having non-magnetic and electrically high conductive properties such as copper, aluminum, or the like for the first frame 42. A damper of good quality is provided even with a first frame 42 of a nonmagnetic material, because the rotary shaft 48 moves smoothly since its perpendicularity is adjustable, and a stable damping force is obtainable at any position of the pendulum 50.

The present embodiment as described above is an example, in which the flange part 54 and the major plane surface 42*b* of the first frame 42 are jointly used as the damping bodies. An eddy current induced only in the major plane surface 42*b* of the first frame 42 by the magnets 52 and 53 can produce a damping force without the flange part 54 as shown in FIG. 19.

Moreover, the described embodiment is an example, wherein the magnet 53 (or the magnet 52) stays farther away from the reed switch 45*a* to keep the contacts of the reed switch 45*a* open, i.e. normally open (NO) type, when the inclination sensor is maintained horizontal. It is also possible to construct the inclination sensor in the contrary so that the magnet 53 (or the magnet 52) comes closest to the reed switch 45*a* to keep the contacts of the reed switch 45*a* closed, i.e. normally closed (NC) type, when the inclination sensor is maintained horizontal.

5th Exemplary Embodiment

Figure 20:
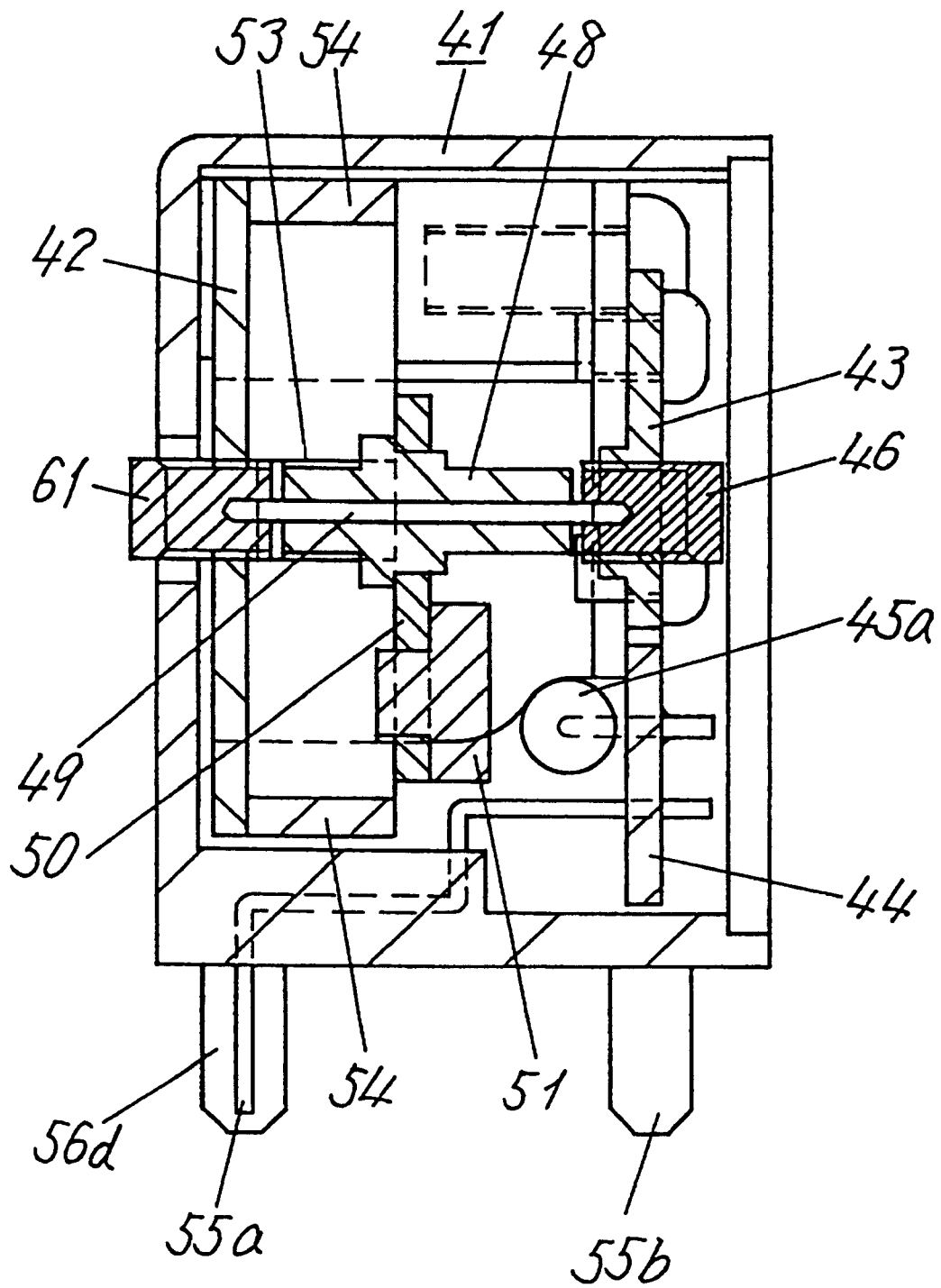
FIG. 20 is a cross sectional view of a fifth exemplary embodiment of the present invention.

FIG. 20 is a cross sectional view of an inclination sensor according to a fifth exemplary embodiment of the present invention. In FIG. 20, elements having the same structure as those of FIG. 10 through FIG. 13 are assigned the same reference numerals and detailed descriptions of these elements are omitted, while only different elements are described hereinafter. A bearing 61 is shown in FIG. 20.

The bearing retention hole 42*a* in the first frame 42 is formed with a female thread in the same manner as the bearing retention hole 43*a* in the second frame 43, and the bearing 61, having a male thread in its periphery, is fitted to the female thread. The rotary shaft 48 and the pendulum 50 mounted with the magnets 52 and 53 are movable by the bearings 46 and 61 in an axial direction of the rotary shaft 48. A space "p" between the magnets 52 and 53 (refer to FIG. 13) and the major plane surface 42*b* of the first frame 42 is freely alterable. Accordingly, this enables an adjustment of the damping force to the pendulum 50 arbitrarily.

6th Exemplary Embodiment

Figure 21:
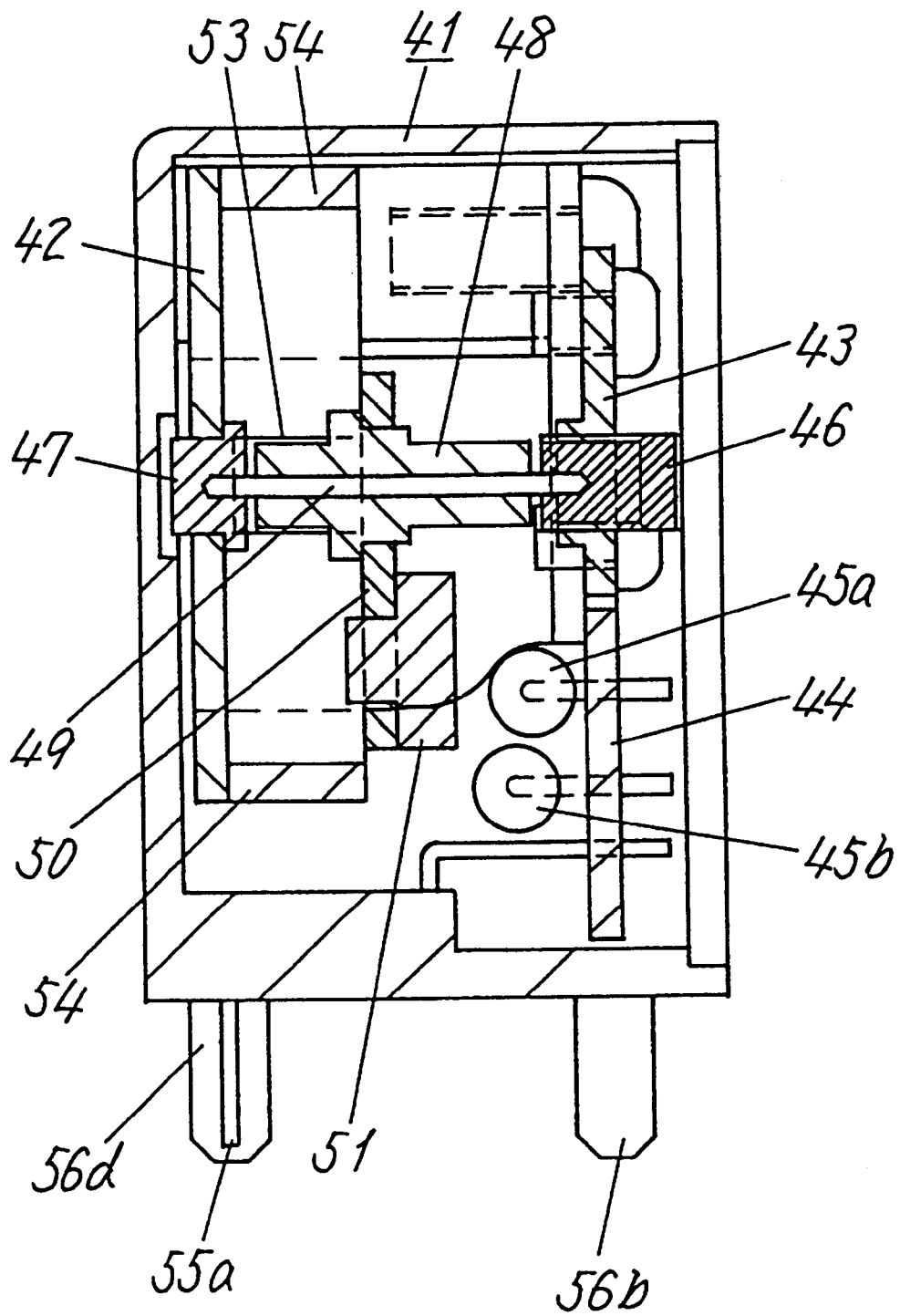
FIG. 21 is a cross sectional view of a sixth exemplary embodiment of the present invention.

FIG. 21 is a cross sectional view of an inclination sensor according to a sixth exemplary embodiment of the present invention. In FIG. 21, elements having the same structure as those of FIG. 10 through FIG. 13 are assigned the same reference numerals and detailed descriptions of these elements are omitted, while different elements are described hereinafter. A reed switch 45*b* is shown in FIG. 21.

In FIG. 21, the reed switches 45*a* and 45*b* are arranged side by side, in a manner so that their sensitivities are approximately equal, against the magnets 52 and 53, and are connected in parallel. With this structure, the reliability of the inclination sensor is substantially improved, since either one of the reed switches 45*a* and 45*b* functions even if the other one fails to function due to a defect.

Although the described embodiment is an example utilizing two reed switches, it is possible to use as many as the case 41 can contain.

As has been described, because of the divided frames, the present invention facilitates axial alignment of the rotary member with the bearing and improves fitting accuracy. This provides smooth rotation, improves the detecting accuracy, and suppresses external disturbances and bumping vibration components of the vehicle at the same time, since it has a damping body.

Also, because of the divided frames, the present invention not only facilitates the axial alignment of the rotary member with the bearing, improves fitting accuracy and provides smooth rotation, but it also improves the detecting accuracy by producing a damping effect between the magnet on the pendulum and at least one of the divided frames, which has a good electrical conductivity, so as to suppress external disturbances such as vibrations and bumping.

Also, because of the divided frames, the present invention not only facilitates the axial alignment of the rotary member with the bearing, improves fitting accuracy and provides smooth rotation, but it also further improves the detecting accuracy by increasing the effect of suppressing the external disturbances with an additional damping force of the damping body on top of the damping force between the divided frame, having good electrical conductivity, and the magnet.

The detecting accuracy is also improved due to suppression of external disturbances by a damping force between the frame, having good electrical conductivity, and the magnetic flux generation means.

The detecting accuracy is further improved due to an increased effect of suppressing the external disturbances with an additional damping force of the damping body on top of the damping force between the divided frame, having good electrical conductivity, and the magnet.

7th Exemplary Embodiment

Figure 22A:
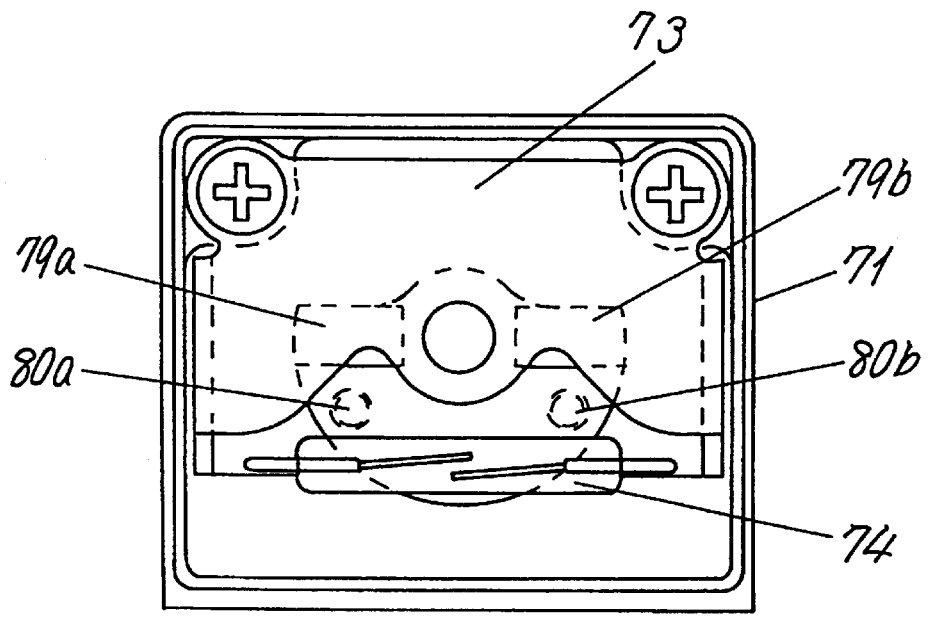
FIG. 22A is a front view, with a cover removed, of a seventh exemplary embodiment of the present invention.
Figure 22B:
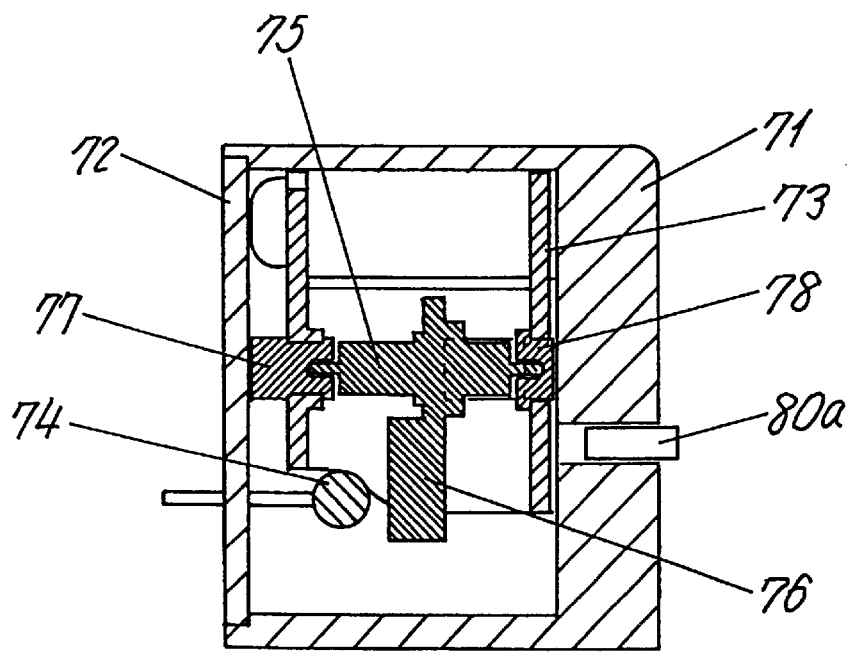
FIG. 22B is a cross sectional view of the seventh exemplary embodiment of the present invention.

FIG. 22A depicts a front view of an inclination sensor according to a seventh exemplary embodiment of the present invention, and FIG. 22B depicts a cross sectional view of the same.

FIGS. 22A and 22B depict the following elements: a case 71 defining a fixation body to be fixed to a mounting body of a vehicle, or the like; a cover 72 for hermetically sealing the case 71; a frame 73, made of a nonmagnetic material, and fixed to the case 71; a reed switch 74 mounted on the cover 72; a rotary shaft 75; a pendulum 76, made of a nonmagnetic material, and fixed to the rotary shaft 75; bearings 77 and 78, made of oil impregnated sintered metal, for rotatably supporting the rotary shaft 75; magnets 79*a* and 79*b* defining magnetic flux generation means adhered to the pendulum 76; and magnetism adjusting bars 80*a* and 80*b* defining magnetic damping adjusting devices attached adjustably in the direction of depth of the case 71 at two locations on a back of the case 71 corresponding to a rotational path of the magnets 79*a* and 79*b*. In FIG. 22A, the inclination sensor is shown with the cover 72 of the case 71 removed.

In the present embodiment, a surface of the pendulum 76, perpendicular to the rotary shaft 75, has a semicircular shape. The magnets 79*a* and 79*b* are attached at two locations of a linear part at a perimeter of the semicircle, and the pendulum 76 is normally oriented in the direction of gravity. The reed switch 74, mounted on the cover 72, tilts along with an inclination of the vehicle, and the reed switch 74 gets closer to the magnet 79*a* or 79*b* attached to the pendulum 76. With this movement, the reed switch 74 turns into an ON (closed) state, so that an inclination angle can be detected.

A damping mechanism is necessary in order to prevent an erroneous operation, however, because there is a possibility of erroneous operation with the above structure alone due to resonance, or the like of the pendulum 76 caused by an external disturbance that occurs during traveling of the vehicle.

In the present structure, the magnetism adjusting bars 80a and 80b, made of austenitic stainless steel having weak magnetism, are arranged, as the magnetic damping adjusting devices, on a back of the case 71 corresponding to a rotational path of the magnets 79a and 79b, in a manner to correspond with each of the right and left magnets 79a and 79b attached to the pendulum 76. Attractive forces of the magnets 79a and 79b to the magnetism adjusting bars 80a and 80b enable it to prevent erroneous operation due to resonance, or the like of the pendulum 76. Moreover, since the position of magnetism adjusting bars 80a and 80b are adjustable in the direction of depth of the back of the case 71, an optimum damping force is attainable without impairing the rotational performance by adjustment of the attractive forces of the magnets 79a and 79b.

The present embodiment employs a weak magnetic material, such as the austenitic stainless steel, for the magnetism adjusting bars 80a and 80b. A reason for that is to reduce a dimension in the depth direction of the sensor by reducing the space between the magnetism adjusting bars 80a and 80b and the magnets 79a and 79b. If a ferromagnetic material such as iron is used for the magnetism adjusting bars 80a and 80b, the rotational performance is impaired because the attractive forces with the magnets 79a and 79b become exceedingly large when the space to the magnets 79a and 79b is reduced. A ferromagnetic material can be used for the magnetism adjusting bars 80a and 80b by providing a large space between the magnetism adjusting bars 80a and 80b and the magnets 79a and 79b, as a matter of course, if there is no demand for reduction in size with regard to a shape of the sensor.

8th Exemplary Embodiment

Figure 23A:
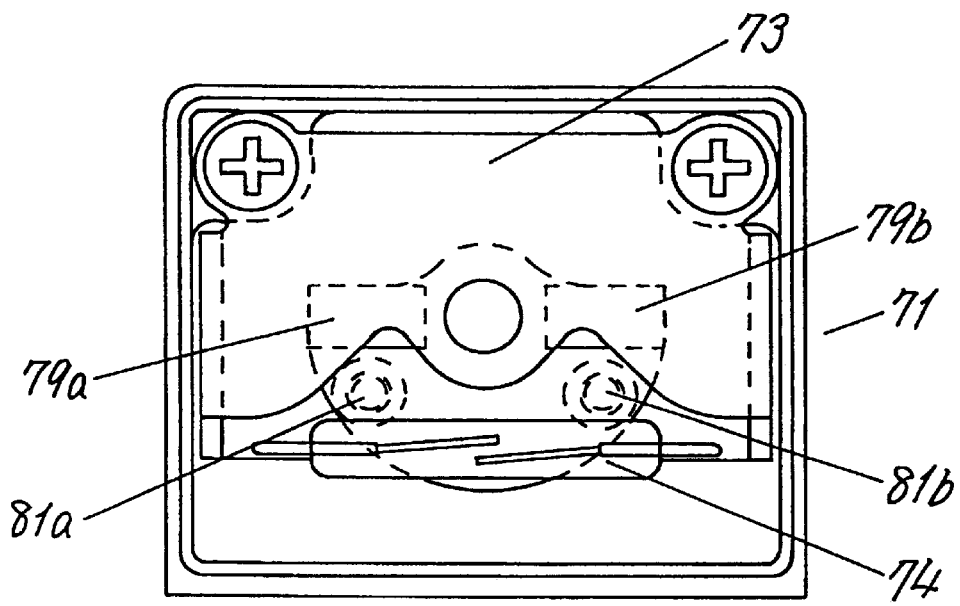
FIG. 23A is a front view, with a cover removed, of an eighth exemplary embodiment of the present invention.
Figure 23B:
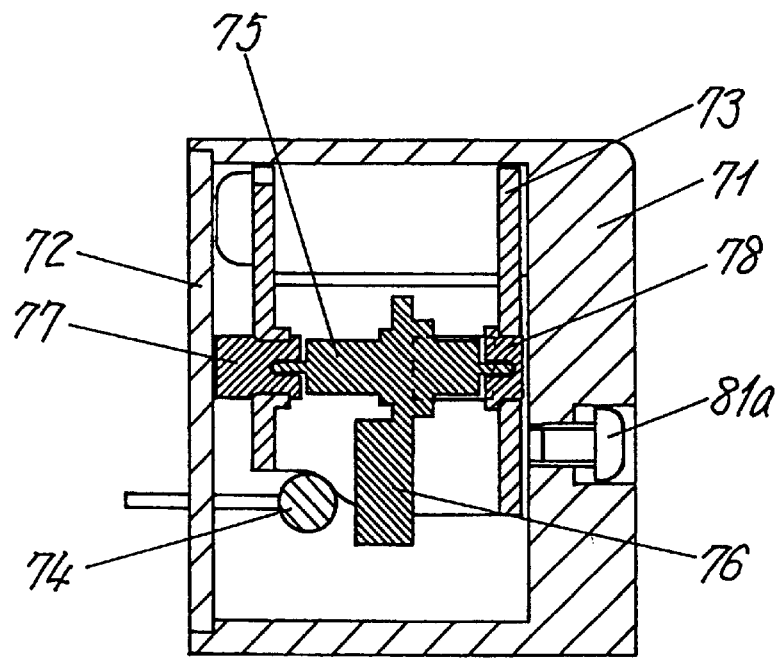
FIG. 23B is a cross sectional view of the eighth exemplary embodiment of the present invention.

FIG. 23A depicts a front view of an inclination sensor according to an eighth exemplary embodiment of the present invention, and FIG. 23B depicts a cross sectional view of the same. In FIGS. 23A and 23B, elements having the same structure as those of FIG. 22A and FIG. 22B are assigned the same reference numerals and detailed descriptions of these elements are omitted, while different elements are described hereinafter. In FIGS. 23A and 23B, magnetism-adjusting screws 81a and 81b are shown as magnetic damping adjusting devices.

The above structure enables easy adjustment of the damping force by turning the magnetism adjusting screws 81a and 81b from behind the case 71 toward a front.

9th Exemplary Embodiment

Figure 24:
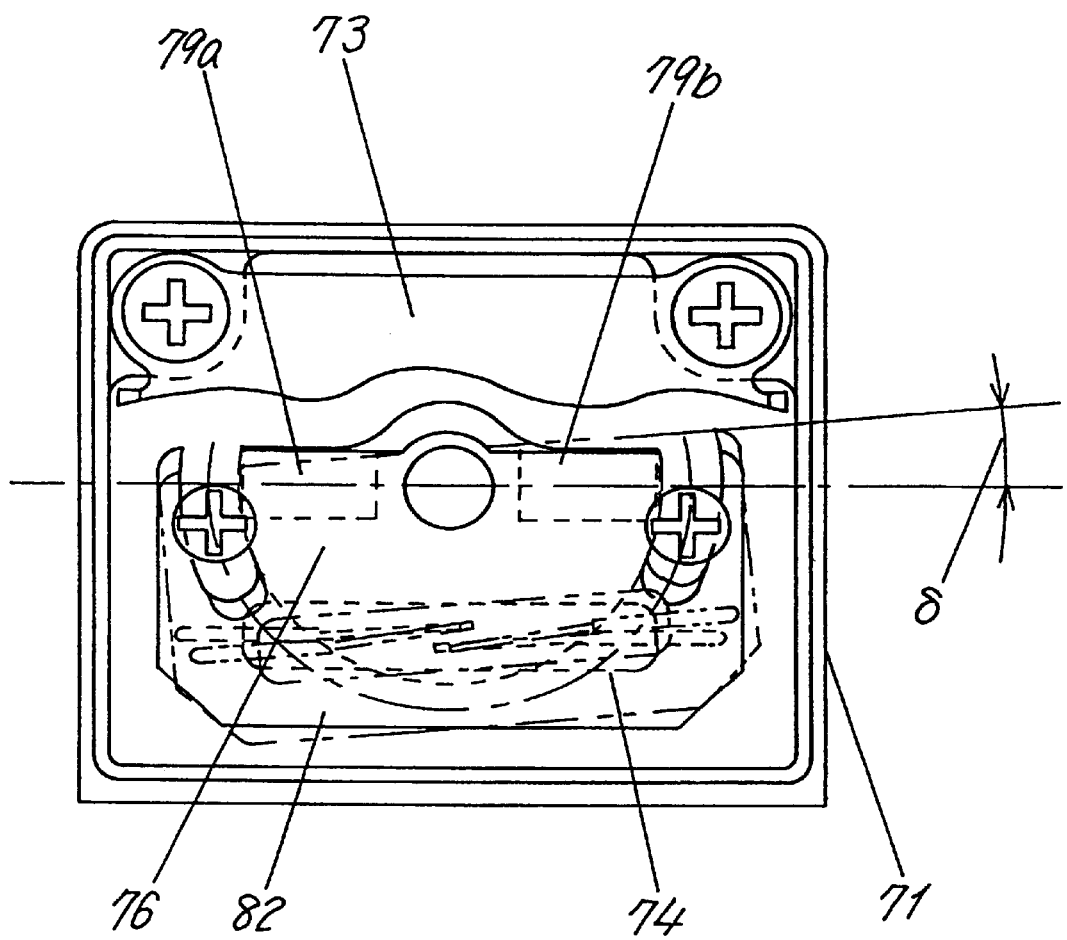
FIG. 24 is a front view, with a cover removed, of a ninth exemplary embodiment of the present invention.

FIG. 24 depicts a front view of an inclination sensor according to a ninth exemplary embodiment of the present invention. In FIG. 24, elements having the same structure as those of FIG. 22A are assigned the same reference numerals and detailed descriptions of these elements are omitted, while different elements are described hereinafter. FIG. 24 depicts a printed wiring board 82, which is rotatable around the rotary shaft 75, and the reed switch 74 is mounted on a surface of the printed wiring board 82.

The above structure enables detection in both clockwise and counterclockwise inclinations at the same angle by compensating a difference in the detecting angles between the clockwise and the counterclockwise inclinations caused by a dispersion in properties of the two magnets 79a and 79b mounted on the pendulum 76, by rotating the printed wiring board 82. If a detecting angle of the reed switch 74 is "θ+δ" in the counterclockwise inclination of the sensor, and "θ−δ" in the clockwise inclination, under a condition that the reed switch 74 mounted on the printed wiring board 82 is at a horizontal level as shown in FIG. 24, the detecting angle can be adjusted to "θ" in both the clockwise and the counterclockwise inclinations without impairing the sensitivity by moving the printed wiring board 82 rotationally by an angle of "δ" to the counterclockwise direction, as depicted by a dotted line.

An optimum damping force is attainable, without impairing the rotational performance, by using the magnetism adjusting bars 80a and 80b described in the seventh exemplary embodiment, in combination with the above structure.

10th Exemplary Embodiment

Figure 25A:
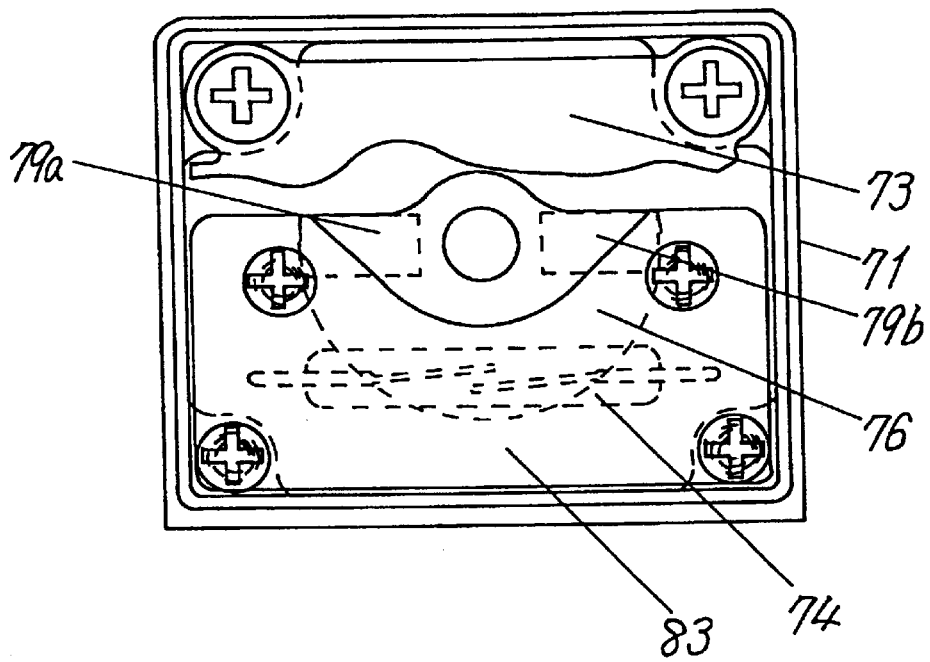
FIG. 25A is a front view, with a cover removed, of a tenth exemplary embodiment of the present invention.
Figure 25B:
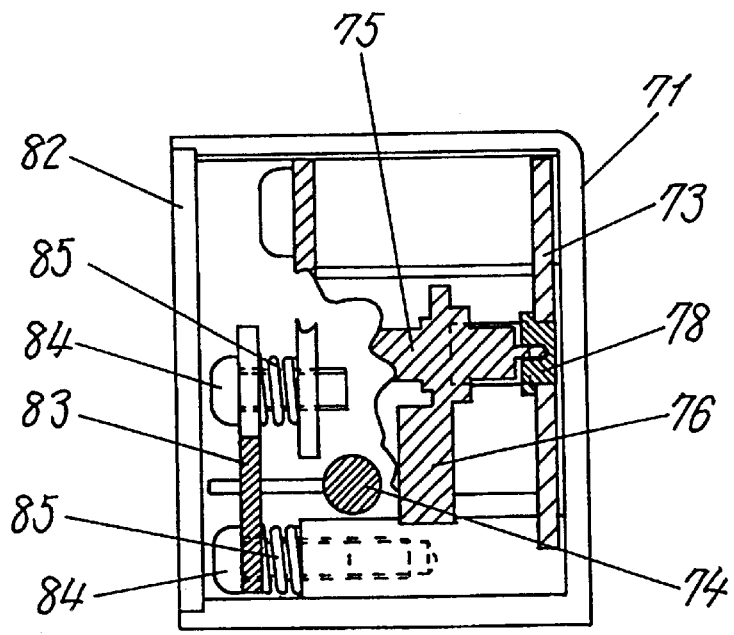
FIG. 25B is a cross sectional view of the tenth exemplary embodiment of the present invention.

FIG. 25A depicts a front view of an inclination sensor according to a tenth exemplary embodiment of the present invention, and FIG. 25B depicts a cross sectional view of the same. In FIGS. 25A and 25B, elements having the same structure as those of FIG. 22A and FIG. 22B are assigned the same reference numerals and detailed descriptions of these elements are omitted, while different elements are described hereinafter. In FIGS. 25A and 25B, numeral 83 represents a printed wiring board, which is adjustable in an axial direction of the rotary shaft 75, and is mounted to the case 71 and the frame 73 with a screw 84, defined as a positional adjustment mechanism, through a spring 85 constituting the positional adjustment mechanism. A reed switch 74 is mounted on a surface of the printed wiring board 83.

The above structure enables obtaining a desired detecting angle by varying the sensitivity with a positional adjustment of the printed wiring board 83 in an axial direction of the rotary shaft 75 so as to eliminate a difference from the desired detecting angle due to a dispersion in performance of the magnets 79a and 79b mounted on the pendulum 76.

In FIGS. 25A and 25B, tightening the screw 84 fixing the printed wiring board 83 moves the reed switch 74 mounted on the printed wiring board 83 closer to the magnets 79a and 79b mounted on the pendulum 76, so as to increase the detection sensitivity. That is, the detecting angles become smaller in both the clockwise and counterclockwise directions. On the contrary, loosening the screw 84 fixing the printed wiring board 83 moves the reed switch 74 mounted on the printed wiring board 83 away from the magnets 79a and 79b mounted on the pendulum 76, so as to decrease the detection sensitivity. This means that the detecting angles become greater in both the clockwise and the counterclockwise directions. As described, a desired detecting angle can be attained by adjusting the position of the printed wiring board 83 in an axial direction of the rotary shaft 75.

An even higher accuracy of the detecting angle is possible by using a balance adjustment mechanism for the detecting angles between the clockwise and counterclockwise directions described in connection with the ninth exemplary embodiment, in combination with the above structure.

It is also possible that an optimum damping force is attainable without impairing the rotational performance by using the magnetic damping adjusting device described in connection with the seventh exemplary embodiment, in combination with the above structure.

11th Exemplary Embodiment

Figure 26:
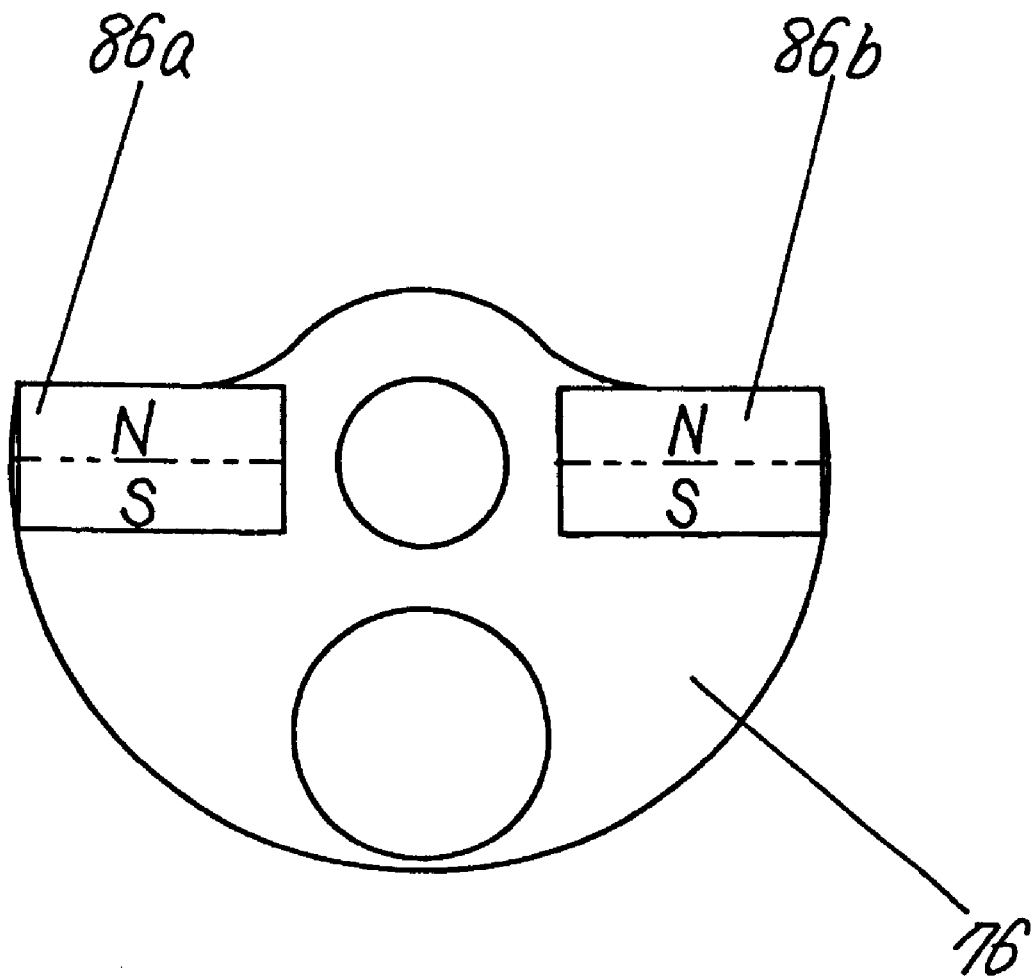
FIG. 26 is a front view of a pendulum of an eleventh exemplary embodiment of the present invention.

FIG. 26 is a front view of a pendulum 76 according to an eleventh exemplary embodiment of the present invention.

Magnets 86*a* and 86*b* of a samarium-cobalt system are shown in FIG. 26.

The above structure can achieve a reduction of power consumption as well as a reduction in size, since the magnetic flux generation means are the magnets 86*a* and 86*b*, which do not require a supply of external energy, unlike an electromagnet. Also, because the samarium-cobalt magnets 86*a* and 86*b* have extremely stable magnetic characteristic relative to temperature, a variation of the detecting angle of the reed switch 74 against ambient temperature can be better controlled.

Although the described embodiment is provided with samarium-cobalt magnets 86*a* and 86*b*, rare-earth magnets of other kinds or ferrite magnets can be utilized, although they are relatively inferior in their temperature characteristics.

12th Exemplary Embodiment

An inclination sensor according to a twelfth exemplary embodiment of the present invention differs from that of the eleventh exemplary embodiment, in that the magnets 86*a* and 86*b* are subjected to a heat treatment at a temperature equal to or higher than a maximum serviceable temperature of the sensor.

The above structure is able to prevent a deterioration of the magnetic force of the magnets 86*a* and 86*b* due to heat during actual use, and maintain a high reliability, because the magnets have been heat-treated in advance at the temperature equal to or higher than the maximum serviceable temperature of the sensor. In addition, this enables adjusting the detecting angle in a direction of widening, because an increase of the heat treatment temperature lowers the magnetic force. The details are described hereinafter.

Since the maximum serviceable temperature of the sensor of the present exemplary embodiment is 110° C., the heat treatment temperature is set at 110° C. in order to prevent the deterioration of magnetic force within the use temperature. When the sensor, which has been heat-treated as described above, has been heat-treated again at 120° C., the detecting angle has widened by approximately 1.5°. The detecting angle widens farther when heat-treated at 130° C., and there are changes in a linear proportion to an increase of the heat treatment temperature. If the detecting angle is small after assembly of a sensor, it can be adjusted to a desired detecting angle by subjecting it to the heat treatment at a temperature of 110° C. or higher, by using this phenomenon.

13th Exemplary Embodiment

Figure 27A:
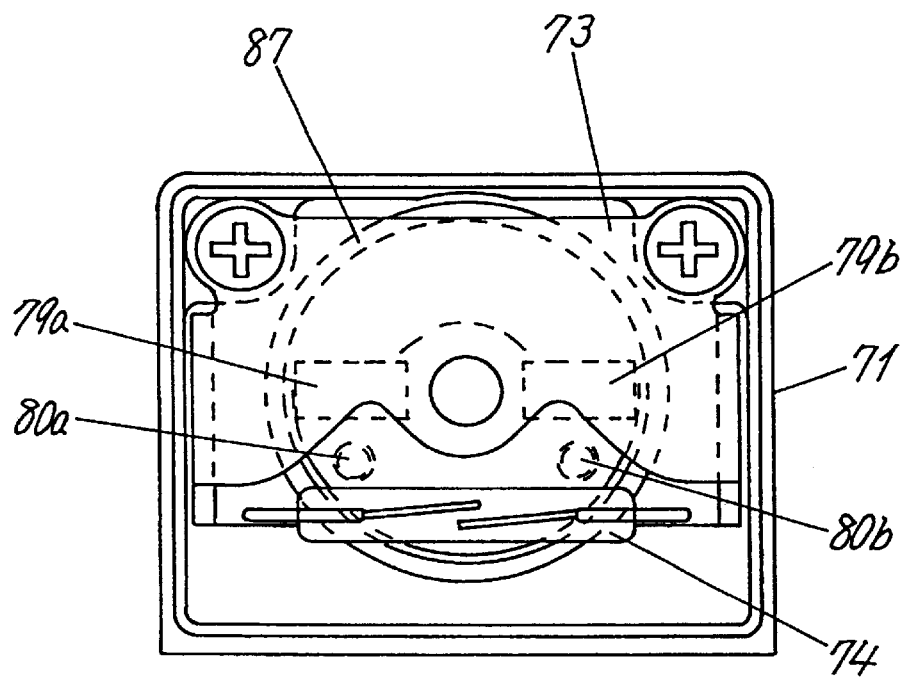
FIG. 27A is a front view, with a cover removed, of a thirteenth exemplary embodiment of the present invention.
Figure 27B:
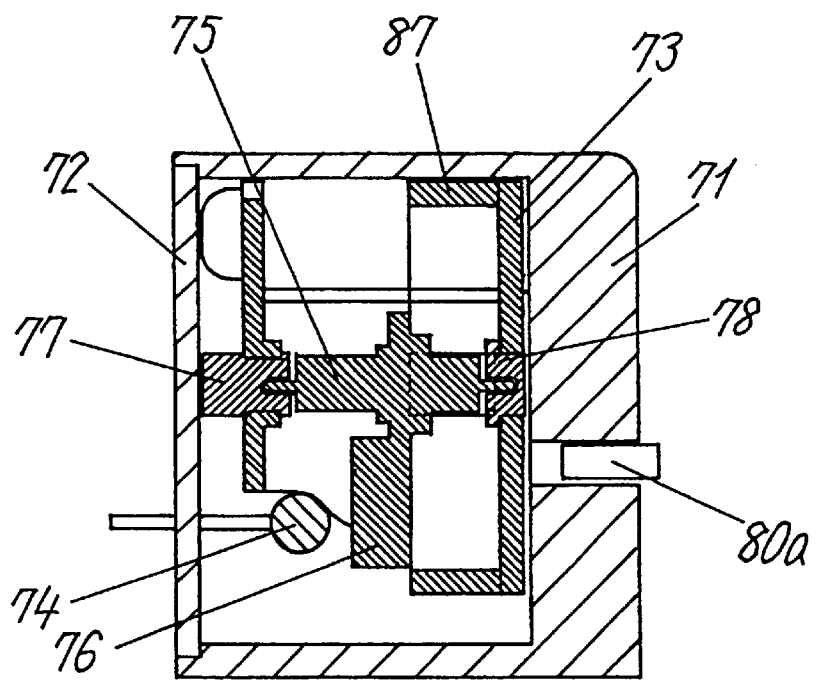
FIG. 27B is a cross sectional view of the thirteenth exemplary embodiment of the present invention.

FIG. 27A depicts a front view of an inclination sensor according to a thirteenth exemplary embodiment of the present invention, and FIG. 27B depicts a cross sectional view of the same. In FIGS. 27A and 27B, elements having the same structure as those of FIG. 22A and FIG. 22B are assigned the same reference numerals and detailed descriptions of these elements are omitted, while different elements are described hereinafter. In FIGS. 27A and 27B, a flange part 87 in a cylindrical shape made of copper or aluminum is arranged around the pendulum 76, and fixed to the frame 73.

With the above structure, an eddy current is induced in the flange part 87 due to relative movement between the magnets 79*a* and 79*b* and the flange part 87, functioning as a damping force. Since the damping force due to the eddy current is in proportion to the relative velocity of the magnets 79*a* and 79*b* to the flange part 87, it generates scarcely any damping force in an inclination of slow movement, so as to enables a high responsivity. Also it can prevent erroneous operation, due to a resonance of the pendulum 76, because it generates a large damping force against vibrations of relatively high frequency caused by external disturbances of the vehicle. Preferably, a material of low electric resistance such as copper and aluminum is used in order to attain a large damping force, since the damping force due to the eddy current becomes greater as the electric resistance of the material for the flange part 87 is smaller.

Since there is scarcely any damping force generated at low frequency, an optimum damping force can be maintained in a region of low frequency by using together the magnetism adjusting bars 80*a* and 80*b* described in the seventh exemplary embodiment.

14th Exemplary Embodiment

An inclination sensor of a fourteenth exemplary embodiment of the present invention is a structure in which the frame 73, described in the seventh, ninth, tenth and twelfth exemplary embodiments, is composed of copper or aluminum.

With the above structure, an eddy current is induced in the frame 73 in proportion to a relative movement between the magnets 79*a* and 79*b* and the frame 73, functioning as a damping force. Since the damping force due to the eddy current is in proportion to the relative velocity of the magnets 79*a* and 79*b* to the frame 73, it generates scarcely any damping force in an inclination of slow movement, so as to enable a high responsivity. Also it can prevent erroneous operation due to a resonance of the pendulum 76 because it generates a large damping force against vibrations of relatively high frequency caused by external disturbances of the vehicle. Preferably, a material of small electric resistance such as copper and aluminum is used in order to attain a large damping force, since the damping force due to the eddy current becomes greater as the electric resistance of the material for the frame 73 is smaller.

Since there is scarcely any damping force generated at low frequency, an optimum damping force can be maintained in a region of low frequency by using the magnetism adjusting bars 80*a* and 80*b*, described in the seventh exemplary embodiment, together.

15th Exemplary Embodiment

Figure 28A:
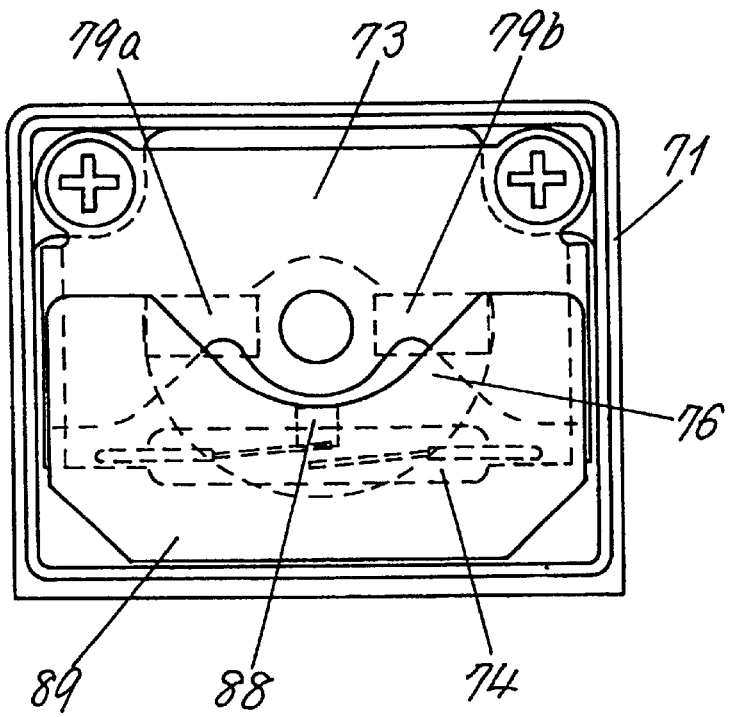
FIG. 28A is a front view, with a cover removed, of a fifteenth exemplary embodiment of the present invention.
Figure 28B:
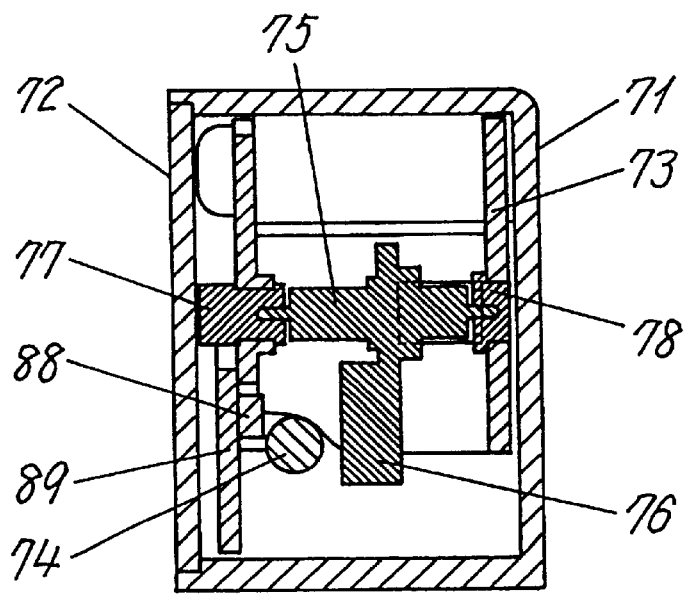
FIG. 28B is a cross sectional view of the fifteenth exemplary embodiment of the present invention.

FIG. 28A depicts a front view of an inclination sensor according to a fifteenth exemplary embodiment of the present invention, and FIG. 28B depicts a cross sectional view of the same. In FIGS. 28A and 28B, elements having the same structure as those of FIG. 22A and FIG. 22B are assigned the same reference numerals and detailed descriptions of these elements are omitted, while different elements are described hereinafter. In FIGS. 28A and 28B, a hall element 88 is mounted on the printed wiring board 89 in the vicinity of the reed switch 74.

The above structure enables self-diagnosis of failures such as abnormality in magnetic function of the magnets 79*a* and 79*b* attached to the pendulum 76, detachment of the magnets 79*a* and 79*b* from the pendulum 76, as they can be monitored by the hall element 88, so as to improve the reliability.

16th Exemplary Embodiment

Figure 29A:
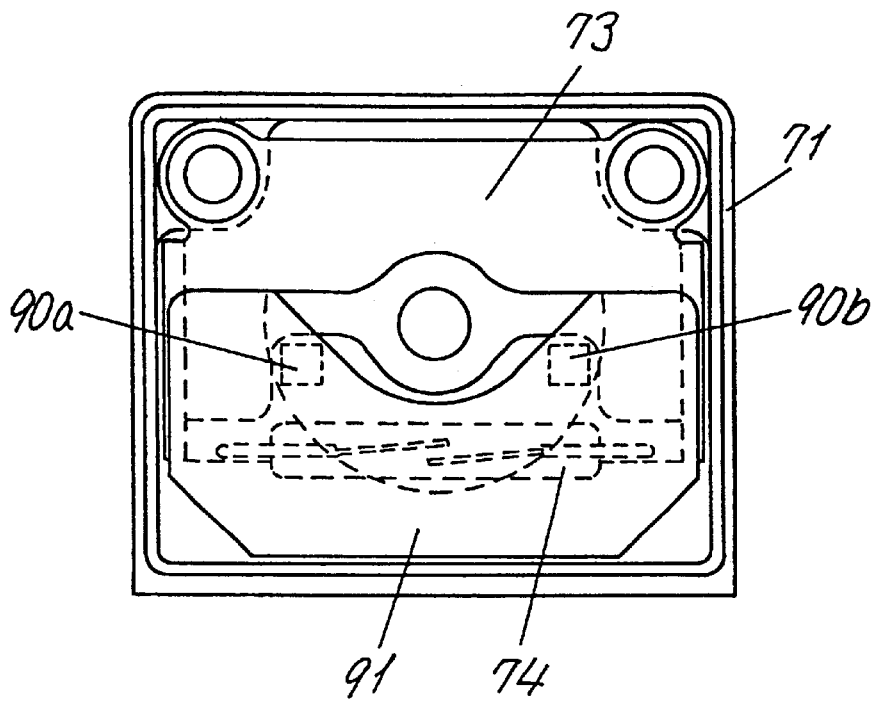
FIG. 29A is a front view, with a cover removed, of a sixteenth exemplary embodiment of the present invention.
Figure 29B:
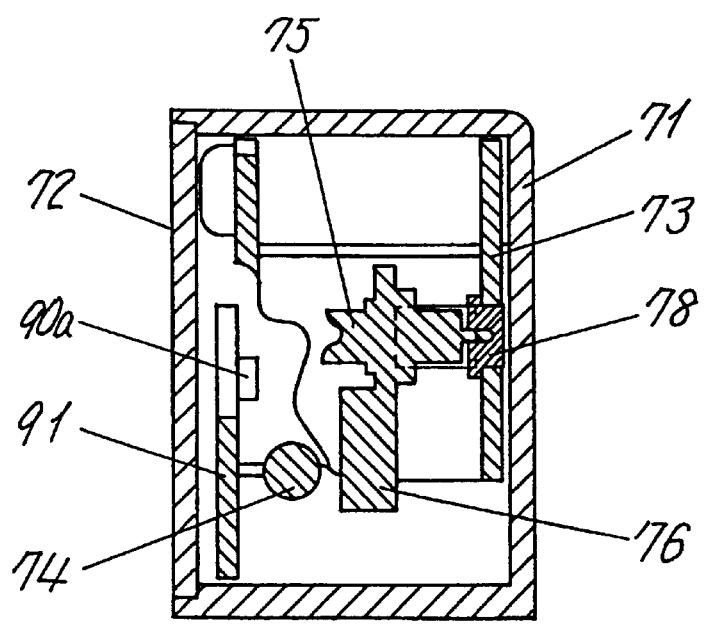
FIG. 29B is a cross sectional view of the sixteenth exemplary embodiment of the present invention.

FIG. 29A depicts a front view of an inclination sensor according to a sixteenth exemplary embodiment of the present invention, and FIG. 29B depicts a cross sectional view of the same. In FIGS. 29A and 29B, elements having the same structure as those of FIG. 22A and FIG. 22B are assigned the same reference numerals and detailed descriptions of these elements are omitted, while different elements are described hereinafter. In FIGS. 29A and 29B, a pair of reflection type photo-interrupters 90a and 90b are fixed on the printed wiring board 91 at two locations facing against a rotational surface of the pendulum 76.

Figure 30A:
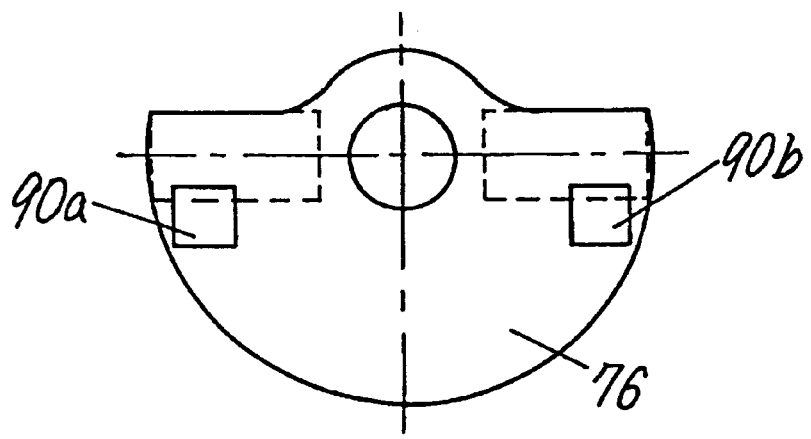
FIG. 30A shows a reflection type photo-interrupter of the sixteenth exemplary embodiment of the present invention.
Figure 30B:
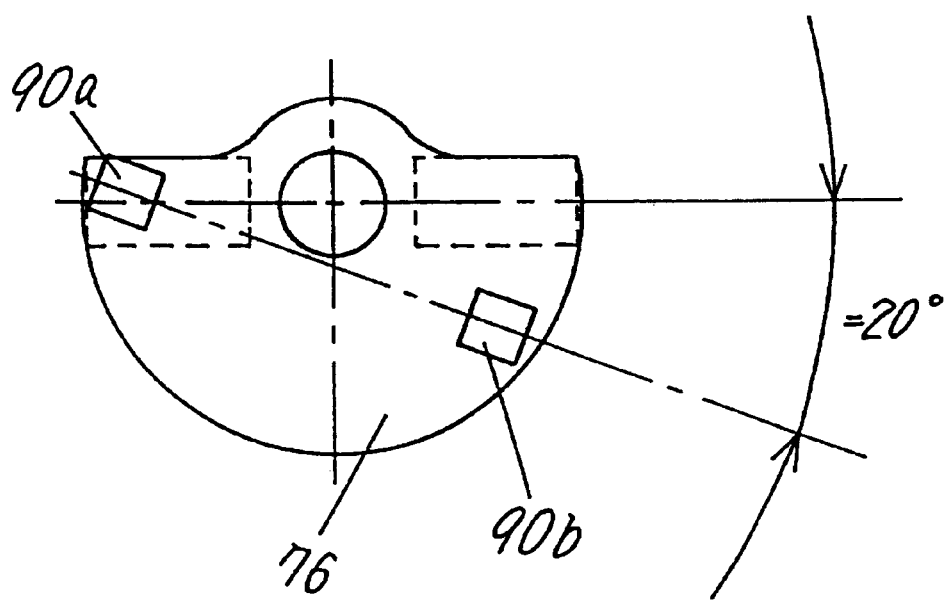
FIG. 30B is another drawing of the reflection type photo-interrupter of FIG. 30A.
Figure 30C:
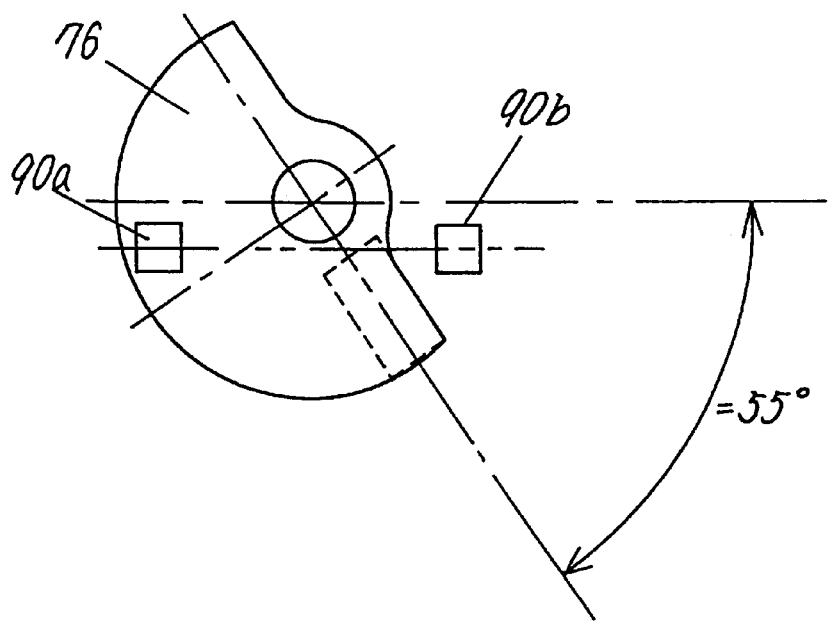
FIG. 30C is still another drawing of the reflection type photo-interrupter of FIG. 30A.
Figure 30D:
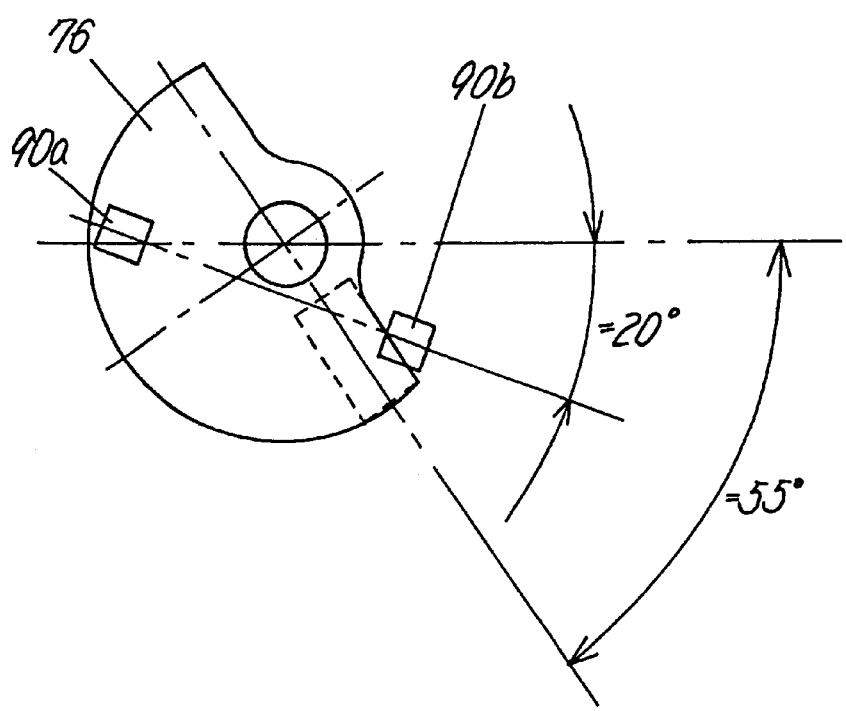
FIG. 30D is yet another drawing of the reflection type photo-interrupter of FIG. 30A.

Operation of the reflection type photo-interrupters 90a and 90b is described hereinafter by referring to FIGS. 30A, B, C and D. FIG. 30A depicts a positional relationship between the pendulum 76 and the reflection type photo-interrupters 90a and 90b, when a sensor is in normal order and a vehicle in which the sensor is installed is horizontal. Under this condition, the two reflection type photo-interrupters 90a and 90b are in an ON state, as lights from them are reflected at the surface of the pendulum 76, and the sensor is judged as being in good operating order on the basis that both of the two reflection type photo-interrupters 90a and 90b are in the ON state. FIG. 30B depicts a positional relationship between the pendulum 76 and the reflection type photo-interrupters 90a and 90b, when the sensor is in normal order and the vehicle in which the sensor is installed is parked with an inclination of 20°. The two reflection type photo-interrupters 90a and 90b are in the ON state, as their lights are reflected at the surface of the pendulum 76, even in this condition, and the sensor is judged as normal. Next, FIG. 30C depicts an abnormal condition, in which one of the magnets 79a and 79b in the sensor has come off by a shock, or the like, and also a positional relationship between the pendulum 76 and the reflection type photo-interrupters 90a and 90b when the vehicle in which the sensor is installed is horizontal. Due to the detachment of the one of the magnets 79a and 79b, the pendulum 76 has tilted 55° as its center of gravity has shifted. In this case, one of the reflection type photo-interrupters 90a and 90b is in an OFF state as the light from it is not reflected at the surface of the pendulum 76, so that the position of the pendulum 76 is judged as abnormal. FIG. 30D depicts a positional relationship between the pendulum 76 and the reflection type photo-interrupters 90a and 90b, when the vehicle is parked with an inclination of 20° in the same manner as described above. In this case, one of the reflection type photo-interrupters 90a and 90b is in the OFF state as the light from it is not reflected at the surface of the pendulum 76, and the position of the pendulum 76 is also judged as abnormal. As has been described, the structure enables a self-diagnosis by monitoring the positions of the end parts of the pendulum 76 with the reflection type photo-interrupters 90a and 90b attached to the printed wiring board 91 at the two locations facing the rotational surface of the pendulum 76, so as to improve the reliability. This self-diagnostic structure is also effective for detecting an abnormal rotation of the rotary shaft 75 of the pendulum 76, besides detecting the detachment and abnormality of the magnets 79a and 79b.

17th Exemplary Embodiment

Figure 31A:
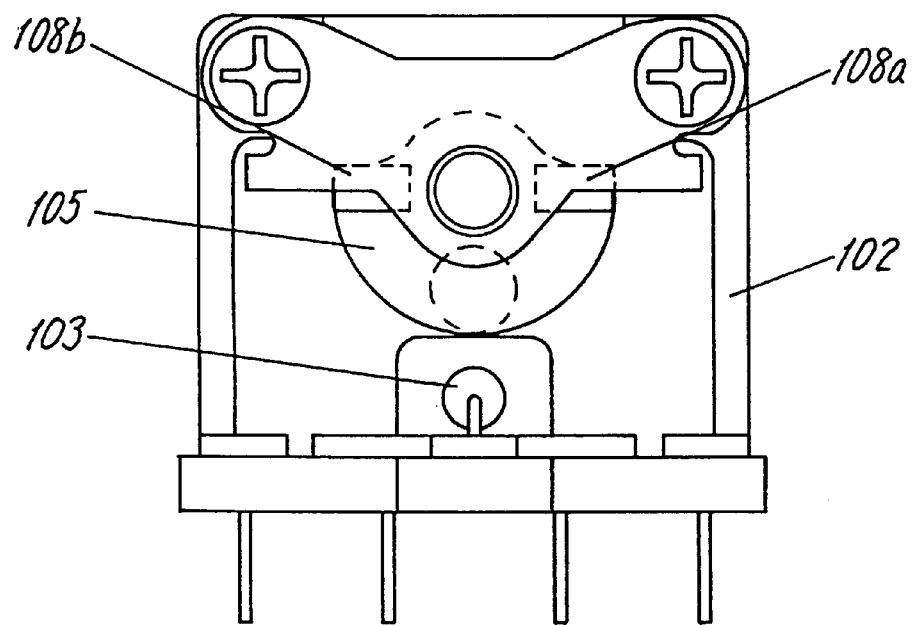
FIG. 31A is a front view, with a cover removed, of a seventeenth exemplary embodiment of the present invention.
Figure 31B:
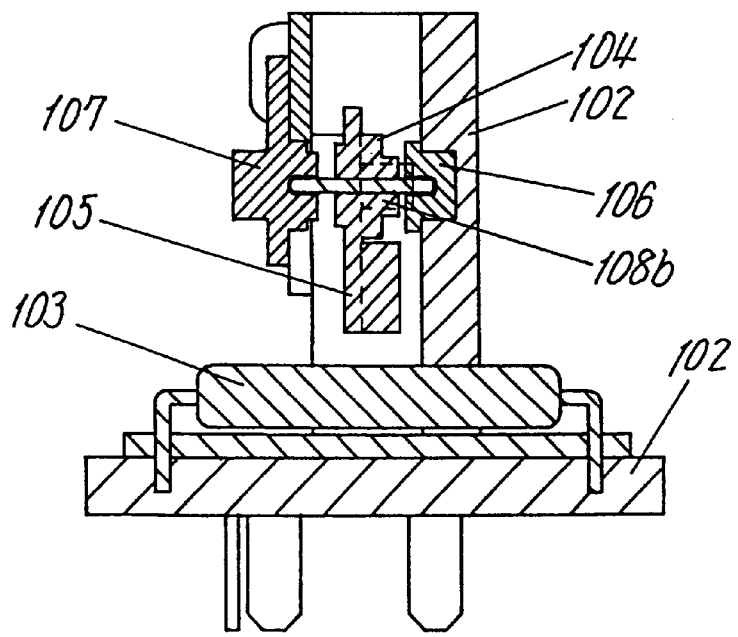
FIG. 31B is a cross sectional view of the seventeenth exemplary embodiment of the present invention.

FIG. 31A depicts a front view of an inclination sensor, with a cover removed, according to a seventeenth exemplary embodiment of the present invention, and FIG. 31B depicts a cross sectional view of the same.

FIGS. 31A and 31B depict the following elements: a case 102 defining a fixation body to be fixed to a mounting body of a vehicle,; a reed switch 103 mounted on the case 102; a rotary shaft 104; a pendulum 105 made of a nonmagnetic material and fixed to the rotary shaft 104; bearings 106 and 107 made of oil impregnated sintered metal for rotatably supporting the rotary shaft 104; and two magnets 108a and 108b defining magnetic flux generation means adhered to the pendulum 105. In FIG. 31A, the inclination sensor is shown with a cover of the case 102 removed.

In the present embodiment, a surface of the pendulum 105 perpendicular to the rotary shaft 104 has a semicircular shape. The magnets 108a and 108b are attached at two locations of a linear part at a perimeter of the semicircle, and the pendulum 105 is normally oriented toward a direction of gravity. With an inclination of the vehicle, the reed switch 103, mounted on the case 102, tilts along with the case 102, and the reed switch 103 gets closer to the magnet 108a or 108b attached to the pendulum 105. With this movement, the reed switch 103 turns into an ON (closed) state, if the inclination exceeds a predetermined angle, so as to enable detection of the inclination angle.

However, when there is an external magnetism, such as terrestrial magnetism, an error can occur due to a slight rotation of the pendulum 105 due to a reaction of the magnets in response to an orientation of the external magnetism, if the magnet 108a or 108b are arranged on their polar axes in a direction perpendicular to the rotary shaft 104, and on their polar orientations between N and S of the magnet 108a or 108b in the same direction.

The present structure has the magnet 108a or 108b arranged with their polar axes in parallel with the rotary shaft 104, and also the reed switch 103 in a manner with its central axis in a longitudinal direction in parallel with the rotary shaft 104.

With the polar arrangement of the magnet 108a or 108b as described, the error due to a rotation of the pendulum 105 does not occur, even if it is exposed to external magnetism, and an inclination sensor of a high angle-detecting accuracy with a simple structure can be made available at a low cost.

18th Exemplary Embodiment

Figure 32A:
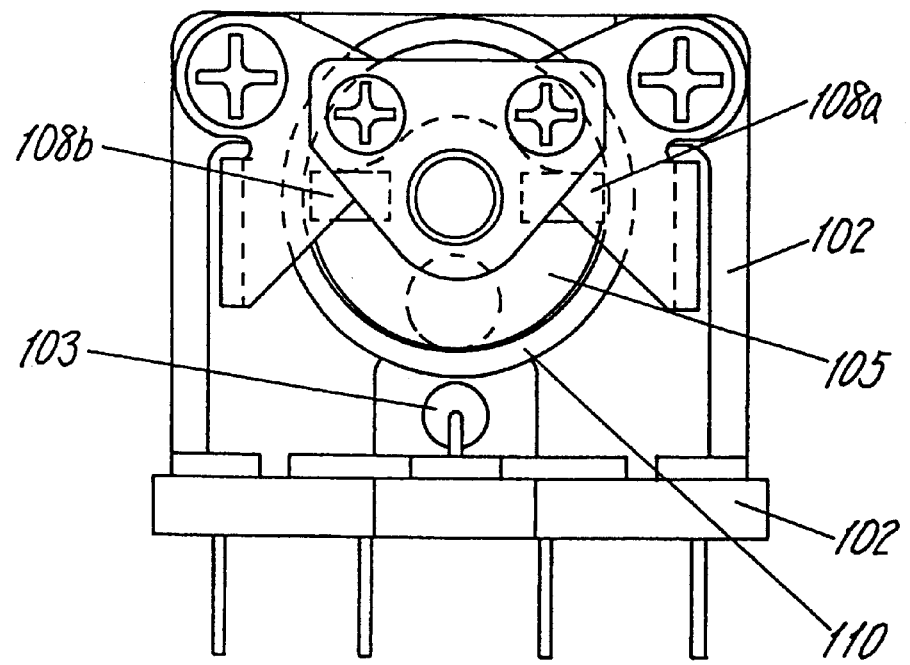
FIG. 32A is a front view, with a cover removed, of an eighteenth exemplary embodiment of the present invention.
Figure 32B:
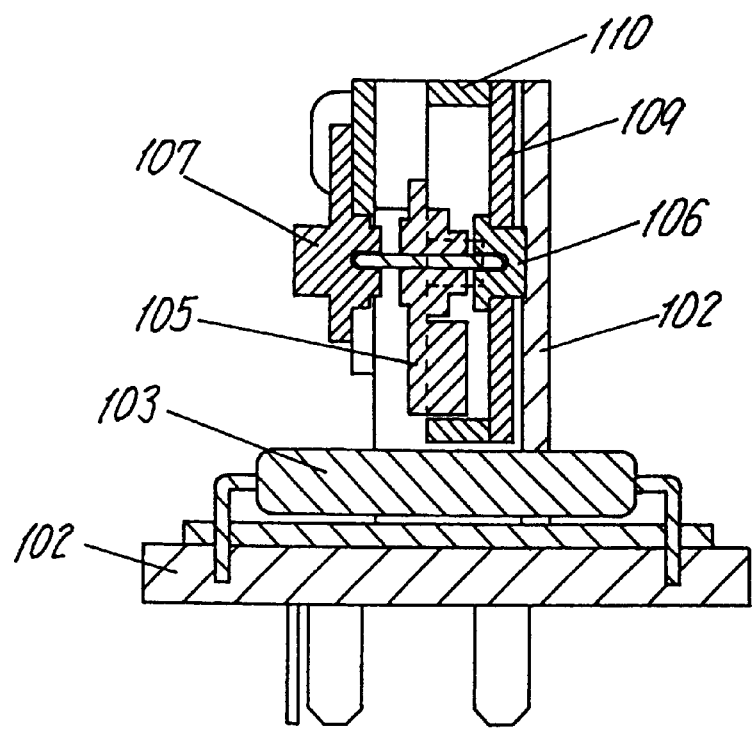
FIG. 32B is a cross sectional view of the eighteenth exemplary embodiment of the present invention.

FIG. 32A is a front view of an inclination sensor according to an eighteenth exemplary embodiment of the present invention, and FIG. 32B is a cross sectional view of the same. In FIGS. 32A and 32B, elements having the same structure as those of FIG. 31A and FIG. 31B are assigned the same reference numerals and detailed descriptions of these elements are omitted, while different elements are described hereinafter. In FIGS. 32A and 32B, a numeral 109 represents a plate having nonmagnetic and electrically conductive properties such as copper, and a numeral 110 represents a flange part in the shape of cylinder or the like, having nonmagnetic and electrically conductive properties such as copper.

When an inclination sensor is used in a vehicle, a damping mechanism is necessary to prevent erroneous operation, because there is a possibility of erroneous operation due to a resonance of the pendulum 105 caused by external disturbances such as vibrations or the like With the present structure, eddy currents are induced in the plate 109 and the flange part 110 by the relative movement between the magnets 108a and 108b against the plate 109 and the flange part 110, functioning as a damping force. Since the damping force due to the eddy currents is in proportion to a relative velocity of the magnets 108a and 108b to the plate 109 and the flange part 110, scarcely any damping force is generated in an inclination of slow movement, thereby enabling a high responsivity. Also, erroneous operation, due to a resonance of the pendulum 105, can be prevented because a large damping force is generated against vibrations of relatively high frequency caused by external disturbances of the vehicle. Preferably, a material of small electric resistance such as copper and aluminum is used in order to gain a large damping force, since the damping force due to the eddy current becomes greater as the electric resistance of the material used for the plate 109 and the flange part 110 is smaller.

19th Exemplary Embodiment

Figure 33A:
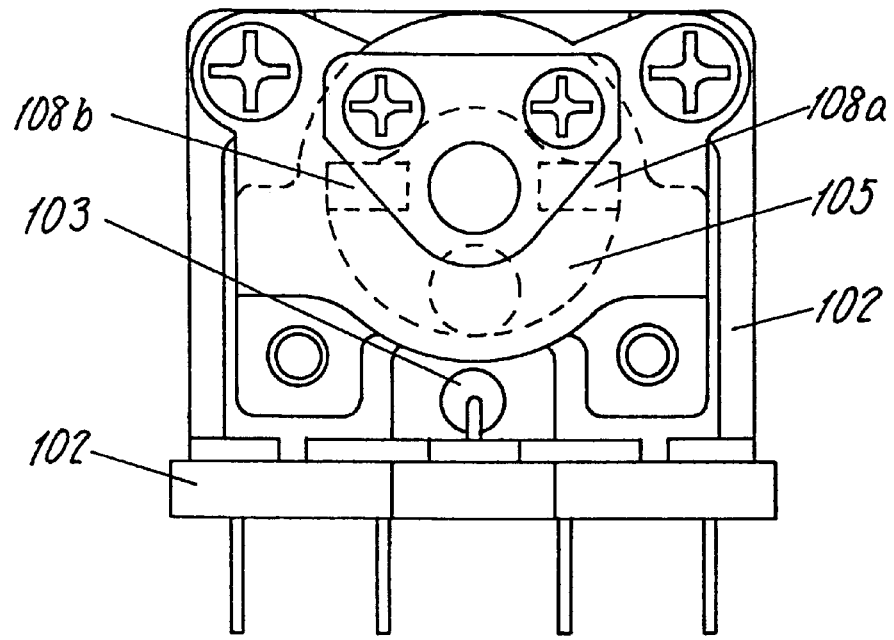
FIG. 33A is a front view, with a cover removed, of a nineteenth exemplary embodiment of the present invention.
Figure 33B:
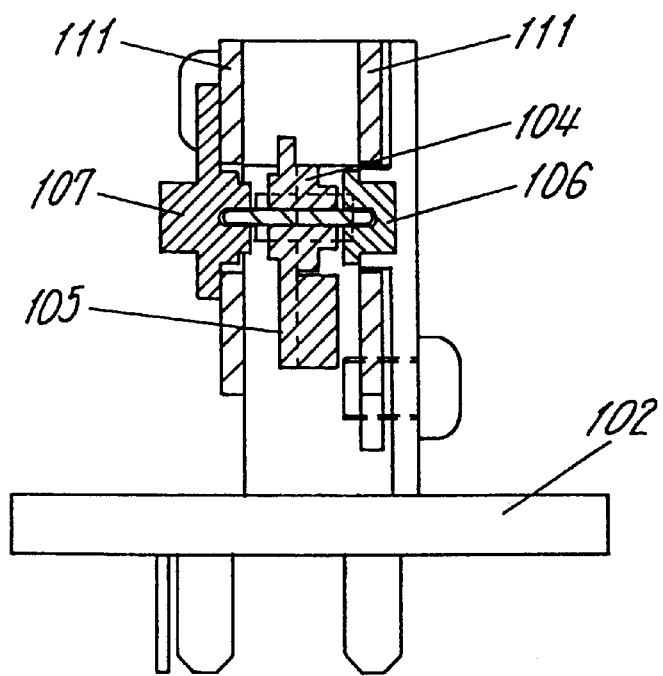
FIG. 33B is a cross sectional view of the nineteenth exemplary embodiment of the present invention.

FIG. 33A is a front view of an inclination sensor according to a nineteenth exemplary embodiment of the present invention, and FIG. 33B is a cross sectional view of the same. In FIGS. 33A and 33B, elements having the same structure as those of FIG. 31A and FIG. 31B are assigned the same reference numerals and detailed descriptions of these elements are omitted, while different elements are described hereinafter. In FIGS. 33A and 33B, numerals 111 represent plates having nonmagnetic and electrically conductive properties such as copper.

With the present structure, which provides the plates 111 having nonmagnetic and electrically conductive properties in the vicinity of both ends of the magnets 108a and 108b in a direction of their polar axes, and in a plane perpendicular to the rotary shaft 104 of the pendulum 105, eddy current is induced in the plates 111 by a relative movement between the magnets 108a and 108b against the plates 111, functioning as a damping force in the same manner as the eighteenth exemplary embodiment. Since the damping force due to the eddy current is in proportion to a relative velocity of the magnets 108a and 108b to the plates 111, scarcely any damping force is generated in an inclination of slow movement, thereby enabling a high responsivity. Also, erroneous operation due to a resonance of the pendulum 105 can be prevented because a large damping force is generated against vibrations of relatively high frequency caused by external disturbances of the vehicle. Preferably a material of small electric resistance such as copper and aluminum is used in order to gain a large damping force, since the damping force due to the eddy current becomes greater as the electric resistance of the material used for the plates 111 is smaller.

20th Exemplary Embodiment

Figure 34:
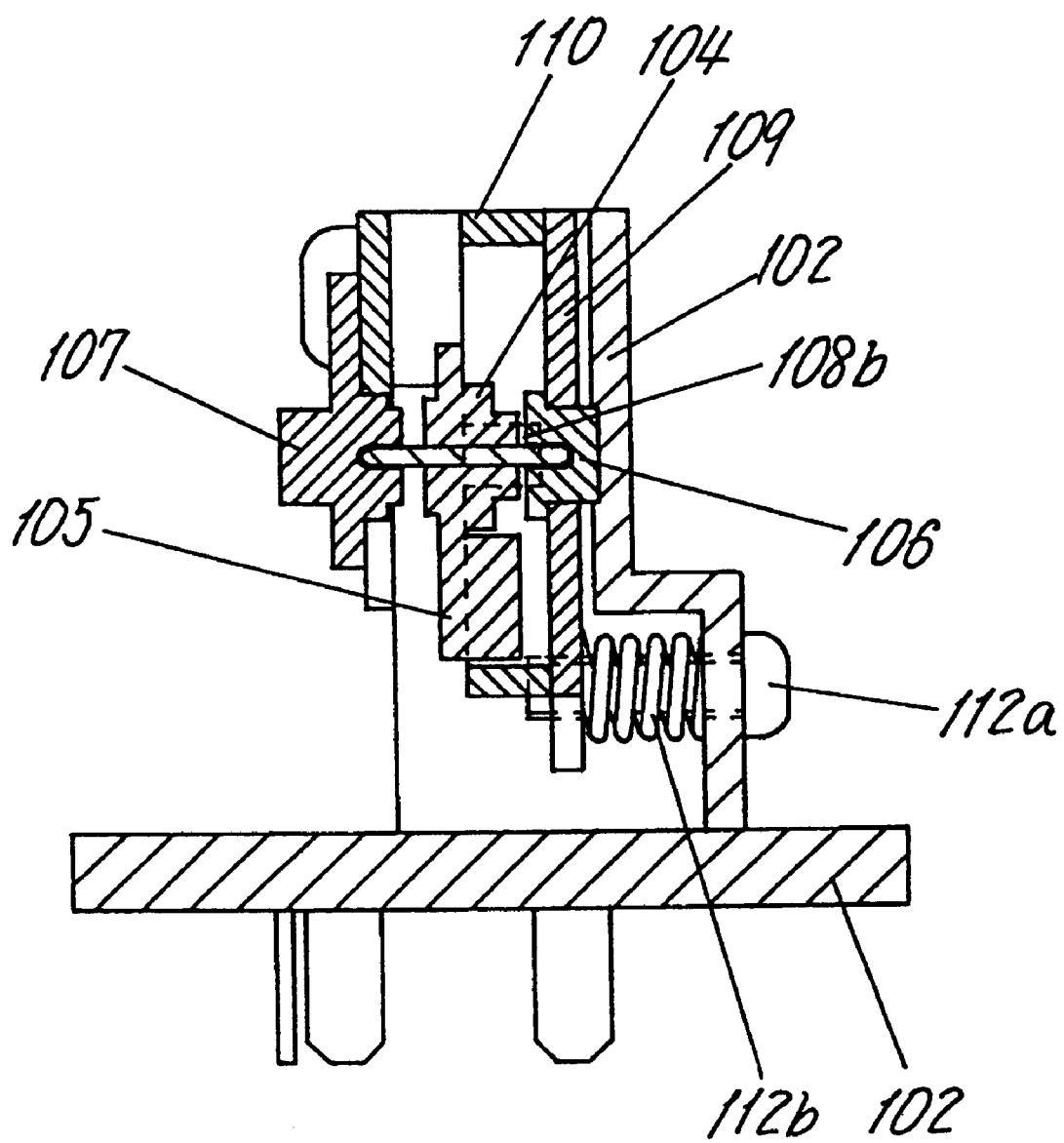
FIG. 34 is a cross sectional view of a twentieth exemplary embodiment of the present invention.

FIG. 34 is a cross sectional view of an inclination sensor according to a twentieth exemplary embodiment of the present invention. In FIG. 34, elements having the same structure as those of FIG. 31B and FIG. 32B are assigned the same reference numerals and detailed descriptions of these elements are omitted, while different elements are described hereinafter. In FIG. 34, a plate 109 is held movable in a direction parallel with the rotary shaft 104 with a screw 112a, defined as a positional adjustment mechanism, and a spring 112b constituting the positional adjustment mechanism.

Since an eddy current induced in the plate 109 by a relative movement of the magnets 108a and 108b to the plate 109 varies because of a gap between the magnets 108a and 108b and the plate 109, a dispersion can occur in the characteristic of the sensor due to assembly accuracy, or the like.

A stable damping force can be maintained with the present embodiment, since the gap between the magnets 108a and 108b and the plate 109 is variable by way of the positional adjustment with the screw 112a and the spring 112b.

21st Exemplary Embodiment

Figure 35:
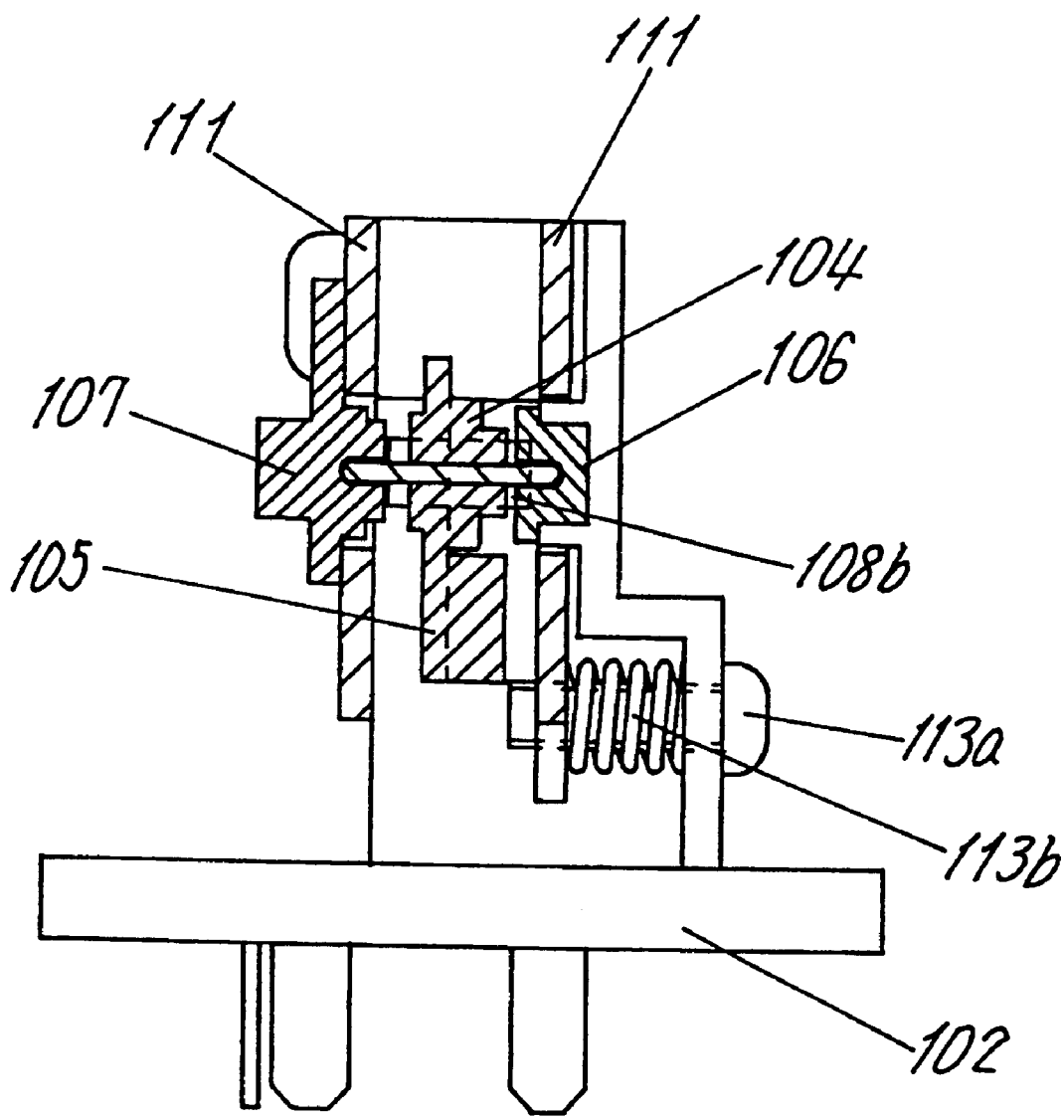
FIG. 35 is a cross sectional view of a twenty-first exemplary embodiment of the present invention.

FIG. 35 is a cross sectional view of an inclination sensor according to a twenty-first exemplary embodiment of the present invention. In FIG. 35, elements having the same structure as those of FIG. 31B and FIG. 33B are assigned the same reference numerals and detailed descriptions of these elements are omitted, while different elements are described hereinafter. In FIG. 35, a plate 111 is held movable in a direction parallel with the rotary shaft 104 with a screw 113a, defined as a positional adjustment mechanism, and a spring 113b constituting the positional adjustment mechanism.

Since an eddy current induced in the plate 111 by a relative movement of the magnets 108a (not shown) and 108b to the plate 111 varies because of a gap between the magnets 108a and 108b and the plate 111, in the same manner as the twentieth exemplary embodiment, a dispersion can occur in the characteristic of the sensor due to assembly accuracy, or the like.

A stable damping force can be maintained by the present embodiment, since the gap between the magnets 108a and 108b and the plate 111 is variable by way of the positional adjustment with the screw 113a and the spring 113b.

22nd Exemplary Embodiment

Figure 36:
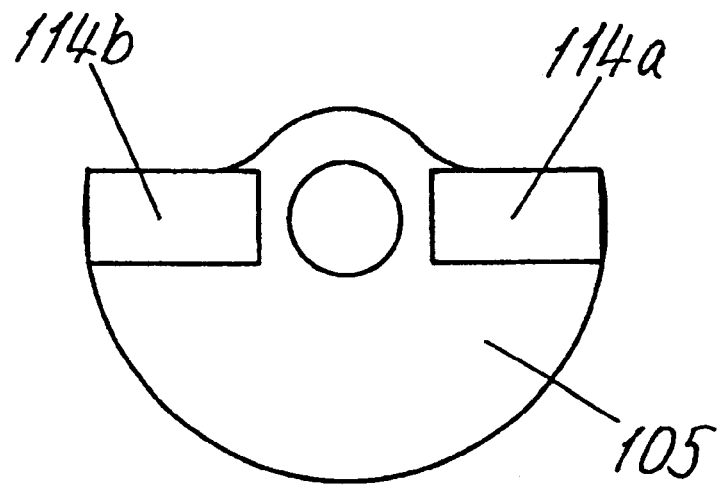
FIG. 36 is a front view of a pendulum of a twenty-second exemplary embodiment of the present invention.

FIG. 36 is a front view of a pendulum 105 according to a twenty-second exemplary embodiment of the present invention. Numerals 114a and 114b in FIG. 36 represent magnets of a samarium-cobalt system.

The above structure can achieve a reduction of power consumption as well as a reduction in size, since magnetic flux generation means are the magnets 114a and 114b, which do not require external energy, unlike an electromagnet. Also, because the samarium-cobalt magnets 114a and 114b have an extremely stable magnetic characteristic relative to temperature, a variation of detecting angle of the reed switch 103 against ambient temperature can be better controlled.

Although the described embodiment is provided with the samarium-cobalt magnets 114a and 114b, rare-earth magnets of other kinds or ferrite magnets can be utilized, though they are relatively inferior in their temperature characteristic.

23th Exemplary Embodiment

Figure 37:
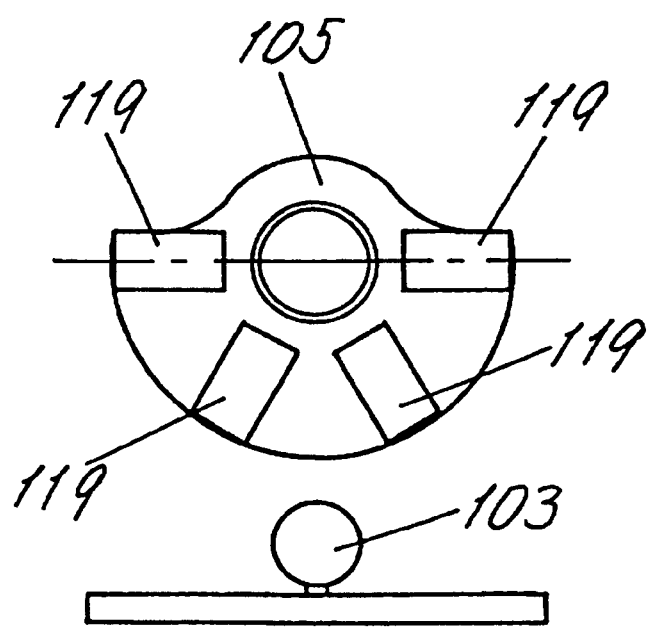
FIG. 37 shows a pendulum and a reed switch of a twenty-third exemplary embodiment of the present invention.

FIG. 37 is an outline view of a pendulum 105 and a reed switch 103 according to a twenty-third exemplary embodiment of the present invention. The embodiment of FIG. 37 includes a plurality of magnets 119 as magnetic flux generation means.

The present embodiment enables the sensor to detect two or more angles, since it utilizes a plurality of the magnets 119.

24th Exemplary Embodiment

Figure 38:
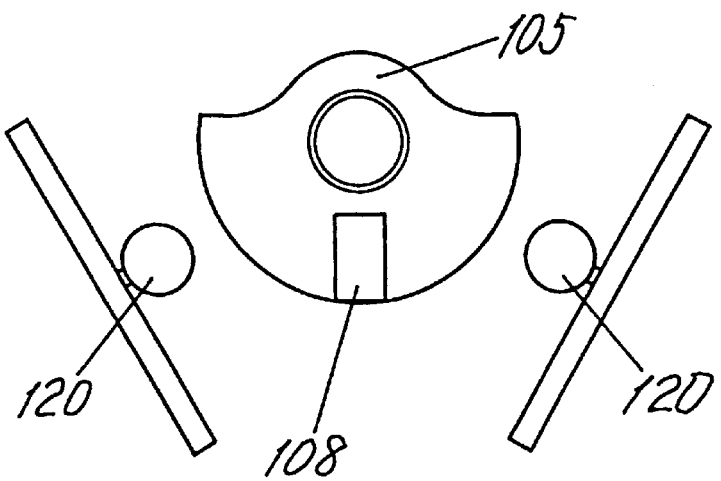
FIG. 38 shows a pendulum and the vicinity thereof of a twenty-fourth exemplary embodiment of the present invention.

FIG. 38 is an outline view of a pendulum 105 and vicinity thereof according to a twenty-fourth exemplary embodiment of the present invention. The embodiment of FIG. 38 includes a plurality of reed switches 120 and a magnet 108 as a magnetic flux generation means.

The present embodiment enables the sensor to detect two or more angles, since it utilizes a plurality of the reed switches 120.

25th Exemplary Embodiment

Figure 39A:
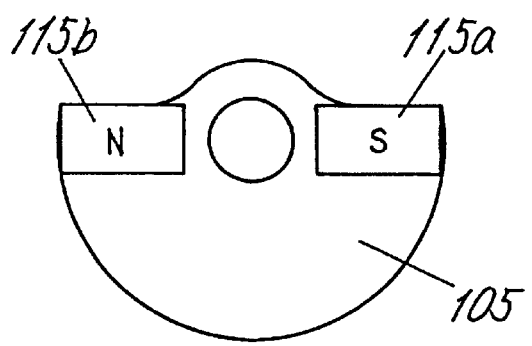
FIGS. 39A, B and C are a front view, a side view and a bottom view of a pendulum unit of a twenty-fifth exemplary embodiment of the present invention.
Figure 39B:
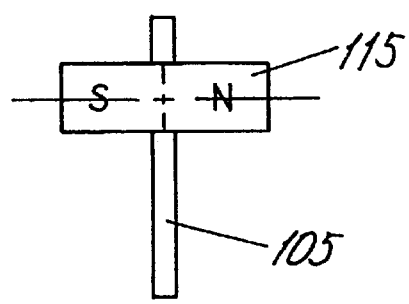
Figure 39C:
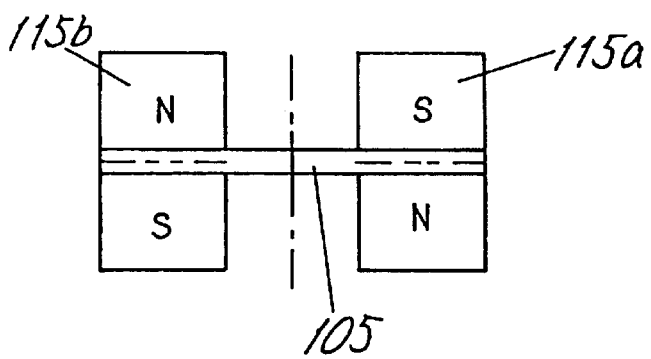

FIGS. 39A, B and C are a front view, a side view and a bottom view of a pendulum 105 according to a twenty-fifth exemplary embodiment of the present invention. In FIGS. 39A, B and C, numerals 115a and 115b are magnets that are magnetized in directions as depicted.

The present embodiment approximates a structure of a closed magnetic circuit by orienting the direction of magnetization of a pair of the magnets 115a and 115b in an axial direction of the rotary shaft 104 (not shown in the figures), and polar orientation of each magnets 115a and 115b in an opposite direction to each other. This structure suppresses the effect of an external magnetic field and the approach of a magnetic substance in close vicinity thereby enabling an improvement of detecting accuracy.

26th Exemplary Embodiment

Figure 40A:
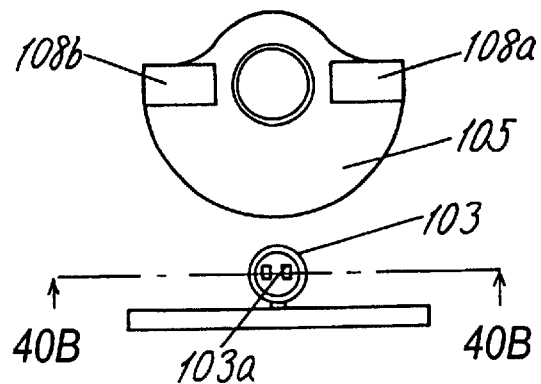
FIGS. 40A, B, C and D are a front view and a cross sectional view, and another combination of a front view and a cross sectional view of a twenty-sixth exemplary embodiment of the present invention.
Figure 40B:
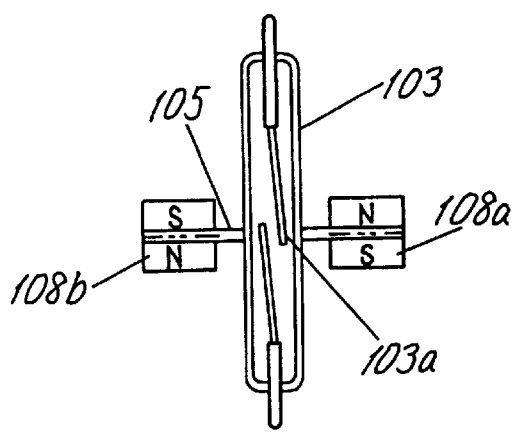
Figure 40C:
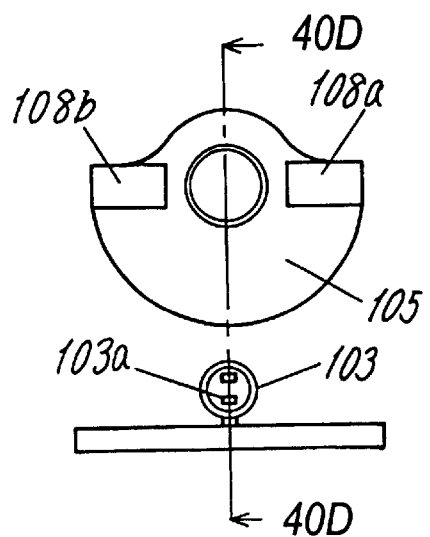
Figure 40D:
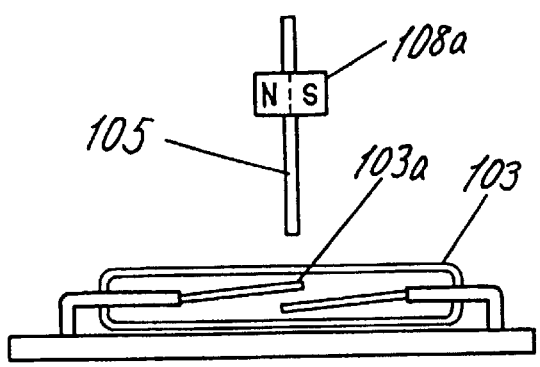

FIGS. 40A, B, C and D are a front view FIG. 40A and a cross sectional view FIG. 40B and another pair of a front view FIG. 40C and a cross sectional view FIG. 40D according to a twenty-sixth exemplary embodiment of the present invention.

FIGS. 40A, B, C and D depict magnets 108a and 108b defining magnetic flux generation means, a pendulum 105, a reed switch 103, and a leaf 103a of the reed switch.

Figure 41A:
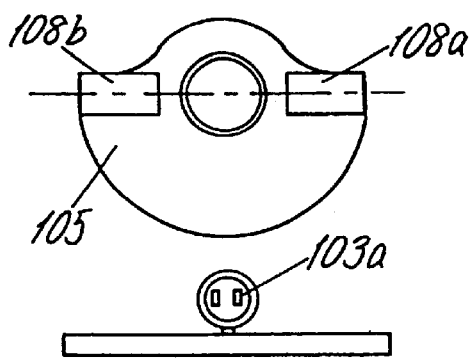
FIGS. 41A through 41C show a detecting operation of the of the twenty-sixth exemplary embodiment of the present invention.
Figure 41B:
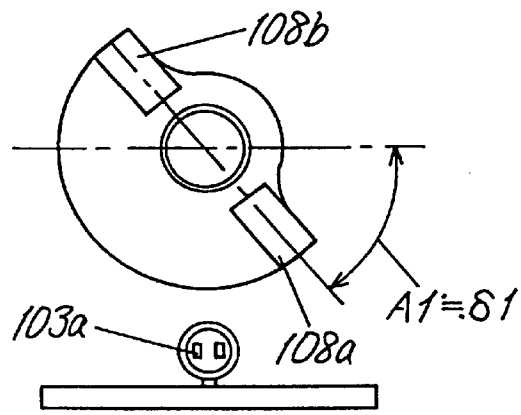
Figure 41C:
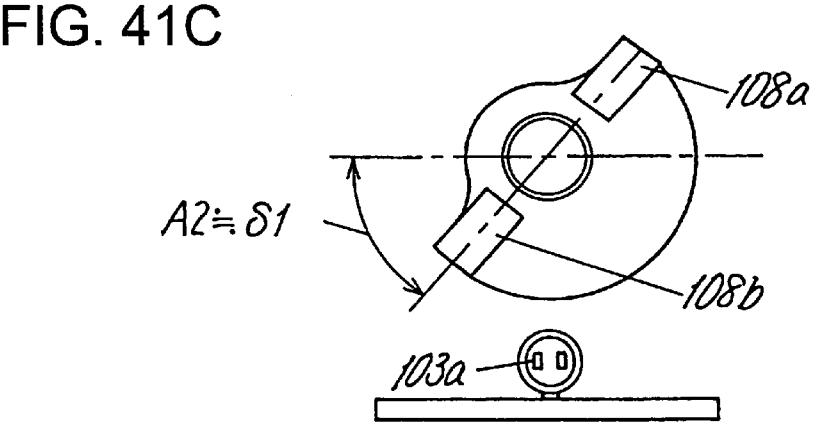
Figure 41D:
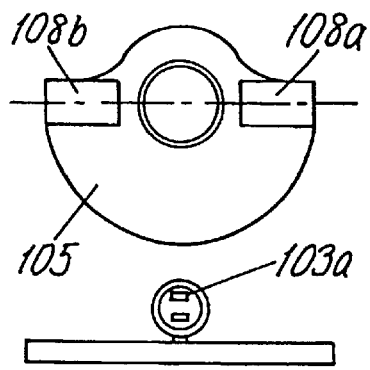
FIGS. 41D through 41F are other views showing the detecting operation of the twenty-sixth exemplary embodiment of the present invention.
Figure 41E:
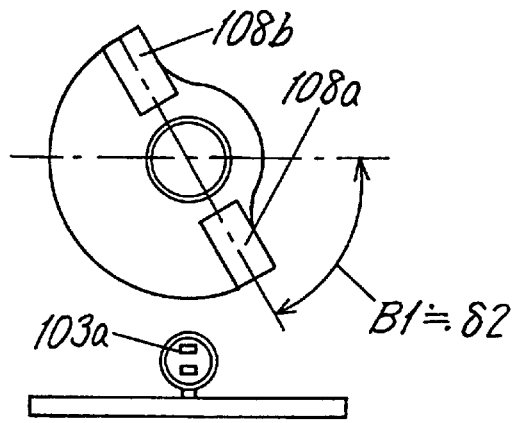
Figure 41F:
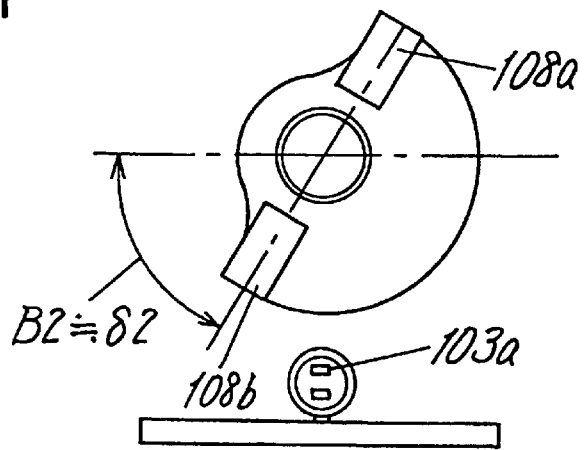
Figure 41G:
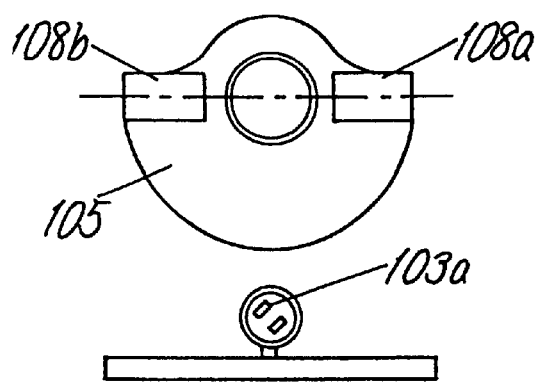
FIGS. 41G through 41I are yet other views showing the detecting operation of the twenty-sixth exemplary embodiment of the present invention.
Figure 41H:
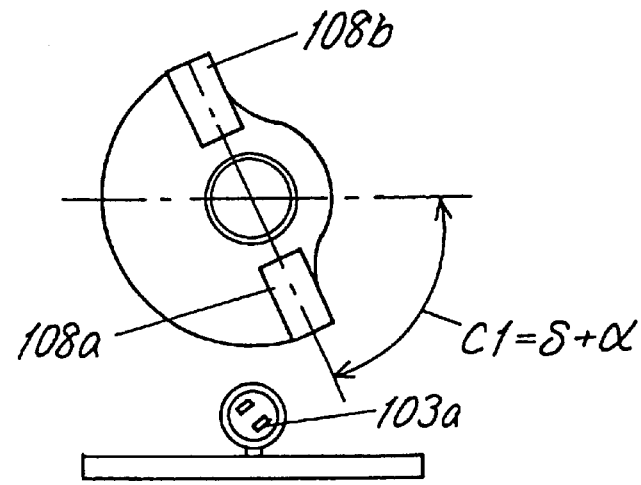
Figure 41I:
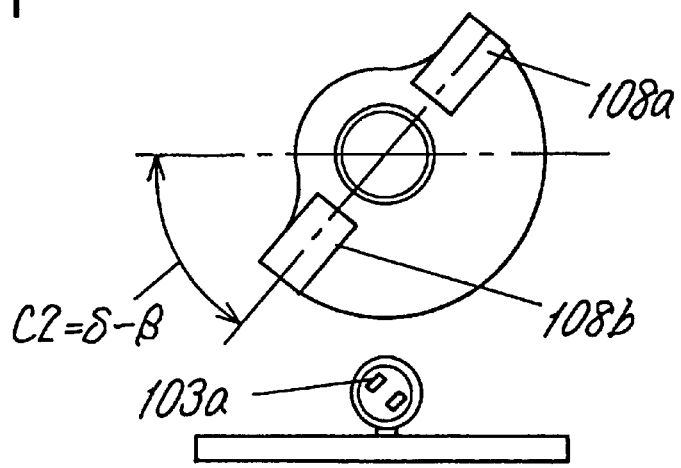

A relationship between the position of the leaf 103a of the reed switch 103 and a detecting angle is described hereinafter by referring to FIGS. 41A through 41I. FIGS. 41A through 41C depict an arrangement in which a major plane surface of the leaf 103a is positioned in parallel with a direction of the rotational radius of the pendulum 105, and FIGS. 41D through 41F depict an arrangement in which the major plane surface of the leaf 103a is positioned perpendicular to the direction of the rotational radius of the pendulum 105. Also, FIGS. 41G through 41I depict a case in which the major plane surface of the leaf 103a is arranged at a certain angle to the direction of the rotational radius of the pendulum 105.

In FIGS. 41A through 41F, approaching movements of the right and the left magnets 108a and 108b toward the leaf 103a of the reed switch 103 due to inclinations are nearly identical in their manner in both clockwise and counterclockwise inclinations, and there is a very small difference in the operating angles of the reed switch 103 due to the clockwise and the counterclockwise inclinations (A1≡A2, B1≡B2). In the case of FIGS. 41G through 41I, on the contrary, approaching movements of the right and the left magnets 108a and 108b toward the leaf 103a of the reed switch 103 due to inclinations are not identical in their manner between clockwise and counterclockwise inclinations, and there is a large difference in the operating angles of the reed switch 103 due to the clockwise and the counterclockwise inclinations (C1>C2).

As has been described, the present embodiment reduces the difference in the detecting angle between the clockwise and the counterclockwise inclinations by arranging the major plane surface of the leaf 103a of the reed switch 103 in parallel or perpendicular to the direction of the rotational radius of the pendulum 105, so as to provide an inclination sensor of a high angle-detecting accuracy at a low cost.

27th Exemplary Embodiment

Figure 42:
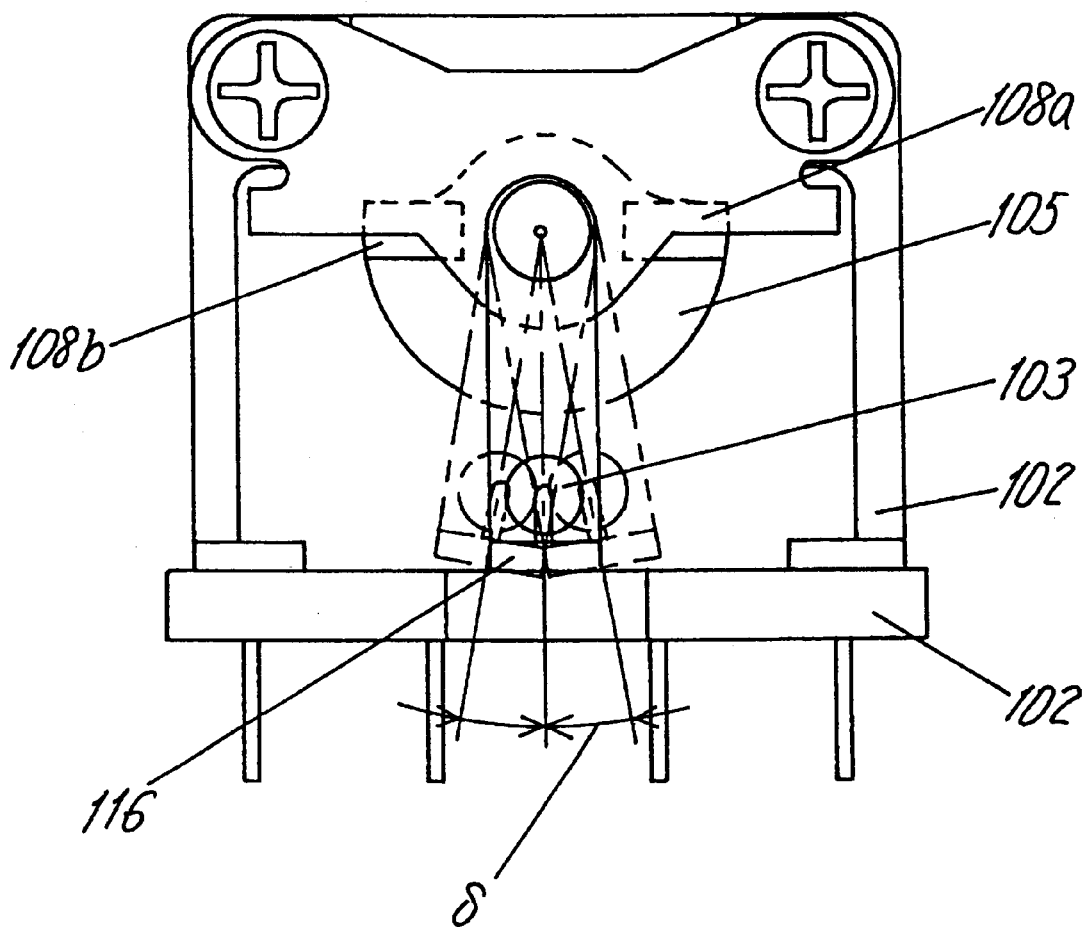
FIG. 42 is a front view of a twenty-seventh exemplary embodiment of the present invention.

FIG. 42 is a front view of an inclination sensor according to a twenty-seventh exemplary embodiment of the present invention. In FIG. 42, elements having the same structure as those of FIG. 31A are assigned the same reference numerals and detailed descriptions of these elements are omitted, while different elements are described. In FIG. 42, a numeral 116 represents a reed switch supporting plate, which is rotatable about the rotary shaft 104 (not shown in the figure), and the reed switch 103 is mounted on a surface of the reed switch supporting plate 116.

The structure as described above enables the sensor to detect clockwise and counterclockwise inclinations at the same angle by compensating a difference in the detecting angles between the clockwise and the counterclockwise inclinations caused by a dispersion of properties of the two magnets 108a and 108b mounted on the pendulum 105, with rotation of the reed switch supporting plate 116.

If a detecting angle of the reed switch 103 is "θ+δ" in the counterclockwise inclination of the sensor, and "θ−δ" in the clockwise inclination, under a condition as shown in FIG. 42 that the reed switch 103 mounted on the reed switch supporting plate 116 is horizontal, moving the reed switch supporting plate 116 rotationally by in the counterclockwise direction an angle of "δ" can adjust the detecting angle at "θ" in both the clockwise and the counterclockwise inclinations, as depicted by a dotted line, without impairing the sensitivity.

28th Exemplary Embodiment

Figure 43:
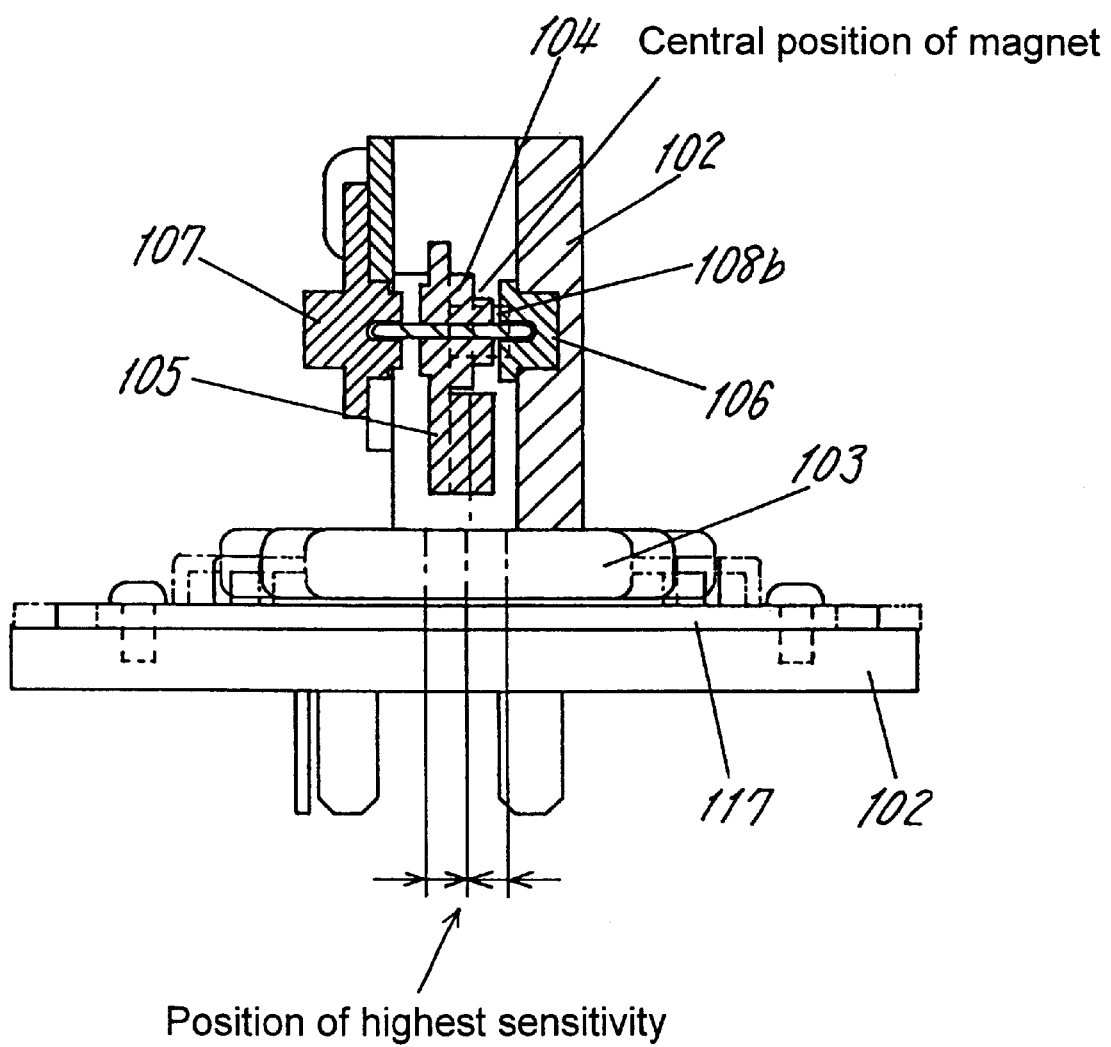
FIG. 43 is a cross sectional view of a twenty-eighth exemplary embodiment of the present invention.

FIG. 43 is a cross sectional view of an inclination sensor according to a twenty-eighth exemplary embodiment of the present invention. In FIG. 43, elements having the same structure as those of FIG. 31B are assigned the same reference numerals and detailed descriptions of these elements are omitted, while different elements are described hereinafter. FIG. 43 depicts a structure in which the position of a printed wiring board 117 is adjustable in an axial direction of the rotary shaft 104. The reed switch 103 is mounted on a surface of printed wiring board 117.

The structure as described above enables attaining a desired detecting angle by varying a sensitivity by way of moving the position of the printed wiring board 117 in the axial direction of the rotary shaft 104 in order to compensate for a difference from the desired detecting angle due to a dispersion of properties of the two magnets 108a (not shown in the figure) and 108b mounted on the pendulum 105. Besides the structure of the above embodiment, another structure as described below is conceivable. The detecting sensitivity increases if, for instance, the printed wiring board 117 mounted with the reed switch 103 is brought closer to the pendulum 105 in a direction of its rotational radius. This can reduce the detecting angles in both clockwise and counterclockwise inclinations. The detecting sensitivity decreases, on the contrary, if the printed wiring board 117 is moved away from the pendulum 105 in a direction of its rotational radius. This can increase the detecting angles in both clockwise and counterclockwise inclinations. Accordingly, the desired detecting angle can be attained by adjusting the position of the printed wiring board 117 mounted with the reed switch 103 in either the axial direction of the rotary shaft 104 or the direction of the rotational radius of the pendulum 105.

An even higher accuracy of the detecting angle is possible by using a balance adjustment mechanism of the detecting angles between clockwise and counterclockwise directions described in the twenty-seventh exemplary embodiment, in combination with the above structure.

29th Exemplary Embodiment

Figure 44A:
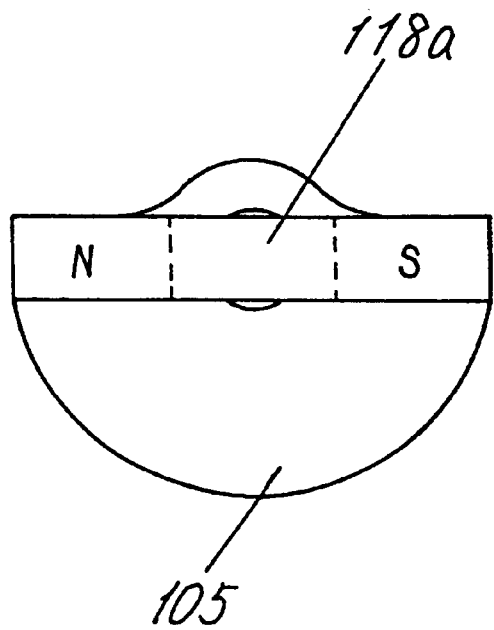
FIGS. 44A, B and C are a front view, a side view and a bottom view of a pendulum of a twenty-ninth exemplary embodiment of the present invention.
Figure 44B:
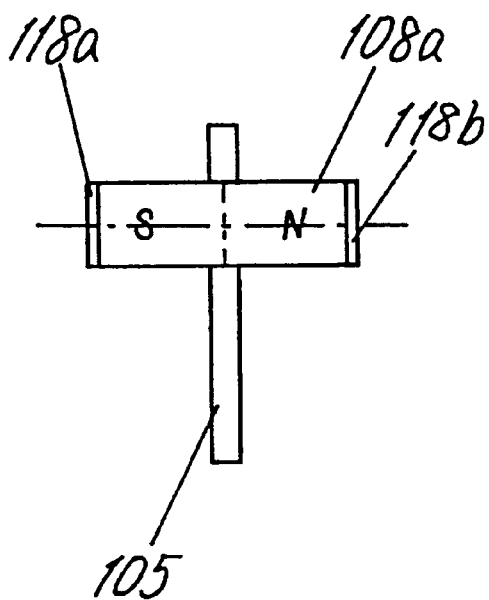
Figure 44C:
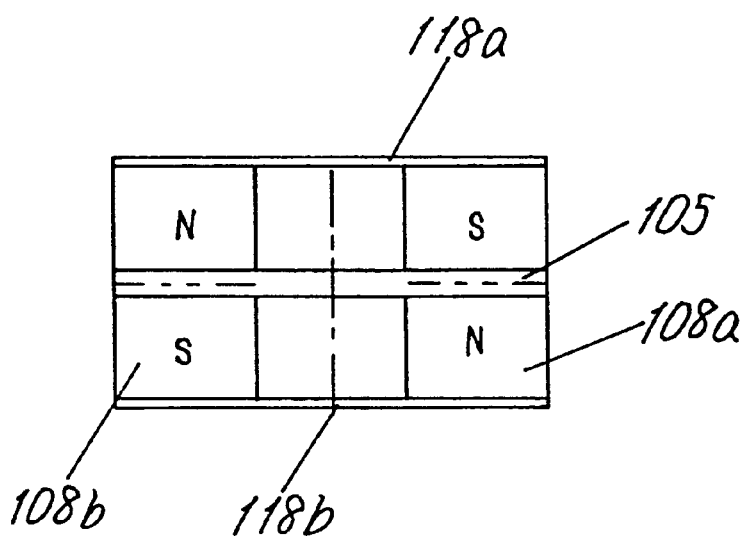
Figure 45A:
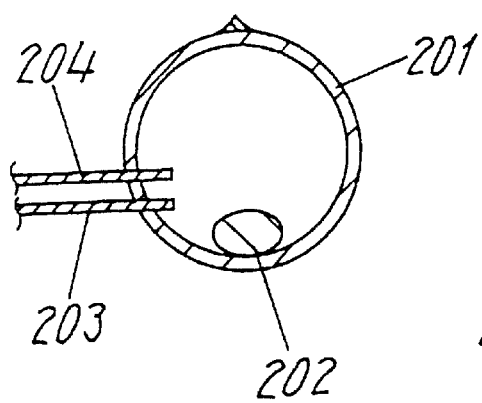
FIG. 45A is a cross sectional view of an inclination sensor of the prior art using mercury.
Figure 45B:
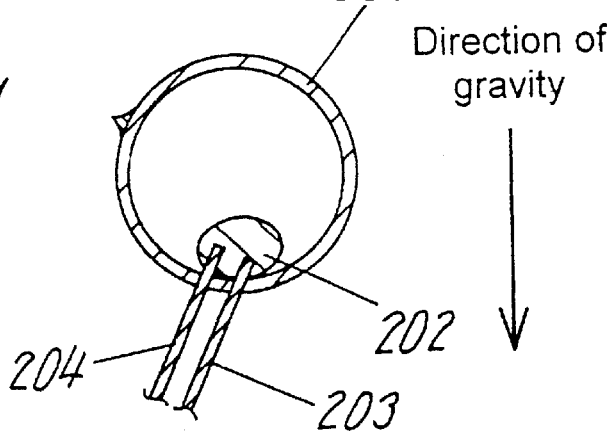
FIG. 45B shows an operating condition of the FIG. 45A inclination sensor.
Figure 46A:
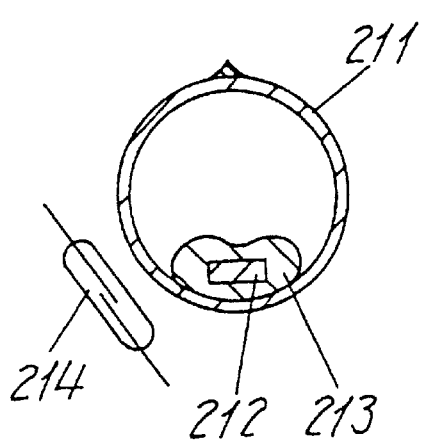
FIG. 46A is a cross sectional view of an inclination sensor of the prior art using a magnet and a reed switch.
Figure 46B:
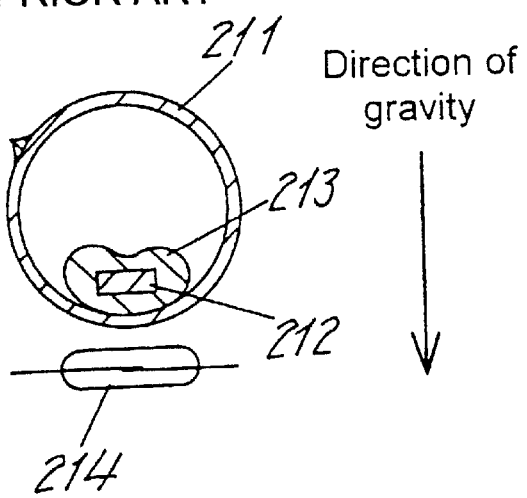
FIG. 46B shows an operating condition of the of the FIG. 46A inclination sensor.

FIGS. 44A, B and C are a front view, a side view and a bottom view of a pendulum 105 according to a twenty-ninth exemplary embodiment of the present invention. In FIGS.

44A, B and C, numerals 118a and 118b are yokes made of a magnetic material for coupling a pair of the magnets 108a and 108b between magnetic poles of opposite polarity with each other.

The present embodiment results in a direction of magnetization of a pair of the magnets 108a and 108b in an axial direction of the rotary shaft 104 (not shown in the figures) of the pendulum 105, and polar orientations in opposite directions to each other. Also, since this embodiment has a closed magnetic loop by coupling the magnets 108a and 108b between magnetic poles of opposite polarity with each other by the yokes 118a and 118b, it suppresses the effect of an external magnetic field and the approach of a magnetic substance in close vicinity, so as to enable an improvement of the detecting accuracy.

Furthermore, it is also feasible to adjust the magnetic force of the magnets by providing differently configured yokes 118a and 118b (e.g. different shapes with respect to their thickness, width, or the like), so as to enable even further improvement of the detecting accuracy.

Industrial Applicability

As has been described, the present invention provides an inclination sensor that has a superior rotational performance and long term stability, and high detecting accuracy, by comprising a pendulum mounted rotatably relative to a fixing body to be attached to a mounting body, a magnetic flux generation means mounted on the pendulum, a reed switch mounted on a part of the fixing body corresponding to a rotational path of the magnetic flux generation means, and a damping body having nonmagnetic and electrically high conductive properties positioned on the fixing body along the rotational path of the magnetic flux generation means.

Also, since at least one magnetic damping adjusting device made of a magnetic material and adjustably positioned on the fixing body is provided, an inclination sensor that is highly resistant to malfunction caused by an external disturbance, highly accurate and small in size is attainable.

Moreover, since the polar axes of the magnetic flux generating means are arranged in parallel with the rotary shaft, and the central axis of the reed switch is arranged in parallel with the rotary shaft, an inclination sensor that is highly resistant to an effect of external magnetism is achieved.

Furthermore, because divided frames are provided for the fixing body, axial alignment of a rotary member with a bearing is facilitated and fitting accuracy is improved, so as to provide an inclination sensor of even higher detecting accuracy and highly resistant to the external disturbance as well as shocks.

What is claimed is:

1. An inclination sensor comprising:
 a fixing body adapted to be attached to a mounting body;
 a frame provided within said fixing body, said frame having a threaded bearing retention hole;
 a bearing having a thread on a periphery thereof and fitted within said threaded bearing retention hole;
 a pendulum having a rotary shaft rotatably supported in said bearing;
 a magnetic flux generator mounted on said pendulum for rotatable movement with said pendulum through a rotational path; and
 a reed switch mounted on said fixing body in the rotational path of said magnetic flux generator, said reed switch having a space of a distance d in a direction along an axis of said rotary shaft provided between said reed switch and said magnetic flux generator, wherein said space of a distance d is adjustable via said thread; and
 at least one magnetic damping adjusting device made of a magnetic material and adjustably positioned on said fixing body.

2. The inclination sensor according to claim 1, further comprising a nonmagnetic and electrically conductive damping body positioned on said fixing body along the rotational path of said magnetic flux generator.

3. The inclination sensor according to claim 2, wherein said damping body is made of one of copper and aluminum.

4. The inclination sensor according to claim 2, wherein said damping body extends parallel to the axis of said rotary shaft.

5. The inclination sensor according to claim 2, wherein said damping body extends at an angle to the axis of said rotary shaft.

6. The inclination sensor according to claim 2, wherein said damping body has a circular arc shape.

7. The inclination sensor according to claim 2, wherein said damping body has a cylindrical shape.

8. The inclination sensor according to claim 2, wherein said damping body is composed of a first part which extends in one of a direction parallel with the axis of said rotary shaft and a direction at a predetermined angle with the axis of said rotary shaft, and a second part in the shape of a flat plate perpendicular to the axis of said rotary shaft.

9. The inclination sensor according to claim 8, further including a mechanism by which said damping body is mounted on said fixing body and the position of said reed switch is adjustable along the axis of said rotary shaft.

10. The inclination sensor according to claim 2, wherein said damping body is a flat plate and is located in the vicinity of one end of said magnetic flux generator and extends in the direction of a polar axis of said magnetic flux generator and perpendicular to said rotary shaft.

11. The inclination sensor according to claim 10, further including a mechanism by which said damping body is mounted on said fixing body and the position of said reed switch is adjustable along the axis of said rotary shaft.

12. The inclination sensor according to claim 1, wherein said rotary shaft has a reduced diameter at both ends.

13. The inclination sensor according to claim 1, further including a pin at each end of said rotary shaft.

14. The inclination sensor according to claim 13, wherein said pins are 0.3–1.5 [0.6] mm in diameter.

15. The inclination sensor according to claim 1, further including a second reed switch.

16. The inclination sensor according to claim 1, further including a second magnetic flux generator.

17. The inclination sensor according to claim 1, wherein said magnetic flux generator includes a magnet.

18. The inclination sensor according to claim 17, wherein said magnet is made of a samarium-cobalt system.

19. The inclination sensor according to claim 17, wherein said magnet is heat-treated at a temperature greater than a serviceable temperature thereof.

20. The inclination sensor according to claim 1, wherein said reed switch has a leaf and a major plane surface of said leaf is substantially parallel with the axis of said rotary shaft.

21. The inclination sensor according to claim 1, further including an electric resistance connected in parallel with said reed switch.

22. The inclination sensor according to claim 1, wherein said frame is made of a material having a high electrical conductivity, and positioned in a manner to confront said magnetic flux generator.

23. The inclination sensor according to claim 22, wherein said frame is made of one of copper, aluminum and brass.

24. The inclination sensor according to claim 1, further including a magneto-detecting element in the vicinity of said reed switch.

25. The inclination sensor according to claim 1, further including at least one reflection type interrupter on said fixing body facing a surface of said pendulum.

26. The inclination sensor according to claim 1, wherein said magnetic damping adjusting device is threaded and generally parallel with the axis of said rotary shaft.

27. The inclination sensor according to claim 1, wherein said reed switch has a leaf and said inclination sensor further includes a mechanism by which said leaf is mounted on said fixing body and which is rotatably adjustable about said rotary shaft.

28. The inclination sensor according to claim 1, further including a mechanism by which said reed switch is mounted on said fixing body along the axis of said rotary shaft.

29. The inclination sensor according to claim 1, wherein said magnetic flux generator and said reed switch are mounted with a polar axis of said magnetic flux generator parallel with the axis of said rotary shaft, and a central, longitudinal axis of said reed switch parallel with the axis of said rotary shaft.

30. The inclination sensor according to claim 29, further including additional magnetic flux generators.

31. The inclination sensor according to claim 29, further including a second magnetic flux generator and the polar orientations of said magnetic flux generators extend parallel with the axis of said rotary shaft in opposite directions to each other.

32. The inclination sensor according to claim 31, further including a magnetic yoke by which said magnetic flux generators are coupled together.

33. The inclination sensor according to claim 29, wherein said reed switch has a leaf and a major plane surface of said leaf is one of substantially parallel with the rotational radius of said pendulum and substantially perpendicular to the rotational radius of said pendulum.

34. The inclination sensor according to claim 29, wherein said reed switch has a leaf and said inclination sensor further includes a mechanism by which a contact point of said leaf is rotatably adjustable about said rotary shaft.

35. The inclination sensor according to claim 29, further including a mechanism for adjusting said reed switch along the axis of said rotary shaft.

36. The inclination sensor according to claim 29 further having a damping body composed of a first part which extends in one of a direction parallel with the axis of said rotary shaft and a direction at a predetermined angle with the axis of said rotary shaft, and a second part in the shape of a flat plate perpendicular to the axis of said rotary shaft.

37. The inclination sensor according to claim 29 further having a damping body of a flat plate located in the vicinity of one end of said magnetic flux generator and extending in the direction of the polar axis of said magnetic flux generator and perpendicular to said rotary shaft.

38. The inclination sensor according to claim 29, further including a mechanism for adjusting said reed switch along the rotational radius of said pendulum.

39. An inclination sensor comprising:
a fixing body adapted to be attached to a mounting body;
a pendulum mounted rotatably relative to said fixing body;
a magnetic flux generator mounted on said pendulum for rotatable movement with said pendulum through a rotational path;
a reed switch mounted on said fixing body in the rotational path of said magnetic flux generator; and
a nonmagnetic and electrically conductive damping body positioned on said fixing body along the rotational path of said magnetic flux generator, wherein said damping body has a shape of a circular arc cylinder or a semicircular cylinder wherein a cross sectional shape of said damping body is one of a reversed letter T, a letter J or a letter W.

40. An inclination sensor comprising:
a fixing body adapted to be attached to a mounting body;
a frame provided within said fixing body, said frame having a threaded bearing retention hole;
a bearing having a thread on a periphery thereof and fitted within said threaded bearing retention hole;
a pendulum having a rotary shaft rotatably supported in said bearing;
a magnetic flux generator mounted on said pendulum for rotatable movement with said pendulum through a rotational path; and
a plurality of reed switches mounted on said fixing body in respectively different locations about the rotational path of said magnetic flux generator to distinguish one of (a) between clockwise and counterclockwise rotation and (b) a plurality of rotating angles of said inclination sensor.

\* \* \* \* \*

UNITED STATES PATENT AND TRADEMARK OFFICE
CERTIFICATE OF CORRECTION

PATENT NO. : 6,499,220 B2
DATED : December 31, 2002
INVENTOR(S) : Katsuki et al.

It is certified that error appears in the above-identified patent and that said Letters Patent is hereby corrected as shown below:

Title page,
Item [56], References Cited, U.S. PATENT DOCUMENTS, insert
-- 3,548,400  12/1970  Boyd et al. --
-- 4,258,353  03/1981  Carlson --
-- 5,010,216  04/1991  Sewell et al. --
FOREIGN PATENT DOCUMENTS, insert
-- GB 2167191  05/1986 --
-- EP 0768513  04/1997 --

Column 21,
Lines 26 and 33, delete "411" and insert -- 41I --

Column 23,
Line 65, after "path;" delete "and"

Column 25,
Line 21, after "body," insert -- and is adjustable --

Signed and Sealed this

Twenty-fourth Day of June, 2003

JAMES E. ROGAN
*Director of the United States Patent and Trademark Office*